US012781039B2

(12) United States Patent
Maizuru

(10) Patent No.: US 12,781,039 B2
(45) Date of Patent: Nov. 3, 2026

(54) GRANULAR BODY AND USE THEREOF

(71) Applicant: KANEKA CORPORATION, Osaka (JP)

(72) Inventor: Nobuyoshi Maizuru, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 1035 days.

(21) Appl. No.: 17/486,036

(22) Filed: Sep. 27, 2021

(65) Prior Publication Data

US 2022/0010124 A1 Jan. 13, 2022

Related U.S. Application Data

(63) Continuation of application No. PCT/JP2020/014657, filed on Mar. 30, 2020.

(30) Foreign Application Priority Data

Mar. 28, 2019 (JP) ................................. 2019-063421
Jul. 26, 2019 (JP) ................................. 2019-138161
Sep. 27, 2019 (JP) ................................. 2019-177482
Sep. 27, 2019 (JP) ................................. 2019-177484

(51) Int. Cl.

| | |
|---|---|
| ***C08L 51/04*** | (2006.01) |
| ***C08F 279/02*** | (2006.01) |
| ***C08L 33/08*** | (2006.01) |
| ***C08L 33/12*** | (2006.01) |
| ***C09D 5/16*** | (2006.01) |
| ***C09D 7/40*** | (2018.01) |
| ***C09D 183/04*** | (2006.01) |

(52) U.S. Cl.

CPC ............ *C08L 51/04* (2013.01); *C08F 279/02* (2013.01); *C08L 33/08* (2013.01); *C08L 33/12* (2013.01); *C09D 5/1662* (2013.01); *C09D 7/67* (2018.01); *C09D 7/68* (2018.01); *C09D 7/69* (2018.01); *C09D 183/04* (2013.01); *C08L 2205/035* (2013.01)

(58) Field of Classification Search

CPC .............. C08F 220/14; C08F 220/1804; C08F 222/102; C08F 279/02; C08L 33/08; C08L 33/12; C08L 51/04; C08L 81/04; C08L 25/04–18; C09D 151/003; C09D 7/69; C09D 7/68

See application file for complete search history.

(56) References Cited

U.S. PATENT DOCUMENTS

| | | | |
|---|---|---|---|
| 3,284,396 | A | 11/1966 | Talalay et al. |
| 3,804,735 | A | 4/1974 | Radlove et al. |
| 4,778,851 | A | 10/1988 | Henton et al. |
| 4,857,631 | A | 8/1989 | Moore |
| 5,290,857 | A | 3/1994 | Ashida et al. |
| 5,362,795 | A | 11/1994 | Matsumoto et al. |
| 5,364,729 | A | 11/1994 | Kmiecik-Lawrynowicz et al. |
| 5,414,045 | A | 5/1995 | Sue et al. |
| 5,569,709 | A | 10/1996 | Sue et al. |
| 5,708,131 | A | 1/1998 | Morgan |
| 6,153,694 | A | 11/2000 | Miyatake et al. |
| 6,153,964 | A | 11/2000 | Miyatake et al. |
| 2002/0013438 | A1 | 1/2002 | Grootaert et al. |
| 2002/0052429 | A1 | 5/2002 | Weier et al. |
| 2002/0065343 | A1 | 5/2002 | Jang et al. |
| 2003/0040555 | A1 | 2/2003 | Sakabe |
| 2004/0018240 | A1 | 1/2004 | Ohmachi et al. |
| 2004/0147668 | A1 | 7/2004 | Miyake et al. |
| 2004/0171749 | A1 | 9/2004 | Takaki et al. |
| 2005/0163925 | A1 | 7/2005 | Sacripante et al. |
| 2006/0241045 | A1 | 10/2006 | Ohmachi et al. |
| 2007/0027233 | A1 | 2/2007 | Yamaguchi et al. |
| 2007/0027263 | A1 | 2/2007 | Furukawa et al. |
| 2007/0251419 | A1 | 11/2007 | Yamaguchi et al. |
| 2007/0270539 | A1 | 11/2007 | Yui et al. |
| 2007/0272119 | A1 | 11/2007 | Ichinose et al. |
| 2008/0108750 | A1 | 5/2008 | Terada et al. |
| 2008/0139697 | A1 | 6/2008 | Ueda |
| 2008/0146687 | A1 | 6/2008 | Ueda |
| 2008/0167402 | A1 | 7/2008 | Ueda |
| 2008/0176974 | A1 | 7/2008 | Ueda |
| 2009/0294057 | A1 | 12/2009 | Liang et al. |
| 2010/0204404 | A1 | 8/2010 | Hongo |

(Continued)

FOREIGN PATENT DOCUMENTS

| | | | |
|---|---|---|---|
| CN | 1090861 | A | 8/1994 |
| CN | 1409727 | A | 4/2003 |

(Continued)

OTHER PUBLICATIONS

Office Action issued in corresponding Chinese Patent Application No. 202080024033.3, dated Oct. 26, 2023, with translation (7 pages).
Advisory Action issued in U.S. Appl. No. 17/036,869, dated Nov. 2, 2023 (8 pages).
Office Action issued in related U.S. Appl. No. 17/036,869 dated Jan. 25, 2023 (79 pages).
Mitsubishi Chemical Corporation, "jER TM Epoxy resins", Apr. 2021 (11 pages).
Non-Final Office Action issued in related U.S. Appl. No. 17/036,869, dated Dec. 18, 2023 (34 pages).
Advisory Action issued in related U.S. Appl. No. 17/036,869, dated Aug. 15, 2024 (6 pages).
Office Action issued in related U.S. Appl. No. 17/036,869, dated May 24, 2024 (41 pages).

(Continued)

*Primary Examiner* — Ana L. Woodward
(74) *Attorney, Agent, or Firm* — Osha Bergman Watanabe & Burton LLP

(57) ABSTRACT

A powdery and/or granular material for a thermosetting resin is provided. The powdery and/or granular material contains fine polymer particles (A) that contain a rubber-containing graft copolymer that includes an elastic body and a graft part grafted to the elastic body. The fine polymer particles (A) have a volume-average particle size of not less than 90 nm; and the polymer of the graft part has a weight-average molecular weight of not more than 200000.

12 Claims, No Drawings

(56) References Cited

U.S. PATENT DOCUMENTS

| | | | | |
|---|---|---|---|---|
| 2010/0323022 | A1 | 12/2010 | Hashimoto et al. | |
| 2011/0269894 | A1 | 11/2011 | Miyamoto | |
| 2011/0288201 | A1 | 11/2011 | Gottis | |
| 2012/0070482 | A1 | 3/2012 | Heming et al. | |
| 2012/0101216 | A1 | 4/2012 | Achten et al. | |
| 2012/0142820 | A1 | 6/2012 | Yamaguchi et al. | |
| 2012/0142863 | A1 | 6/2012 | Miyamoto | |
| 2012/0202080 | A1 | 8/2012 | Ehara et al. | |
| 2014/0124986 | A1 | 5/2014 | Lima et al. | |
| 2014/0213729 | A1 | 7/2014 | Hongo | |
| 2015/0037497 | A1 | 2/2015 | Lutz | |
| 2015/0267048 | A1 | 9/2015 | Wakita et al. | |
| 2016/0024355 | A1 | 1/2016 | Wakita et al. | |
| 2016/0177016 | A1 | 6/2016 | Takamido | |
| 2016/0244603 | A1 | 8/2016 | Okamoto | |
| 2016/0251510 | A1 | 9/2016 | Furukawa et al. | |
| 2016/0333130 | A1 | 11/2016 | Wakita et al. | |
| 2016/0362524 | A1 | 12/2016 | Watanabe et al. | |
| 2017/0210897 | A1* | 7/2017 | Nakamoto | C08L 67/00 |
| 2017/0309955 | A1 | 10/2017 | Kataoka et al. | |
| 2017/0335097 | A1 | 11/2017 | Takamizu | |
| 2017/0362368 | A1 | 12/2017 | Kitayama et al. | |
| 2017/0362395 | A1* | 12/2017 | Inoubli | C08J 3/22 |
| 2017/0369696 | A1 | 12/2017 | Inoubli et al. | |
| 2018/0002520 | A1* | 1/2018 | Inoubli | C08J 3/12 |
| 2018/0030240 | A1 | 2/2018 | Matsuoka et al. | |
| 2018/0094176 | A1 | 4/2018 | Okamoto et al. | |
| 2018/0370125 | A1 | 12/2018 | Rolland et al. | |
| 2019/0040182 | A1 | 2/2019 | Miyatake | |
| 2019/0233635 | A1 | 8/2019 | Inoubli et al. | |
| 2020/0095385 | A1 | 3/2020 | Yoshihara | |
| 2020/0172720 | A1 | 6/2020 | Kitayama et al. | |
| 2020/0303771 | A1 | 9/2020 | Kataoka et al. | |
| 2022/0213311 | A1 | 7/2022 | Maizuru et al. | |

FOREIGN PATENT DOCUMENTS

| | | | |
|---|---|---|---|
| CN | 1503823 | A | 6/2004 |
| CN | 1517400 | A | 8/2004 |
| CN | 101090943 | A | 12/2007 |
| CN | 104755516 | A | 7/2015 |
| CN | 105452316 | A | 3/2016 |
| CN | 105612215 | A | 5/2016 |
| CN | 105612218 | A | 5/2016 |
| CN | 105683238 | A | 6/2016 |
| CN | 107250259 | A | 10/2017 |
| EP | 0526895 | A2 | 2/1993 |
| EP | 1245584 | A1 | 10/2002 |
| EP | 1394210 | A1 | 3/2004 |
| EP | 1440997 | A1 | 7/2004 |
| EP | 1780239 | A1 | 5/2007 |
| EP | 2123711 | A1 | 11/2009 |
| EP | 2189502 | A1 | 5/2010 |
| EP | 2388280 | A1 | 11/2011 |
| EP | 2441784 | A1 | 4/2012 |
| EP | 3031836 | A1 | 6/2016 |
| EP | 3056540 | A1 | 8/2016 |
| EP | 3064520 | A1 | 9/2016 |
| EP | 3266827 | A1 | 1/2018 |
| EP | 3587491 | A1 | 1/2020 |
| EP | 3904453 | A1 | 11/2021 |
| JP | H05-295237 | A | 11/1993 |
| JP | H05-339471 | A | 12/1993 |
| JP | H06-100704 | A | 4/1994 |
| JP | H06-172734 | A | 6/1994 |
| JP | H06-287410 | A | 10/1994 |
| JP | H07-146587 | A | 6/1995 |
| JP | H07-233204 | A | 9/1995 |
| JP | H08-183836 | A | 7/1996 |
| JP | 2000-178405 | A | 6/2000 |
| JP | 2001-123052 | A | 5/2001 |
| JP | 2002146214 | A | 5/2002 |
| JP | 2002-308914 | A | 10/2002 |
| JP | 2003-522232 | A | 7/2003 |
| JP | 2003-327912 | A | 11/2003 |
| JP | 2005-002345 | A | 1/2005 |
| JP | 2005-213507 | A | 8/2005 |
| JP | 2005-526165 | A | 9/2005 |
| JP | 2009062389 | A | 3/2009 |
| JP | 2009203397 | A | 9/2009 |
| JP | 2009-545656 | A | 12/2009 |
| JP | 201077379 | A | 4/2010 |
| JP | 2010209164 | A | 9/2010 |
| JP | 2010241996 | A | 10/2010 |
| JP | 2011-032435 | A | 2/2011 |
| JP | 4671531 | B2 | 4/2011 |
| JP | 2012-520909 | A | 9/2012 |
| JP | 2014141604 | A | 8/2014 |
| JP | 2015-514140 | A | 5/2015 |
| JP | 2015182248 | A | 10/2015 |
| JP | 2015218317 | A | 12/2015 |
| JP | 2016199673 | A | 12/2016 |
| JP | 2017-149887 | A | 8/2017 |
| JP | 2018-500440 | A | 1/2018 |
| JP | 2018-500441 | A | 1/2018 |
| JP | 2018-035210 | A | 3/2018 |
| JP | 2019-019236 | A | 2/2019 |
| JP | 2019503891 | A | 2/2019 |
| JP | 2020-144374 | A | 9/2020 |
| JP | 2021-088632 | A | 6/2021 |
| KR | 20150040497 | A | 4/2015 |
| NO | 2016102682 | A1 | 6/2016 |
| WO | 03/097746 | A1 | 11/2003 |
| WO | 2004/108825 | A1 | 12/2004 |
| WO | 2005/028546 | A1 | 3/2005 |
| WO | 2005056624 | A1 | 6/2005 |
| WO | 2005/116155 | A1 | 12/2005 |
| WO | 2009034966 | A1 | 3/2009 |
| WO | 2009060819 | A1 | 5/2009 |
| WO | 2010/082482 | A1 | 7/2010 |
| WO | 2010143366 | A1 | 12/2010 |
| WO | 2011016385 | A1 | 2/2011 |
| WO | 2011/046086 | A1 | 4/2011 |
| WO | 2016-068239 | A1 | 5/2016 |
| WO | 2016/068329 | A1 | 5/2016 |
| WO | 2016102658 | A1 | 6/2016 |
| WO | 2016102666 | A1 | 6/2016 |
| WO | 2016/136726 | A1 | 9/2016 |
| WO | 2017/179653 | A1 | 10/2017 |
| WO | 2018/155677 | A1 | 8/2018 |
| WO | 2018/212227 | A1 | 11/2018 |
| WO | 2018212064 | A1 | 11/2018 |
| WO | 2021/060482 | A1 | 4/2021 |

OTHER PUBLICATIONS

Extended European Search Report issued in related European Application No. 20779224.3; dated Nov. 18, 2022 (7 pages).

Extended European Search Report issued in related European Application No. 20777366.4; dated Nov. 15, 2022 (6 pages).

Office Action issued in corresponding Japanese Applicaiton No. 2021-509698 dated Sep. 19, 2023 (9 pages).

Extended European Search Report issued in related European Application No. 20867849.0 dated Sep. 8, 2023 (8 pages).

Office Action issued in related U.S. Appl. No. 17/485,782, dated Jun. 10, 2024 (62 pages).

Office Action issued in corresponding Japanese Application No. 2021-509698 dated Feb. 27, 2024 (4 pages).

Office Action issued in corresponding Chinese Patent Application No. 202080062288.9, dated Mar. 20, 2024 (19 pages).

Hexion, "EPON and EPI-REZ Epoxy Resins"; Product Selector, pp. 1-16, Feb. 2014 (16 pages).

Office Action issued in corresponding U.S. Appl. No. 17/036,869; dated Aug. 10, 2022 (39 pages).

Hexion "EPON Resin 1002F," Hexion Responsible Chemistry, dated Aug. 4, 2022 (2 pages).

Hexion "EPI-REZ Resin 3522-W-60," Hexion Responsible Chemistry, dated Aug. 4, 2022 (2 pages).

Burkhardt, "Liquid Polysulfide Polymers for Chemical- and Solvent-Resistant Sealants," ASI, www.adhesivesmag.com, Aug. 2018, pp. 19-23 (6 pages).

(56) References Cited

OTHER PUBLICATIONS

"D.E.R. 332 Liquid Epoxy Resin," Dow (Dow Plastics), Oct. 2001 (2 pages).
Office Action issued in corresponding U.S. Appl. No. 17/036,869; dated Mar. 2, 2022 (44 pages).
Extended European Search Report issued in corresponding European Application No. 19775340.3; mailed Dec. 15, 2021 (8 pages).
International Preliminary Report on Patentability issued in corresponding International Application No. PCT/JP2019/013710; mailed Oct. 15, 2020 (11 pages).
International Search Report issued in corresponding International Application No. PCT/JP2019/013710; mailed Jun. 18, 2019 (2 pages).
International Preliminary Report on Patentability issued in corresponding International Application No. PCT/2020/036313; dated Dec. 1, 2020 (7 pages).
International Search Report issued in corresponding International Application No. PCT/JP2020/036313; mailed Dec. 1, 2020 (4 pages).
Office Action issued in corresponding Chinese Patent Application No. 202080025049.6 dated Nov. 25, 2023 (14 pages).
1 Final Office Action issued in corresponding U.S. Appl. No. 17/036,869, dated Jul. 10, 2023, 40 pages.
International Preliminary Report on Patentability issued in related International Application No. PCT/JP2020/014657 mailed Oct. 7, 2021 (8 pages).
International Search Report issued in related International Application No. PCT/JP2020/014657 mailed Jun. 16, 2020 (2 pages).
International Preliminary Report on Patentability issued in related International Application No. PCT/JP2020/014659 mailed Oct. 7, 2021 (7 pages).
International Search Report issued in related International Application No. PCT/JP2020/014659 mailed Jun. 16, 2020 (2 pages).
International Preliminary Report on Patentability issued in related International Application No. PCT/JP2020/014658 mailed Oct. 7, 2021 (10 pages).
International Search Report issued in related International Application No. PCT/JP2020/014658 mailed Jun. 30, 2020 3 pages).
Sigma Aldrich Thermal Transitions of Homopolymers_Glass Transition & Melting Point, 2024 (7 pages).
Westlake Epoxy, Epikote Resin 828 Technical Data Sheet, 2007, pp. 1-2 (2 pages).
Dow Glycidyl Methacrylate, Product Datasheet, 2024, pp. 1-2 (2 pages).
Office Action issued in corresponing U.S. Appl. No. 17/485,782, dated Nov. 26, 2024 (16 pages).
English translation of the International Preliminary Report on Patentability issued in corresponding International Application No. PCT/JP2019/051073, dated Jun. 16, 2021 (7 pages).
English translation of the International Search Report issued in corresponding International Application No. PCT/JP2019/051073, mailed Mar. 10, 2020 (2 pages).
Office Action issued in corresponding Chinese Patent Application No. CN 201980085731.1, dated Feb. 21, 2023 (17 pages).
Office Action issued in corresponding Japanese Patent Application No. 2020-562394 dated Jul. 4, 2023 (4 pages).
Written Opinion issued in corresponding International Application No. PCT/JP2022/030280, dated Oct. 25, 2022 (11 pages).
International Search Report issued in corresponding International Application No. PCT/JP2022/030280, dated Oct. 25, 2022 (4 pages).
Office Action issued in related Japanese Application No. 2021-509700, dated Sep. 19, 2023 (7 pages).
Office Action issued in related U.S. Appl. No. 17/355,787, dated Sep. 25, 2024 (36 pages).
Office Action issued in related U.S. Appl. No. 17/486,166, dated May 8, 2025 (87 pages).
Office Action issued in related U.S. Appl. No. 17/485,782, dated Jun. 17, 2025 (20 pages).
ELEC-F Safety Data Sheet, Kao Corporation, Nov. 5, 2020 (9 pages).
Office Action issued in related U.S. Appl. No. 17/698,248, dated Jul. 1, 2025 (98 pages).
Advisory Action issued in related U.S. Appl. No. 17/486,166, dated Jan. 27, 2026 (3 pages).
Final Office Action issued in related U.S. Appl. No. 17/698,248, dated Jan. 14, 2026 (24 pages).
Notice of Reasons for Refusal issued in related Japanese Application No. 2021-509698 mailed Nov. 25, 2025 (11 pages).
Office Action issued in related U.S. Appl. No. 19/212,020 mailed Nov. 18, 2025 (48 pages).
Office Action issued in related U.S. Appl. No. 17/486,166 mailed Nov. 7, 2025 (20 pages).

* cited by examiner

GRANULAR BODY AND USE THEREOF

TECHNICAL FIELD

One or more embodiments of the present invention relate to a powdery and/or granular material and use thereof.

BACKGROUND

For an improvement in toughness of a thermosetting resin, a method involving adding an elastomer (in particular, fine crosslinked polymer particles) to a resin is widely used (Patent Literatures 1 and 2).

PATENT LITERATURE

Patent Literature 1

Published Japanese Translation of PCT International Application, Tokuhyo, No. 2018-500440

Patent Literature 2

Published Japanese Translation of PCT International Application, Tokuhyo, No. 2018-500441

Patent Literature 3

PCT International Publication No. WO 2011/046086

Patent Literature 4

PCT International Publication No. WO 2005/116155

SUMMARY

The inventor of one or more embodiments of the present invention found that the use of fine polymer particles having a large particle size in the technique as described above results in an improvement of the dispersibility of the fine polymer particles blended in the thermosetting resin. The inventor, however, found the following technical issue on his own: in a case where fine polymer particles which include a specific elastic body and a graft part grafted to the elastic body and which have a large particle sizes are blended in a thermosetting resin which is a matrix resin, the viscosity (blend viscosity) of the resulting thermosetting resin composition may greatly increase and workability may decrease.

One or more embodiments of the present invention were made in view of the above issue, and provided a novel powdery and/or granular material which, when mixed with a thermosetting resin which is a matrix resin, is capable of preventing or reducing an increase in viscosity of the resulting resin composition, and a technique of using the powdery and/or granular material.

The inventor of one or more embodiments of the present invention conducted diligent research, and found on his own that, in a case where fine polymer particles which include a specific elastic body and a graft part grafted to the elastic body and which have a large particle sizes are mixed with a thermosetting resin which is a matrix resin, the viscosity of the resulting resin composition may increase depending on the molecular weight of the graft part of the fine polymer particles. On the basis of this finding, the inventor accomplished one or more embodiments of the present invention.

Specifically, one or more embodiments of the present invention include the following.

A powdery and/or granular material adapted to be blended with a thermosetting resin, containing fine polymer particles (A), in which: the fine polymer particles (A) contain a rubber-containing graft copolymer that includes an elastic body and a graft part grafted to the elastic body; the elastic body contains, as a structural unit, a structural unit derived from butadiene; the graft part contains a polymer that contains, as one or more structural units, one or more structural units derived from at least one type of monomer selected from the group consisting of aromatic vinyl monomers, vinyl cyanide monomers, and (meth)acrylate monomers; the fine polymer particles (A) have a volume-average particle size of not less than 90 nm; and the polymer of the graft part has a weight-average molecular weight of not more than 200000.

A powdery and/or granular material in accordance with one or more embodiments of the present invention is, even when added to a thermosetting resin, capable of preventing or reducing an increase in viscosity of the resin composition. This makes it possible to improve workability.

DETAILED DESCRIPTION

The following description will discuss one or more embodiments of the present invention. The present invention is not, however, limited to these embodiments. The present invention is not limited to the configurations described below, but may be altered in various ways within the scope of the claims. The present invention also encompasses, in its technical scope, any embodiments or examples derived by combining technical means disclosed in differing embodiments and Examples. Further, it is possible to form a new technical feature by combining the technical means disclosed in various embodiments. All academic and patent documents cited in the present specification are incorporated herein by reference. Any numerical range expressed as “A to B” in the present specification means “not less than A and not more than B (i.e., a range from A to B which includes both A and B)” unless otherwise stated.

Embodiment 1

[1. Powdery and/or Granular Material]

A powdery and/or granular material in accordance with one or more embodiments of the present invention is a powdery and/or granular material adapted to be blended with a thermosetting resin, containing fine polymer particles (A), in which: the fine polymer particles (A) contain a rubber-containing graft copolymer that includes an elastic body and a graft part grafted to the elastic body; the elastic body contains, as a structural unit, a structural unit derived from butadiene; the graft part contains a polymer that contains, as one or more structural units, one or more structural units derived from at least one type of monomer selected from the group consisting of aromatic vinyl monomers, vinyl cyanide monomers, and (meth)acrylate monomers; the fine polymer particles (A) have a volume-average particle size of not less than 90 nm; and the polymer of the graft part has a weight-average molecular weight of not more than 200000. A powdery and/or granular material for a thermosetting resin, in accordance with one or more embodiments of the present invention, may be hereinafter simply referred to as a present powdery and/or granular material. The present powdery and/or granular material, when dispersed in a thermosetting resin (B) which is a matrix resin (described later), gives a resin composition. Note that the scope of one or more embodiments of the present invention does not include powdery and/or granular materials for a thermoplastic resin.

In the present specification, the term "powdery and/or granular material" refers to a material which can be powder and/or granule(s) and which is made up of powder particle(s), grain(s), and/or the like. In a case where a specific distinction is made between "granules" and "powder", the "powder" has a volume-average particle size of 0.01 mm to 0.1 mm, whereas the "granules" have a volume-average particle size of 0.1 mm to 10 mm. Note, however, that the powdery and/or granular material may contain coarse particles of 10 mm or greater. The "volume-average particle size" less than 10 μm can be measured with use of a dynamic light scattering (DLS) particle size distribution analyzer Nanotrac WaveII-EX150 (manufactured by MicrotracBEL Corp.), and "volume-average particle size" equal to or more than 10 μm can be measured with use of a laser diffraction particle size distribution analyzer Microtrac MT3000II (manufactured by MicrotracBEL Corp.).

The inventor of one or more embodiments of the present invention conducted diligent research on a cause of an increase in viscosity (blend viscosity) of the resulting resin composition that results when fine polymer particles which include a specific elastic body and a graft part grafted to the elastic body and which have a specific particle size are mixed with a thermosetting resin which is a matrix resin, and found on his own that the viscosity of the resin composition greatly increases in a case where the molecular weight of a polymer of the graft part of the fine polymer particles is more than a certain value. In one or more embodiments of the present invention, an increase in the viscosity of the resin composition can be prevented or reduced even when a powdery and/or granular material is added to a thermosetting resin, by employing a configuration in which, in a powdery and/or granular material containing fine polymer particles (A), the molecular weight of a molecular chain of a polymer of a graft part of the fine polymer particles (A) is not more than a certain value.

(1-1. Fine Polymer Particles (A))

Fine polymer particles (A) contain a rubber-containing graft copolymer which has an elastic body and a graft part grafted to the elastic body.

(1-1-1. Elastic Body)

An elastic body contains, as structural units, (i) a structural unit derived from butadiene and (ii) one or more structural units derived from at least one type of monomer copolymerizable with butadiene. The elastic body can also be referred to as butadiene-based rubber particle(s). In a case where the elastic body has the above feature, there is the following tendency: when the molecular weight of a molecular chain of a graft part (described later) is more than a certain value, the viscosity of a resin composition obtained by mixing a thermosetting resin and the powdery and/or granular material greatly increases.

In a case where the elastic body includes a butadiene-based rubber, the resulting resin composition containing the powdery and/or granular material can provide a cured product which has excellent toughness and impact resistance.

The butadiene-based rubber may be a polymer (polybutadiene rubber) composed only of structural units derived from butadiene or may be a copolymer containing structural unit(s) derived from butadiene and one or more structural units derived from at least one type of monomer copolymerizable with butadiene.

Examples of butadiene encompass 1,3-butadiene, isoprene (2-methyl-1,3-butadiene), and 2-chloro-1,3-butadiene. These monomers may be used alone or in combination of two or more.

Examples of the one or more structural units derived from at least one type of monomer copolymerizable with butadiene encompass: structural units derived from a vinyl-based monomer; and structural units derived from a (meth)acrylate-based monomer. In the present specification, the term "(meth)acrylate" refers to an acrylate and/or a methacrylate.

The elastic body may contain structural units derived from butadiene in an amount of not less than 30% by weight and not more than 100% by weight and one or more structural units derived from at least one type of monomer copolymerizable with butadiene in an amount of not less than 0% by weight and not more than 70% by weight, with respect to 100% by weight of structural units. The elastic body may contain structural units derived from butadiene in an amount of not less than 50% by weight and not more than 100% by weight and one or more structural units derived from at least one type of monomer copolymerizable with butadiene in an amount of not less than 0% by weight and not more than 50% by weight, with respect to 100% by weight of structural units.

Examples of the vinyl-based monomer encompass: vinyl arenes such as styrene, α-methylstyrene, monochlorostyrene, and dichlorostyrene; vinyl carboxylic acids such as acrylic acid and methacrylic acid; vinyl cyanides such as acrylonitrile and methacrylonitrile; vinyl halides such as vinyl chloride, vinyl bromide, and chloroprene; vinyl acetate; alkenes such as ethylene, propylene, butylene, and isobutylene; and polyfunctional monomers such as diallyl phthalate, triallyl cyanurate, triallyl isocyanurate, and divinylbenzene. These vinyl-based monomers may be used alone or in combination of two or more. Out of these vinyl-based monomers, styrene is particularly preferable.

The butadiene-based rubber is preferably (i) polybutadiene rubber which is composed only of 1,3-butadiene or (ii) butadiene-styrene rubber which is a copolymer of 1,3-butadiene and styrene (also referred to as polystyrene-butadiene). According to the above feature, a desired effect brought about by the fine polymer particles (A) containing the butadiene-based rubber can be more brought about. The butadiene-styrene rubber is more preferable in that the butadiene-styrene rubber makes it possible to, by adjustment of a refractive index, increase the transparency of the resulting cured product.

Examples of the (meth)acrylate-based monomer encompass: alkyl (meth)acrylates such as methyl (meth)acrylate, ethyl (meth)acrylate, butyl (meth)acrylate, 2-ethylhexyl (meth)acrylate, octyl (meth)acrylate, dodecyl (meth)acrylate, stearyl (meth)acrylate, and behenyl (meth)acrylate; aromatic ring-containing (meth)acrylates such as phenoxyethyl (meth)acrylate and benzyl (meth)acrylate; hydroxyalkyl (meth)acrylates such as 2-hydroxyethyl (meth)acrylate and 4-hydroxybutyl (meth)acrylate; glycidyl (meth)acrylates such as glycidyl (meth)acrylate and glycidyl alkyl (meth)acrylate; alkoxy alkyl (meth)acrylates; allyl alkyl (meth)acrylates such as allyl (meth)acrylate and allyl alkyl (meth)acrylates; and polyfunctional (meth)acrylates such as monoethylene glycol di(meth)acrylate, triethylene glycol di(meth)acrylate, and tetraethylene glycol di(meth)acrylate. These (meth)acrylate-based monomers may be used alone or in combination of two or more. Out of these (meth)acrylate-based monomers, ethyl (meth)acrylate, butyl (meth)acrylate, and 2-ethylhexyl (meth)acrylate are particularly preferable, and butyl (meth)acrylate is more preferable.

The elastic body may further contain a (meth)acrylate-based rubber and/or an elastic body of a polysiloxane rubber-based elastic body, other than the butadiene-based rubber. The elastic body may contain a butadiene-based rubber, a (meth)acrylate-based rubber, and, for example, natural rubber as an elastic body other than the polysiloxane rubber-based elastic body.

(Crosslinked Structure of Elastic Body)

The elastic body preferably has a crosslinked structure introduced therein, from the viewpoint of maintenance of stable dispersion of the fine polymer particles (A) in a thermosetting resin. A generally used method may be used to introduce a crosslinked structure into the elastic body. Examples of the generally used method encompass the following. That is, in production of the elastic body, a crosslinking monomer(s), such as a polyfunctional monomer and/or a mercapto group-containing compound, is/are mixed with a monomer which can constitute the elastic body, and then polymerization is carried out. In the present specification, producing a polymer such as the elastic body is also referred to as forming a polymer by polymerization.

It can also be said that the polyfunctional monomer is a monomer having two or more radical-polymerizable reactive groups in an identical molecule. The radical-polymerizable reactive groups are each preferably a carbon-carbon double bond. Examples of the polyfunctional monomer exclude butadiene and include (meth)acrylates having an ethylenically unsaturated double bond(s), such as allyl alkyl (meth)acrylates and allyl oxyalkyl (meth)acrylates. Examples of a monomer having two (meth)acrylic groups encompass ethylene glycol di(meth)acrylate, butylene glycol di(meth)acrylate, butanediol di(meth)acrylate, hexanediol di(meth)acrylate, cyclohexane dimethanol di(meth) acrylate, and polyethylene glycol di(meth)acrylates. Examples of the polyethylene glycol di(meth)acrylates encompass triethylene glycol di(meth)acrylate, tripropylene glycol di(meth)acrylate, tetraethylene glycol di(meth)acrylate, and polyethylene glycol (600) di(meth)acrylate. Examples of a monomer having three (meth)acrylate groups encompass alkoxylated trimethylolpropane tri(meth)acrylates, glycerol propoxy tri(meth)acrylate, pentaerythritol tri (meth)acrylate, and tris(2-hydroxyethyl)isocyanurate tri (meth)acrylate. Examples of the alkoxylated trimethylolpropane tri(meth)acrylates encompass trimethylolpropane tri(meth)acrylate and trimethylolpropane triethoxy tri(meth)acrylate. Examples of a monomer having four (meth)acrylic groups encompass pentaerythritol tetra (meth)acrylate and ditrimethylolpropane tetra(meth)acrylate. Examples of a monomer having five (meth)acrylic groups encompass dipentaerythritol penta(meth)acrylate. Examples of a monomer having six (meth)acrylic groups encompass ditrimethylolpropane hexa(meth)acrylate. Examples of the polyfunctional monomer also encompass diallyl phthalate, triallyl cyanurate, triallyl isocyanurate, and divinylbenzene.

Examples of the mercapto group-containing compound encompass alkyl group-substituted mercaptan, allyl group-substituted mercaptan, aryl group-substituted mercaptan, hydroxy group-substituted mercaptan, alkoxy group-substituted mercaptan, cyano group-substituted mercaptan, amino group-substituted mercaptan, silyl group-substituted mercaptan, acid radical-substituted mercaptan, halo group-substituted mercaptan, and acyl group-substituted mercaptan. The alkyl group-substituted mercaptan is preferably alkyl group-substituted mercaptan having 1 to 20 carbon atoms, and is more preferably alkyl group-substituted mercaptan having 1 to 10 carbon atoms. The aryl group-substituted mercaptan is preferably phenyl group-substituted mercaptan. The alkoxy group-substituted mercaptan is preferably alkoxy group-substituted mercaptan having 1 to carbon atoms, and is more preferably alkoxy group-substituted mercaptan having 1 to 10 carbon atoms. The acid radical-substituted mercaptan is preferably alkyl group-substituted mercaptan having a carboxyl group and 1 to 10 carbon atoms or aryl group-substituted mercaptan having a carboxyl group and 1 to 12 carbon atoms.

(Glass Transition Temperature of Elastic Body)

The elastic body has a glass transition temperature of preferably not higher than 80° C., more preferably not higher than 70° C., more preferably not higher than 60° C., more preferably not higher than 50° C., more preferably not higher than 40° C., more preferably not higher than 30° C., more preferably not higher than 20° C., more preferably not higher than 10° C., more preferably not higher than 0° C., more preferably not higher than −20° C., more preferably not higher than −40° C., more preferably not higher than −45° C., more preferably not higher than −50° C., more preferably not higher than −55° C., more preferably not higher than −60° C., more preferably not higher than −65° C., more preferably not higher than −70° C., more preferably not higher than −75° C., more preferably not higher than −80° C., more preferably not higher than −85° C., more preferably not higher than −90° C., more preferably not higher than −95° C., more preferably not higher than −100° C., more preferably not higher than −105° C., more preferably not higher than −110° C., more preferably not higher than −115° C., even more preferably not higher than −120° C., particularly preferably not higher than −125° C. In the present specification, the "glass transition temperature" may be referred to as "Tg". According to the above feature, it is possible to obtain a powdery and/or granular material having a low Tg. As a result, the resin composition which contains the resulting powdery and/or granular material can provide the cured product or a molded product each of which has excellent toughness. The Tg of the elastic body can be obtained by carrying out viscoelasticity measurement with use of a planar plate made of the elastic body. Specifically, the Tg can be measured as follows: (1) a graph of tan δ is obtained by carrying out dynamic viscoelasticity measurement with respect to a planar plate made of the fine polymer particles, with use of a dynamic viscoelasticity measurement device (for example, DVA-200, manufactured by IT Keisoku Seigyo Kabushikigaisha) under a tension condition; and (2) in the graph of tan δ thus obtained, the peak temperature of tan δ is regarded as the glass transition temperature. Note, here, that in a case where a plurality of peaks are found in the graph of tan δ, the lowest peak temperature is regarded as the glass transition temperature of the elastic body.

In view of prevention of a decrease in elastic modulus (i.e., a decrease in rigidity) of the resulting cured product, i.e., in view of obtainment of the cured product which has a sufficient elastic modulus (rigidity), the Tg of the elastic body is preferably higher than 0° C., more preferably not lower than 20° C., even more preferably not lower than 50° C., particularly preferably not lower than 80° C., most preferably not lower than 120° C.

The Tg of the elastic body can be determined by, for example, the composition of the structural unit contained in the elastic body. In other words, it is possible to adjust the Tg of the resulting elastic body, by changing the composition of the monomer used to produce (form) the elastic body.

Note, here, that monomers each of which, when polymerized to form a homopolymer (i.e., a polymer obtained by polymerizing only one type of monomer), provides a homopolymer having a Tg of higher than 0° C. will be referred to as a monomer group "a". Note also that monomers each of which, when polymerized to form a homopolymer (i.e., a polymer obtained by polymerizing only one type of monomer), provides a homopolymer having a Tg of lower than 0° C. will be referred to as a monomer group "b". Note also that an elastic body containing (i) one or more structural units derived from at least one type of monomer selected from the monomer group "a" in an amount of 50% by weight to 100% by weight (more preferably 65% by weight to 99% by weight) and (ii) one or more structural units derived from at least one type of monomer selected from the monomer group "b" in an amount of 0% by weight to 50% by weight (more preferably 1% by weight to 35% by weight) will be referred to as an elastic body X. The elastic body X has a Tg higher than 0° C. In a case where the elastic body includes the elastic body X, the resulting resin composition containing the powdery and/or granular material can provide the cured product which has sufficient rigidity.

Also in a case where the Tg of the elastic body is higher than 0° C., the crosslinked structure may be introduced in the elastic body. Examples of a method of introducing the crosslinked structure into the elastic body encompass the above-described methods.

Examples of the monomers which can be included in the monomer group "a" encompass, but are not limited to, unsubstituted vinyl aromatic compounds such as styrene and 2-vinyl naphthalene; vinyl-substituted aromatic compounds such as α-methyl styrene; ring-alkylated vinyl aromatic compounds such as 3-methylstyrene, 4-methylstyrene, 2,4-dimethylstyrene, 2,5-dimethylstyrene, 3,5-dimethylstyrene, and 2,4,6-trimethylstyrene; ring-alkoxylated vinyl aromatic compounds such as 4-methoxystyrene and 4-ethoxy styrene; ring-halogenated vinyl aromatic compounds such as 2-chlorostyrene and 3-chlorostyrene; ring-ester-substituted vinyl aromatic compounds such as 4-acetoxy styrene; ring-hydroxylated vinyl aromatic compounds such as 4-hydroxystyrene; vinyl esters such as vinyl benzoate and vinyl cyclohexanoate; vinyl halides such as vinyl chloride; aromatic monomers such as acenaphthalene and indene; alkyl methacrylates such as methyl methacrylate, ethyl methacrylate, and isopropyl methacrylate; aromatic methacrylates such as phenyl methacrylate; methacrylates such as isobornyl methacrylate and trimethylsilyl methacrylate; methacrylic acid derivative-containing methacryl monomers such as methacrylonitrile; certain types of acrylic acid esters such as isobornyl acrylate and tert-butyl acrylate; and acrylic acid derivative-containing acrylic monomers such as acrylonitrile. Examples of the monomers which can be included in the monomer group "a" further encompass monomers each of which, when polymerized, can provide a homopolymer having a Tg of not lower than 120° C., such as acrylamide, isopropyl acrylamide, N-vinylpyrrolidone, isobornyl methacrylate, dicyclopentanyl methacrylate, 2-methyl-2-adamanthyl methacrylate, 1-adamanthyl acrylate, and 1-adamanthyl methacrylate. These monomers "a" may be used alone or in combination of two or more.

Examples of monomers "b" encompass ethyl acrylate, butyl acrylate, 2-ethylhexyl acrylate, octyl (meth)acrylate, dodecyl (meth)acrylate, 2-hydroxyethyl acrylate, and 4-hydroxybutyl acrylate. These monomers "b" may be used alone or in combination of two or more. Out of these monomers "b", ethyl acrylate, butyl acrylate, and 2-ethylhexyl acrylate are particularly preferable.

(Volume-Average Particle Size of Elastic Body)

The elastic body has a volume-average particle size of preferably 0.03 μm to 50.00 μm, more preferably 0.10 μm to 10.00 μm, more preferably 0.15 μm to 2.00 μm, even more preferably 0.15 μm to 1.00 μm, still more preferably 0.20 μm to 0.80 μm, particularly preferably 0.20 μm to 0.50 μm. In a case where the volume-average particle size of the elastic body is not less than 0.03 μm, the elastic body which has a desired volume-average particle size can be stably obtained. In a case where the volume-average particle size of the elastic body is not more than 50.00 μm, the resulting cured product or the resulting molded product has favorable heat resistance and impact resistance. The volume-average particle size of the elastic body can be measured with use of a dynamic light scattering type particle size distribution measurement apparatus using, as a test specimen, an aqueous latex containing the elastic body. A method of measuring the volume-average particle size of the elastic body will be described later in detail in Examples.

(Proportion of Elastic Body)

The proportion of the elastic body contained in the fine polymer particles (A) is preferably 40% by weight to 97% by weight, more preferably 60% by weight to 95% by weight, even more preferably 70% by weight to 93% by weight, particularly preferably 75% by weight to 90% by weight, most preferably 80% by weight to 89% by weight, where 100% by weight represents the entirety of the fine polymer particles (A). In a case where the proportion of the elastic body is not less than 40% by weight, the resin composition containing the resulting powdery and/or granular material can provide a cured product which has excellent toughness and impact resistance. In a case where the proportion of the elastic body is not more than 97% by weight, the fine polymer particles (A) do not easily agglutinate and, therefore, the resin composition does not have a high viscosity, so that the resin composition containing the resulting powdery and/or granular material can be excellent in handling.

In particular, provided that the proportion of the elastic body in the fine polymer particles (A) is not less than 70% by weight where 100% by weight represents the total amount of the fine polymer particles (A), it is possible to more effectively prevent or reduce an increase in blend viscosity of the resulting resin composition containing the powdery and/or granular material, and possible to obtain a resin composition having low viscosity. Furthermore, when the proportion of the elastic body becomes too large, agglutination starts and the blend viscosity starts increasing again. Therefore, the proportion of the elastic body in the fine polymer particles (A) may be not more than 89% by weight.

(Gel Content of Elastic Body)

The elastic body is preferably one that can swell in an appropriate solvent but is substantially insoluble in the appropriate solvent. The elastic body is preferably insoluble in a thermosetting resin used.

The elastic body has a gel content of preferably not less than 60% by weight, more preferably not less than 80% by weight, even more preferably not less than 90% by weight, particularly preferably not less than 95% by weight. In a case where the gel content of the elastic body falls within the above range, the resulting resin composition containing the powdery and/or granular material can provide a cured product which has excellent toughness.

In the present specification, a method of calculating the gel content is as follows. First, an aqueous latex containing the fine polymer particles (A) is obtained. Next, a powdery and/or granular material of the fine polymer particles (A) is obtained from the aqueous latex. A method of obtaining the powdery and/or granular material of the fine polymer particles (A) from the aqueous latex is not limited to any particular one, and examples thereof encompass a method of obtaining the powdery and/or granular material of the fine polymer particles (A) by (i) causing the fine polymer particles (A) in the aqueous latex to agglutinate, (ii) dehydrating the agglutinate thus obtained, and (iii) further drying the agglutinate. Next, 2.0 g of the powdery and/or granular material of the fine polymer particles (A) is dissolved in 50 mL of methyl ethyl ketone (MEK). The MEK solution of the powdery and/or granular material thus obtained is separated into a part soluble in MEK (MEK-soluble part) and a part insoluble in MEK (MEK-insoluble part). Specifically, the obtained MEK solution of the powdery and/or granular material is subjected to centrifugal separation with use of a centrifugal separator (CP60E, manufactured by Hitachi Koki Co., Ltd.) at 30000 rpm for 1 hour, and thereby separated into the MEK-soluble part and the MEK-insoluble part. Note, here, that three sets of centrifugal separations are carried out in total. The weight of the MEK-soluble part and the weight of the MEK-insoluble part are measured, and then the gel content is calculated with use of the following expression.

Gel content (%)=(weight of methyl ethyl ketone insoluble part)/{(weight of methyl ethyl ketone insoluble part)+(weight of methyl ethyl ketone soluble part)}×100

(Variations of Elastic Body)

In one or more embodiments of the present invention, the "elastic body" of fine polymer particles (A) may contain, as structural units, a structural unit derived from butadiene and one or more structural units derived from at least one type of monomer copolymerizable with butadiene, and may be constituted by only one type of elastic body which contains only one type of structural unit. In one or more embodiments of the present invention, the elastic body may be constituted by plural types of elastic bodies which have structural units different from each other in composition.

In one or more embodiments of the present invention, a case where the "elastic body" of the fine polymer particles (A) is constituted by plural types of elastic bodies will be described. In this case, the plural types of elastic bodies will be referred to as an elastic body$_1$, an elastic body$_2$, . . . and an elastic body$_n$, respectively. Note, here, that "n" is an integer of 2 or more. The elastic body may include a mixture obtained by mixing the elastic body$_1$, the elastic body$_2$, . . . , and the elastic body$_n$ which are separately formed by polymerization. The "elastic body" of the fine polymer particles (A) may include a polymer obtained by forming the elastic body$_1$, the elastic body$_2$, . . . , and the elastic body$_n$ in order by polymerization. Forming a plurality of polymers (elastic bodies) by polymerization in order in this manner is also referred to as multistage polymerization. A polymer obtained by multistage polymerization of plural types of elastic bodies is also referred to as a multistage-polymerization elastic body. A method of producing a multistage-polymerization elastic body will be later described in detail.

A multistage-polymerization elastic body constituted by the elastic body$_1$, the elastic body$_2$, . . . and the elastic body$_n$ will be described. In the multistage-polymerization elastic body, the elastic body$_n$ can cover at least part of an elastic body$_{n-1}$ or the whole of the elastic body$_{n-1}$. In the multistage-polymerization elastic body, part of the elastic body$_n$ may be located inside the elastic body$_{n-1}$.

In the multistage-polymerization elastic body, the elastic bodies may form a layer structure. For example, in a case where the multistage-polymerization elastic body is constituted by the elastic body$_1$, the elastic body$_2$, and an elastic body$_3$, aspects of one or more embodiments of the present invention also include an aspect such that the elastic body$_1$ forms the innermost layer, a layer of the elastic body$_2$ is present on the outer side of the elastic body$_1$, and a layer of the elastic body$_3$ is present on the outer side of the layer of the elastic body$_2$ as the outermost layer of the elastic body. Thus, it can also be said that the multistage-polymerization elastic body in which the elastic bodies form a layer structure is a multilayered elastic body. In other words, in one or more embodiments of the present invention, the elastic body may include a mixture of plural types of elastic bodies, a multistage-polymerization elastic body, and/or a multilayered elastic body.

(1-1-2. Graft Part)

In the present specification, a polymer grafted to the elastic body is referred to as a graft part. The graft part is a polymer containing, as one or more structural units, one or more structural units derived from at least one type of monomer selected from the group consisting of aromatic vinyl monomers, vinyl cyanide monomers, and (meth)acrylate monomers. The graft part has the above feature, and therefore can play various roles. The "various roles" are, for example, (a) improving compatibility between the fine polymer particles (A) and a thermosetting resin, (b) improving the dispersibility of the fine polymer particles (A) in a thermosetting resin which is a matrix resin with which the fine polymer particles (A) are mixed, and (c) allowing the fine polymer particles (A) to be dispersed in the form of primary particles in a/the resin composition or in a cured product obtained from the resin composition.

Specific examples of the aromatic vinyl monomers encompass styrene, α-methylstyrene, p-methylstyrene, and divinylbenzene.

Specific examples of the vinyl cyanide monomers encompass acrylonitrile and methacrylonitrile.

Specific examples of the (meth)acrylate monomers encompass methyl (meth)acrylate, ethyl (meth)acrylate, butyl (meth)acrylate, hydroxyethyl (meth)acrylate, and hydroxybutyl (meth)acrylate.

The at least one type of monomer selected from the group consisting of aromatic vinyl monomers, vinyl cyanide monomers, and (meth)acrylate monomers may be used alone or in combination of two or more.

The graft part contains, as one or more structural units, structural unit(s) derived from aromatic vinyl monomer(s), structural unit(s) derived from vinyl cyanide monomer(s), and/or structural unit(s) derived from (meth)acrylate monomer(s) in an amount of preferably 10% by weight to 95% by weight in total, more preferably 30% by weight to 92% by weight in total, even more preferably 50% by weight to 90% by weight in total, particularly preferably 60% by weight to 87% by weight in total, most preferably 70% by weight to 85% by weight in total, with respect to 100% by weight (all) of the structural units.

The graft part preferably contains, as a structural unit, a structural unit derived from a reactive group-containing monomer. The reactive group-containing monomer is preferably a monomer containing at least one type of reactive group selected from the group consisting of epoxy group, oxetane group, hydroxy group, amino group, imide group, carboxylic acid group, carboxylic anhydride group, cyclic ester, cyclic amide, benzoxazine group, and cyanate ester group, and is more preferably a monomer containing at least one type of reactive group selected from the group consisting of epoxy group, hydroxy group, and carboxylic acid group. This feature makes it possible to allow the graft part of the fine polymer particles (A) and the thermosetting resin to be chemically bonded to each other in the resin composition. This makes it possible to keep the fine polymer particles (A) in a well dispersed state without agglutinating the fine polymer particles (A) in the resin composition or in a cured product obtained from the resin composition.

Specific examples of the monomer having epoxy group encompass glycidyl-group-containing vinyl monomers such as glycidyl (meth)acrylates, 4-hydroxybutyl (meth)acrylate glycidyl ethers, and allyl glycidyl ethers.

Specific examples of the monomer having hydroxy group encompass (i) hydroxy straight-chain alkyl (meth)acrylates (in particular, hydroxy straight chain C1-C6 alkyl(meth) acrylates) such as 2-hydroxyethyl (meth)acrylates, hydroxypropyl (meth)acrylates, and 4-hydroxybutyl (meth)acrylates, (ii) caprolactone-modified hydroxy (meth)acrylates, and (iii) hydroxyl-group-containing (meth)acrylates such as (a) hydroxy branching alkyl (meth)acrylates such as α-(hydroxymethyl) methyl acrylates and α-(hydroxymethyl) ethyl acrylates, and (b) mono (meth)acrylates of a polyester diol (particularly saturated polyester diol) obtained from a dicarboxylic acid (e.g. phthalic acid) and a dihydric alcohol (e.g. propylene glycol).

Specific examples of the monomer having carboxylic acid group encompass: monocarboxylic acids such as acrylic acid, methacrylic acid, and crotonic acid; and dicarboxylic acids such as maleic acid, fumaric acid, and itaconic acid. Any of the monocarboxylic acids is suitably used as the monomer having carboxylic acid group.

The above-listed reactive group-containing monomers may be used alone or in combination of two or more.

The graft part contains structural unit(s) derived from reactive group-containing monomer(s) in an amount of preferably 0.5% by weight to 90% by weight, more preferably 1% by weight to 50% by weight, even more preferably 2% by weight to 35% by weight, particularly preferably 3% by weight to 20% by weight, with respect to 100% by weight of the graft part. In a case where the graft part contains structural unit(s) derived from reactive group-containing monomer(s) in an amount of not less than 0.5% by weight with respect to 100% by weight of the graft part, the resulting resin composition containing the powdery and/or granular material has an advantage that the resin composition can provide a cured product which has sufficient impact resistance. In a case where the graft part contains structural unit(s) derived from reactive group-containing monomer(s) in an amount of not more than 90% by weight with respect to 100% by weight of the graft part, the resulting resin composition containing the powdery and/or granular material has advantages that (i) the resin composition can provide a cured product which has sufficient impact resistance and (ii) the resin composition has favorable storage stability.

The structural unit(s) derived from the reactive group-containing monomer(s) is preferably contained in the graft part, and more preferably contained only in the graft part.

The graft part may contain, as a structural unit, a structural unit derived from a polyfunctional monomer. In a case where the graft part contains a structural unit derived from a polyfunctional monomer, there are the following advantages, for example: (a) it is possible to prevent swelling of the fine polymer particles (A) in the resin composition; (b) since the resin composition has a low viscosity, the resin composition tends to have favorable handleability; and (c) the dispersibility of the fine polymer particles (A) in a thermosetting resin improves.

In a case where the graft part does not contain a structural unit derived from a polyfunctional monomer, the resulting resin composition containing the powdery and/or granular material can provide a cured product which has more excellent toughness and impact resistance, as compared to a case where the graft part contains a structural unit derived from a polyfunctional monomer.

Examples of a polyfunctional monomer which can be used to form the graft part by polymerization encompass the foregoing polyfunctional monomers. Out of such polyfunctional monomers, examples of a polyfunctional monomer which can be preferably used to form the graft part by polymerization encompass allyl methacrylate, ethylene glycol di(meth)acrylate, butanediol di(meth)acrylate, hexanediol di(meth)acrylate, cyclohexane dimethanol di(meth) acrylate, and polyethylene glycol di(meth)acrylates. The above-listed polyfunctional monomers may be used alone or in combination of two or more.

The graft part contains structural unit(s) derived from polyfunctional monomer(s) in an amount of preferably 1% by weight to 20% by weight, more preferably 5% by weight to 15% by weight, with respect to 100% by weight of the graft part.

In formation of the graft part by polymerization, the foregoing monomers may be used alone or in combination of two or more.

The graft part may contain, as a structural unit, a structural unit derived from another monomer, in addition to the structural unit(s) derived from the above-listed monomer(s).

In particular, the graft part preferably includes a polymer that contains, as a structural unit, a structural unit derived from a (meth)acrylate monomer. With this feature, the graft part is well compatible with a structural unit derived from butadiene included in the elastic body. This makes it possible to more effectively prevent or reduce an increase in blend viscosity of the resulting resin composition containing the powdery and/or granular material, and possible to obtain a resin compositing having low viscosity.

(Glass Transition Temperature of Graft Part)

The graft part has a glass transition temperature of preferably not higher than 190° C., more preferably not higher than 160° C., more preferably not higher than 140° C., more preferably not higher than 120° C., more preferably not higher than 80° C., more preferably not higher than 70° C., more preferably not higher than 60° C., more preferably not higher than 50° C., more preferably not higher than 40° C., more preferably not higher than 30° C., more preferably not higher than 20° C., more preferably not higher than 10° C., more preferably not higher than 0° C., more preferably not higher than −20° C., more preferably not higher than −40° C., more preferably not higher than −45° C., more preferably not higher than −50° C., more preferably not higher than −55° C., more preferably not higher than −60° C., more preferably not higher than −65° C., more preferably not higher than −70° C., more preferably not higher than −75° C., more preferably not higher than −80° C., more preferably not higher than −85° C., more preferably not higher than −90° C., more preferably not higher than −95° C., more preferably not higher than −100° C., more preferably not higher than −105° C., more preferably not higher than −110° C., more preferably not higher than −115° C., even more preferably not higher than −120° C., particularly preferably not higher than −125° C.

The glass transition temperature of the graft part is preferably not lower than 0° C., more preferably not lower than 30° C., more preferably not lower than 50° C., more preferably not lower than 70° C., even more preferably not lower than 90° C., particularly preferably not higher than 110° C.

The Tg of the graft part can be determined by, for example, the composition of the structural unit contained in the graft part. In other words, it is possible to adjust the Tg of the resulting graft part, by changing the composition of the monomer used to produce (form) the graft part.

The Tg of the graft part can be obtained by carrying out viscoelasticity measurement with use of a planar plate made of fine polymer particles. Specifically, the Tg can be measured as follows: (1) a graph of tan δ is obtained by carrying out dynamic viscoelasticity measurement with respect to a planar plate made of the fine polymer particles, with use of a dynamic viscoelasticity measurement device (for example, DVA-200, manufactured by IT Keisoku Seigyo Kabushiki-gaisha) under a tension condition; and (2) in the graph of tan δ thus obtained, the peak temperature of tan δ is regarded as the glass transition temperature. Note, here, that in a case where a plurality of peaks are found in the graph of tan δ, the highest peak temperature is regarded as the glass transition temperature of the graft part.

(Graft Rate of Graft Part)

In one or more embodiments of the present invention, the fine polymer particles (A) may have a polymer which is identical in composition to the graft part and which is not grafted to the foregoing elastic body. In the present specification, the polymer which is identical in composition to the graft part and which is not grafted to the elastic body may be referred to as a "non-grafted polymer". The non-grafted polymer corresponds to "free polymer (FP)", which will be described later. It can also be said that the non-grafted polymer is one that is not grafted to the foregoing elastic body, out of polymers produced during formation of the graft part by polymerization.

In the present specification, the proportion of (i) the polymer which is grafted to the foregoing elastic body to (ii) the polymers produced during the formation of the graft part by polymerization, i.e., the proportion of the graft part, is referred to as a "graft rate". In other words, the graft rate is a value represented by the following expression:

(weight of graft part)/{(weight of graft part)+(weight of non-grafted polymer)}×100.

The graft rate of the graft part is preferably not less than 80%, more preferably not less than 85%, even more preferably not less than 90%. In a case where the graft rate is not less than 80%, there is an advantage that the resin composition does not have an excessively high viscosity.

In the present specification, the graft rate is calculated by the following method. First, an aqueous latex containing the fine polymer particles (A) is obtained. Next, a powder of the fine polymer particles (A) is obtained from the aqueous latex. A specific example of a method of obtaining the powder of the fine polymer particles (A) from the aqueous latex is a method of obtaining the powder of the fine polymer particles (A) by (i) causing the fine polymer particles (A) in the aqueous latex to coagulate, (ii) dehydrating the coagulate thus obtained, and (iii) further drying the coagulate. Next, 2 g of the powder of the fine polymer particles (A) is dissolved in 50 mL of methyl ethyl ketone (MEK). The MEK solution of the powder thus obtained is separated into a part soluble in MEK (MEK-soluble part) and a part insoluble in MEK (MEK-insoluble part). Specifically, the obtained MEK solution of the powder is subjected to centrifugal separation with use of a centrifugal separator (CP60E, manufactured by Hitachi Koki Co., Ltd.) at 30000 rpm for 1 hour, and thereby separated into the MEK-soluble part and the MEK-insoluble part. Note, here, that three sets of centrifugal separations are carried out in total. Next, 20 ml of condensed MEK-soluble part is mixed with 200 ml of methanol, an aqueous calcium chloride obtained by dissolving 0.01 g of calcium chloride in water is added, and stirred for 1 hour. Then, the mixture is separated into a methanol-soluble part and a methanol-insoluble part. The amount of the methanol-insoluble part is used as the amount of free polymer (FP).

The graft rate is calculated with use of the following expression.

Graft rate (%)=100−[(amount of FP)/{(amount of FP)+(MEK-insoluble part)}]/(weight of polymer of graft part)×10000

Note that the weight of a polymer other than the graft part is the amount of monomer introduced for formation of the polymer other than the graft part. The polymer other than the graft part is, for example, the elastic body. In a case where the fine polymer particles (A) contain a surface-crosslinked polymer (described later), the polymer other than the graft part includes both the elastic body and the surface-crosslinked polymer. The weight of the polymer of the graft part is the amount of monomer introduced for formation of the polymer of the graft part. In calculation of the graft rate, a method of causing the fine polymer particles (A) to coagulate is not limited to any particular one, and a method in which a solvent is used, a method in which a coagulant is used, a method in which the aqueous latex is sprayed, or the like can be employed.

(Variations of Graft Part)

In one or more embodiments of the present invention, the graft part may be constituted by only one type of graft part which contains only one type of structural unit. In one or more embodiments of the present invention, the graft part may be constituted by plural types of graft parts which have structural units different from each other in composition.

A case where the graft part is constituted by plural types of graft parts in one or more embodiments of the present invention will be described. In this case, the plural types of graft parts will be referred to as a graft part$_1$, a graft part$_2$, . . . a graft part$_n$ ("n" is an integer of 2 or more). The graft part may include a complex of the graft part$_1$, the graft part$_2$ . . . , and the graft part$_n$ which are separately formed by polymerization. The graft part may include a polymer obtained by forming the graft part$_1$, the graft part$_2$, . . . , and the graft part$_n$ by multistage polymerization. A polymer obtained by multistage polymerization of plural types of graft parts is also referred to as a multistage-polymerization graft part. A method of producing a multistage-polymerization graft part will be later described in detail.

In a case where the graft part is constituted by the plural types of graft parts, all of the plural types of graft parts do not need to be grafted to the elastic body. It is only necessary that at least part of at least one of the plural types of graft parts be grafted to the elastic body. The other of the plural types of graft parts (the other types of graft parts) may be grafted to the at least one of the plural types of graft parts which is grafted to the elastic body. In a case where the graft part is constituted by the plural types of graft parts, the graft part may have plural types of polymers which are identical in composition to the plural types of graft parts and which are not grafted to the elastic body (plural types of non-grafted polymers).

The multistage-polymerization graft part constituted by the graft part$_1$, the graft part$_2$, . . . the graft part$_n$ will be described. In the multistage-polymerization graft part, the graft part$_n$ can cover at least part of a graft part$_{n-1}$ or the whole of the graft part$_{n-1}$. In the multistage-polymerization graft part, part of the graft part$_n$ may be located inside the graft part$_{n-1}$.

In the multistage-polymerization graft part, the graft parts may form a layer structure. For example, in a case where the multistage-polymerization graft part is constituted by the graft part$_1$, the graft part$_2$, and a graft part$_3$, aspects of one or more embodiments the present invention also include an aspect such that the graft part$_1$ forms the innermost layer of the graft part, a layer of the graft part$_2$ is present on the outer side of the graft part$_1$, and a layer of the graft part$_3$ is present on the outer side of the layer of the graft part$_2$ as the outermost layer. Thus, it can also be said that the multistage-polymerization graft part in which the graft parts form a layer structure is a multilayered graft part. In other words, in one or more embodiments of the present invention, the graft part may include a mixture of plural types of graft parts, a multistage-polymerization graft part, and/or a multilayered graft part.

In a case where the elastic body and the graft part are formed in this order by polymerization in production of the fine polymer particles (A), at least part of the graft part can cover at least part of the elastic body in the resulting fine polymer particles (A). The wording "the elastic body and the graft part are formed in this order by polymerization" can be reworded as follows: the elastic body and the graft part are subjected to multistage polymerization. It can also be said that the fine polymer particles (A) obtained by multistage polymerization of the elastic body and the graft part are a multistage polymer.

In a case where the fine polymer particles (A) are constituted by a multistage polymer, the graft part can cover at least part of the elastic body or the whole of the elastic body. In a case where the fine polymer particles (A) are constituted by a multistage polymer, part of the graft part may be located inside the elastic body.

In a case where the fine polymer particles (A) are constituted by a multistage polymer, the elastic body and the graft part may form a layer structure. For example, aspects of one or more embodiments of the present invention also include an aspect such that the elastic body is present as the innermost layer (also referred to as a core layer) and a layer of the graft part is present on the outer side of the elastic body as the outermost layer (also referred to as a shell layer). It can also be said that a structure in which the elastic body is present as a core layer and the graft part is present as a shell layer is a core-shell structure. It can also be said that the fine polymer particles (A) which contain the elastic body and the graft part which form a layer structure (core-shell structure) are constituted by a multilayered polymer or a core-shell polymer. In other words, in one or more embodiments of the present invention, the fine polymer particles (A) may be constituted by a multistage polymer and/or a multilayered polymer or a core-shell polymer. Note, however, that the fine polymer particles (A) are not limited to the above feature, provided that the graft part is grafted to the elastic body.

At least part of the graft part preferably covers at least part of the elastic body. In other words, at least part of the graft part is preferably present on the outermost side of the fine polymer particles (A).

(1-1-3. Surface-Crosslinked Polymer)

The fine polymer particles (A) preferably have a surface-crosslinked polymer in addition to the elastic body and the graft part grafted to the elastic body. The above feature (a) allows an improvement of an anti-blocking property in the production of the fine polymer particles (A) and (b) makes the dispersibility of the fine polymer particles (A) in a thermosetting resin more favorable. Reasons for these are not limited to any particular ones, but can be inferred as follows. By the surface-crosslinked polymer covering at least part of the elastic body, the exposed area of the elastic body of the fine polymer particles (A) is reduced. Consequently, the elastic body is less likely to adhere to another elastic body, and therefore the dispersibility of the fine polymer particles (A) is improved.

In a case where the fine polymer particles (A) have the surface-crosslinked polymer, the following effects can be further brought about: (a) an effect of reducing the viscosity of the present resin composition; (b) an effect of increasing the crosslinking density of the elastic body; and (c) an effect of increasing the graft efficiency of the graft part. Note that the crosslinking density of the elastic body means a degree of the number of crosslinked structures in the entirety of the elastic body.

The surface-crosslinked polymer is constituted by a polymer containing, as structural units, (i) a structural unit(s) derived from a polyfunctional monomer(s) in an amount of 30% by weight to 100% by weight and (ii) a structural unit(s) derived from vinyl-based monomer(s), other than the unit(s) derived from polyfunctional monomer(s), in an amount of 0% by weight to 70% by weight, which total 100% by weight.

Examples of the polyfunctional monomer which can be used to form the surface-crosslinked polymer by polymerization encompass the foregoing polyfunctional monomers. Out of such polyfunctional monomers, examples of a polyfunctional monomer which can be preferably used to form the surface-crosslinked polymer by polymerization encompass allyl methacrylate, ethylene glycol di(meth)acrylate, butylene glycol di(meth)acrylate (such as 1,3-butylene glycol dimethacrylate), butanediol di(meth)acrylate, hexanediol di(meth)acrylate, cyclohexane dimethanol di(meth)acrylate, and polyethylene glycol di(meth)acrylates. The above-listed polyfunctional monomers may be used alone or in combination of two or more.

The fine polymer particles (A) may contain the surface-crosslinked polymer which is formed by polymerization independently of formation of the rubber-containing graft copolymer by polymerization, or may contain the surface-crosslinked polymer which is formed together with the rubber-containing graft copolymer by polymerization. The fine polymer particles (A) may be a multistage polymer obtained by forming the elastic body, the surface-crosslinked polymer, and the graft part in this order by multistage polymerization. In any of these aspects, the surface-crosslinked polymer can cover at least part of the elastic body.

The surface-crosslinked polymer can also be regarded as part of the elastic body. In a case where the fine polymer particles (A) contain the surface-crosslinked polymer, the graft part may (a) be grafted to the elastic body other than the surface-crosslinked polymer, (b) be grafted to the surface-crosslinked polymer, or (c) be grafted to both the elastic body other than the surface-crosslinked polymer and the surface-crosslinked polymer. In a case where the fine polymer particles (A) contain the surface-crosslinked polymer, the above-described volume-average particle size of the elastic body means the volume-average particle size of the elastic body including the surface-crosslinked polymer.

A case will be described where the fine polymer particles (A) are a multistage polymer obtained by forming the elastic body, the surface-crosslinked polymer, and the graft part in this order by multistage polymerization (case D). In the case D, the surface-crosslinked polymer can cover part of the elastic body or the whole of the elastic body. In the case D, part of the surface-crosslinked polymer may be located inside the elastic body. In the case D, the graft part can cover part of the surface-crosslinked polymer or the whole of the surface-crosslinked polymer. In the case D, part of the graft part may be located inside the surface-crosslinked polymer. In the case D, the elastic body, the surface-crosslinked polymer, and the graft part may form a layer structure. For example, aspects of the present invention also include an aspect such that the elastic body is present as the innermost layer (core layer), a layer of the surface-crosslinked polymer is present on the outer side of the elastic body as an intermediate layer, and a layer of the graft part is present on the outer side of the surface-crosslinked polymer as the outermost layer (shell layer).

(1-2. Method of Producing Fine Polymer Particles (A))

The fine polymer particles (A) can be produced as follows: after an elastic body is formed by polymerization, the polymer which constitutes the graft part is graft polymerized to the elastic body in the presence of the elastic body.

The fine polymer particles (A) can be produced by a known method, for example, a method such as emulsion polymerization, suspension polymerization, or microsuspension polymerization. Specifically, the formation of the elastic body contained in the fine polymer particles (A), the formation of the graft part contained in the fine polymer particles (A) (graft polymerization), the formation of the surface-crosslinked polymer contained in the fine polymer particles (A) can be each achieved by a known method, for example, a method such as emulsion polymerization, suspension polymerization, or microsuspension polymerization. Out of these methods, emulsion polymerization may particularly be the method of producing the fine polymer particles (A), because it facilitates (i) compositional design of the fine polymer particles (A), (ii) industrial production, and (iii) obtainment of the aqueous latex of the fine polymer particles (A) which can be suitably used to produce the present resin composition. A method of producing the elastic body which can be contained in the fine polymer particles (A), a method of producing the graft part which can be contained in the fine polymer particles (A), and a method of producing the surface-crosslinked polymer which can be optionally contained in the fine polymer particles (A) will be described below.

(Method of Producing Elastic Body)

The elastic body can be produced by, for example, a method such as emulsion polymerization, suspension polymerization, or microsuspension polymerization. As the method of producing the elastic body, a method disclosed in, for example, WO 2005/028546 can be used.

The method of producing the elastic body in a case where the elastic body is constituted by plural types of elastic bodies (for example, an elastic body$_1$, an elastic body$_2$, . . . , an elastic body$_n$) will be described. In this case, the elastic body which is constituted by the plural types of elastic bodies may be produced in the following manner: the elastic body$_1$, the elastic body$_2$, . . . and the elastic body$_n$ are each formed individually by any of the above-described methods, and then these elastic bodies are mixed. Alternatively, the elastic body$_1$, the elastic body$_2$, . . . and the elastic body$_n$ may be formed in order by multistage polymerization to produce the elastic body which is constituted by the plural types of elastic bodies.

The multistage polymerization of the elastic bodies will be described in detail. For example, (1) the elastic body$_1$ is formed by polymerization, (2) next, the elastic body$_2$ is formed by polymerization in the presence of the elastic body$_1$ to obtain a two-stage elastic body$_{1+2}$, (3) subsequently, an elastic body$_3$ is formed by polymerization in the presence of the elastic body$_{1+2}$ to obtain a three-stage elastic body$_{1+2+3}$, and (4) after a similar process(es) is/are carried out, the elastic body$_n$ is formed by polymerization in the presence of an elastic body$_{1+2+ \ldots +(n-1)}$ to obtain a multi-stage-polymerization elastic body$_{1+2+ \ldots +n}$.

(Method of Producing Graft Part)

The graft part can be formed, for example, by polymerizing, by known radical polymerization, the monomer used to form the graft part. In a case where (a) the elastic body is obtained as an aqueous latex or (b) a fine polymer particle precursor containing the elastic body and the surface-crosslinked polymer is obtained as an aqueous latex, the graft part is preferably formed by emulsion polymerization. The graft part can be produced by a method disclosed in, for example, WO 2005/028546.

The method of producing the graft part in a case where the graft part is constituted by plural types of graft parts (for example, a graft part$_1$, a graft part$_2$, . . . , a graft part$_n$) will be described. In this case, the graft part which is constituted by the plural types of graft parts may be produced in the following manner: the graft part$_1$, the graft part$_2$, . . . and the graft part$_n$ are each formed individually by any of the above-described methods, and then these graft parts are mixed. Alternatively, the graft part$_1$, the graft part$_2$, . . . the graft part$_n$ may be formed in order by multistage polymerization to produce the graft part which is constituted by the plural types of graft parts.

The multistage polymerization of the graft parts will be described in detail. For example, (1) the graft part$_1$ is formed by polymerization, (2) next, the graft part$_2$ is formed by polymerization in the presence of the graft part$_1$ to obtain a two-stage graft part$_{1+2}$, (3) subsequently, a graft part$_3$ is formed by polymerization in the presence of the graft part$_{1+2}$ to obtain a three-stage graft part$_{1+2+3}$, and (4) after a similar process(es) is/are carried out, the graft part$_n$ is formed by polymerization in the presence of a graft part$_{1+2+ \ldots +(n-1)}$ to obtain a multistage-polymerization graft part$_{1+2+ \ldots +n}$.

In a case where the graft part is constituted by the plural types of graft parts, the fine polymer particles (A) may be produced as follows: the graft part which is constituted by the plural types of graft parts is formed by polymerization, and then these graft parts are graft polymerized to the elastic body. The fine polymer particles (A) may be produced as follows: in the presence of the elastic body, plural types of polymers which constitute the plural types of graft parts are formed in order by multistage graft polymerization with respect to the elastic body.

(Method of Producing Surface-Crosslinked Polymer)

The surface-crosslinked polymer can be formed by polymerizing, by known radical polymerization, the monomer used to form the surface-crosslinked polymer. In a case where the elastic body is obtained as an aqueous latex, the surface-crosslinked polymer is preferably formed by emulsion polymerization.

In a case where emulsion polymerization is employed as the method of producing the fine polymer particles (A), a known emulsifying agent (dispersion agent) can be used in the production of the fine polymer particles (A).

In a case where emulsion polymerization is employed as the method of producing the fine polymer particles (A), a pyrolytic initiator can be used in the production of the fine polymer particles (A). It is possible to use, as the pyrolytic initiator, a known initiator such as 2,2'-azobisisobutyronitrile, hydrogen peroxide, potassium persulfate, and/or ammonium persulfate, for example.

In the production of the fine polymer particles (A), a redox initiator can also be used. The redox initiator is an initiator which contains a combination of (a) a peroxide such as an organic peroxide and/or an inorganic peroxide and (b) as necessary a reducing agent such as sodium formaldehyde sulfoxylate and/or glucose, as necessary a transition metal salt such as iron (II) sulfate, as necessary a chelating agent such as disodium ethylenediaminetetraacetate, and/or as necessary a phosphorus-containing compound such as sodium pyrophosphate. Examples of the organic peroxide encompass t-butylperoxy isopropyl carbonate, paramenthane hydroperoxide, cumene hydroperoxide, dicumyl peroxide, t-butyl hydroperoxide, di-t-butyl peroxide, and t-hexyl peroxide. Examples of the inorganic peroxide encompass hydrogen peroxide, potassium persulfate, and ammonium persulfate.

Using the redox initiator makes it possible to (i) carry out polymerization even at a low temperature at which pyrolysis of the peroxide substantially does not occur and (ii) select a polymerization temperature from a wide range of temperatures. Thus, using the redox initiator is preferable. Out of redox initiators, organic peroxides such as cumene hydroperoxide, dicumyl peroxide, paramenthane hydroperoxide, and t-butyl hydroperoxide may be used as the redox initiator. The amount of the initiator used can be within a known range. In a case where the redox initiator is used, the amounts of, for example, the reducing agent used, the transition metal salt used, and the chelating agent used can be within known ranges.

In a case where, in the formation of the elastic body, the graft part, or the surface-crosslinked polymer by polymerization, a polyfunctional monomer is used to introduce a crosslinked structure into the elastic body, the graft part, or the surface-crosslinked polymer, a known chain transfer agent can be used in an amount within a known range. By using the chain transfer agent, it is possible to easily adjust the molecular weight and/or the degree of crosslinking of the resulting elastic body, the resulting graft part, or the resulting surface-crosslinked polymer.

In the production of the fine polymer particles (A), a surfactant can be further used, in addition to the above-described components. The type and the amount of the surfactant used are set within known ranges.

In the production of the fine polymer particles (A), conditions of polymerization such as polymerization temperature, pressure, and deoxygenation can be set within known ranges.

(1-3. Volume-Average Particle Size (Mv) of Fine Polymer Particles (A))

The volume-average particle size (Mv) of the fine polymer particles (A) is not less than 90 nm, because it is possible to obtain a resin composition which has a desired viscosity and which is highly stable. The fine polymer particles (A) have a volume-average particle size (Mv) of preferably 0.09 μm (90 nm) to 50.00 μm, more preferably 0.10 μm to 10.00 μm, more preferably 0.15 μm to 2.00 μm, even more preferably 0.15 μm to 1.00 μm, still more preferably 0.20 μm to 0.80 μm, particularly preferably 0.20 μm to 0.50 μm. In a case where the volume-average particle size (Mv) of the fine polymer particles (A) falls within the above range, there is also an advantage that the dispersibility of the fine polymer particles (A) in a matrix resin is favorable. Note that, in the present specification, the "volume-average particle size (Mv) of the fine polymer particles (A)" means the volume-average particle size of the primary particles of the fine polymer particles (A) unless otherwise mentioned. The volume-average particle size of the fine polymer particles (A) can be measured with use of a dynamic light scattering type particle size distribution measurement apparatus using, as a test specimen, an aqueous latex containing the fine polymer particles (A). The volume-average particle size of the fine polymer particles (A) will be described later in detail in Examples. The volume-average particle size of the fine polymer particles (A) can also be measured by (i) cutting a cured product or a molded product obtained from the resin composition, (ii) capturing an image of a cut surface with use of an electron microscope or the like, and (iii) using image data thus obtained (captured image). Note that there may be cases in which the particle size of the elastic body and the particle size of the fine polymer particles including the graft part are the same.

The particle-number-based distribution of the particle size of the fine polymer particles (A) in a thermosetting resin preferably has a full width at half maximum which is not less than 0.5 times and not more than 1 time the volume-average particle size, because the resin composition which has a low viscosity and is easy to handle is obtained.

Furthermore, the inventor of the present invention found, during the research, that the molecular weight of the graft part tends to increase as the particle size of the fine polymer particles (A) increases. A mechanism thereof is inferred to be as follows. As the particle size of the fine polymer particles (A) increases, the number of the fine polymer particles (A) decreases. It follows that the reaction speed during formation of the graft part decreases. This results in an increase in molecular weight of the graft part.

(1-4. Weight Average Molecular Weight of Polymer of Graft Part)

The polymer of the graft part has a weight-average molecular weight of not more than 200000, preferably not more than 180000, more preferably not more than 160000, even more preferably not more than 140000. When the weight-average molecular weight of the polymer of the graft part is within such a range, an increase in blend viscosity of the resin composition can be prevented or reduced.

The weight-average molecular weight of the polymer of the graft part can be calculated from the weight-average molecular weight of a polymer (non-grafted polymer) which is identical in composition to the graft part and which is not grafted to the foregoing elastic body, i.e., the weight-average molecular weight of a free polymer (FP) (described later). Specific method for calculation will be described later in detail in Examples.

A method for controlling the weight-average molecular weight of the polymer of the graft part within the above-stated range is not particularly limited. For example, the weight-average molecular weight of the polymer of the graft part can be adjusted, in the foregoing (Method of producing graft part), such that a predetermined molecular weight is achieved. Examples of the method encompass: a method involving forming a graft part by polymerization at an appropriate temperature; a method involving adding monomer at an appropriate speed; a method involving carrying out polymerization with an appropriate solid content concentration; a method involving carrying out polymerization using an appropriate type of initiator in an appropriate amount; and a method involving carrying out polymerization using an appropriate type of reducing agent in an appropriate amount. For example, the appropriate temperature can be 50° C. to 90° C. The appropriate speed is the following speed: not more than 40 parts are added per hour. The appropriate solid content concentration is not less than 25% and not more than 50%. The appropriate type of initiator in an appropriate amount is an initiator that shows a solubility of not less than 2 wt % at 20° C. in an amount of not less than 0.01 parts with respect to 100 parts of monomer. The appropriate type of reducing agent in an appropriate amount is sodium formaldehyde sulfoxylate in an amount of 0.5 times to 1.2 times the amount of the initiator in terms of mole.

(1-5. Free Polymer (FP))

The present powdery and/or granular material preferably further contains a free polymer (FP) that contains, as one or more structural units, one or more structural units derived from at least one type of monomer selected from the group consisting of aromatic vinyl monomers, vinyl cyanide monomers, and (meth)acrylate monomers.

It is noted here that the free polymer (FP) means a polymer that is not bound as a graft part to the fine polymer particles (A). The free polymer (FP) can be generated mainly during the production of the fine polymer particles (A). Specifically, a polymer not bound to the elastic body (such polymer is non-grafted polymer) is generated when the graft part is prepared during the process of producing the fine polymer particles (A). Such a polymer that is not grafted to the elastic body can become a free polymer (FP). Note that the free polymer (FP) is not limited to those generated during the process of producing the fine polymer particles (A), and a polymer added separately is also included in the free polymer (FP).

Furthermore, during the process of producing the graft part of the fine polymer particles (A), soluble components are also present in addition to the graft part and the free polymer (FP). The soluble components refer to monomers not polymerized and auxiliary materials such as an initiator.

Whether a substance is the polymer of the graft part, free polymer (FP), or a soluble component can be determined by, for example, a method involving (i) determining that the substance is the polymer of the graft part when the substance is insoluble in MEK and insoluble in methanol, (ii) determining that the substance is the free polymer (FP) when the substance is soluble in MEK but insoluble in methanol, and (iii) determining that the substance is a soluble component when the substance is soluble in methanol (such a method will be described in Examples).

The amount of the free polymer (FP) contained in 100% by weight of the present powdery and/or granular material is preferably not more than 8% by weight, more preferably not more than 6% by weight, even more preferably not more than 4% by weight, particularly preferably not more than 2% by weight. Provided that the amount of the free polymer (FP) is within such a range, when the powdery and/or granular material is added to a thermosetting resin, it is possible to prevent a significant increase in viscosity. Note that the lower limit of the amount of the free polymer (FP) is not particularly limited, and can be, for example, not less than 0.1% by weight.

Furthermore, the free polymer (FP) may include a polymer that contains, as a structural unit, a structural unit derived from a (meth)acrylate monomer. With this feature, the free polymer (FP) is well compatible with a structural unit derived from butadiene included in the elastic body. This makes it possible to more effectively prevent or reduce an increase in blend viscosity of the resulting resin composition containing the powdery and/or granular material, and possible to obtain a resin composition having low viscosity.

The features of the free polymer (FP) other than those described above are the same as those described in the section (1-1-2. Graft part) concerning the fine polymer particles (A), and therefore such descriptions apply and not repeated here.

(1-4. Resin (D))

The present powdery and/or granular material preferably further contains a resin (D). The resin (D) may be of the same type as or of a different type from a thermosetting resin (B) which is a matrix resin (described later) with which the powdery and/or granular material is to be mixed. It is preferable that the thermosetting resin (B) and the resin (D) do not undergo phase separation in the resin composition. The resin (D) is preferably a resin compatible with the thermosetting resin (B).

For example, assume a case where the resin (D) is used in a method of producing a resin composition and the resin (D) is of the same type as the thermosetting resin (B). In this case, it is not possible to distinguish between the thermosetting resin (B) and the resin (D) in the resulting resin composition containing the powdery and/or granular material. Therefore, the resulting resin composition containing the powdery and/or granular material appears to have only the thermosetting resin (B) in addition to the fine polymer particles (A). Next, assume a case where the resin (D) is used in a method of producing a resin composition and the resin (D) is of a different type from the thermosetting resin (B). In this case, it is possible to distinguish between the thermosetting resin (B) and the resin (D) in the resulting resin composition containing the powdery and/or granular material. In this case, the ultimately obtained resin composition containing the powdery and/or granular material can contain the resin (D) as a resin other than the thermosetting resin (B), in addition to the fine polymer particles (A). Furthermore, the present invention can also include cases where the resin (D) is identical to the foregoing free polymer (FP).

The resin (D) can be, for example, a thermoplastic resin, a thermosetting resin, or any combination of a thermosetting resin and a thermoplastic resin. In a case where the present powdery and/or granular material contains the resin (D), the resin (D) can have the effect of improving the dispersibility of the fine polymer particles (A) in a thermosetting resin.

Examples of the thermosetting resin in the resin (D) encompass various thermosetting resins described later in the section "Thermosetting resin (B)". As the resin (D), one type of thermosetting resin may be used or two or more types of thermosetting resins may be used in combination.

In a case where a matrix resin with which the resin composition is mixed is a thermosetting resin, the resin (D) is preferably of the same type as that of the thermosetting resin (B) which is the matrix resin, because such a resin (B) is less likely to affect various physical properties. That is, in a case where a thermosetting resin (B) which is a matrix resin is an epoxy resin, the resin (D) may be also an epoxy resin. In a case where the resin (D) is different in type from a thermosetting resin (B) which is a matrix resin, the resin (D) is preferably compatible with the thermosetting resin (B) which is the matrix resin.

Example of the thermoplastic resin in the resin (D) encompass polymers each containing, as one or more structural units, one or more structural units derived from at least one type of monomer selected from the group consisting of aromatic vinyl monomers, vinyl cyanide monomers, and (meth)acrylate monomers. In the resin (D), the thermoplastic resins may be used alone or in combination of two or more.

Examples of a thermoplastic resin that can be used encompass acrylic-based polymers, vinyl-based copolymers, polycarbonate, polyamides, polyesters, polyphenylene ether, polyurethane, and polyvinyl acetate. One of such thermoplastic resins may be used alone or in combination of two or more.

An acrylic-based polymer is a polymer that contains acrylate ester monomer as a main component. The ester portion of the acrylate ester monomer preferably has 1 to 20 carbon atoms. Examples of the acrylic-based polymer encompass: (a) homopolymers obtained from acrylate ester monomer; and (b) copolymers of (i) acrylate ester monomer and (ii) (a) monomer such as an unsaturated fatty acid, acrylamide-based monomer, maleimide-based monomer, or vinyl acetate or (b) a vinyl-based copolymer (such copolymers hereinafter may be referred to as acrylic-based copolymers).

Examples of the acrylate ester monomer encompass methyl acrylate (MA), ethyl acrylate (EA), 2-ethylhexyl acrylate (2EHA), acrylic acid (AA), methacrylic acid (MAA), 2-hydroxyethyl acrylate (2HEA), 2-hydroxyethyl methacrylate (2HEMA), butyl acrylate (BA), methyl methacrylate (MMA), ethyl methacrylate (EMA), n-butyl methacrylate (nBMA), isobutyl methacrylate (iBMA), propyl acrylate, isopropyl acrylate, isobutyl acrylate, t-butyl acrylate, neopentyl acrylate, isodecyl acrylate, lauryl acrylate, tridecyl acrylate, stearyl acrylate, cyclohexyl acrylate, isobornyl acrylate, tricyclodecynyl acrylate, hydroxyethyl acrylate, hydroxybutyl acrylate, hydroxypropyl acrylate, hydroxyethyl acrylate, 2-methoxyethyl acrylate, dimethylaminoethyl acrylate, chloroethyl acrylate, tryfluoroethyl acrylate, and tetrahydrofurfuryl acrylate. One of such acrylate ester monomers may be used alone or in combination of two or more.

In an acrylic-based copolymer, the ratio between (i) a structural unit (structural unit (a)) derived from the acrylate ester monomer and (i) structural unit(s) (structural unit (b)) derived from monomer(s) such as unsaturated fatty acid, acrylamide-based monomer, maleimide-based monomer, or vinyl acetate or from the vinyl-based copolymer is preferably as follows: the structural unit (a) is 50% by weight to 100% by weight; and the structural unit (b) is 0% by weight to 50% by weight.

The acrylic-based polymer contains a structural unit derived from butyl acrylate (BA) in an amount of preferably not less than 50% by weight, more preferably not less than 60% by weight, even more preferably not less than 70% by weight, particularly preferably not less than 80% by weight, most preferably not less than 90% by weight.

The vinyl-based copolymer is obtained by copolymerizing a vinyl-based monomer mixture containing at least one type selected from the group consisting of aromatic vinyl-based monomers, vinyl cyanide-based monomers, and/or unsaturated alkyl carboxylate ester-based monomers. The vinyl-based monomer mixture may further contain some other monomer (which may also be referred to as "monomer C") that is copolymerizable with the above listed monomer(s).

Examples of the aromatic vinyl-based monomers encompass styrene, α-methylstyrene, o-methylstyrene, m-methylstyrene, p-methylstyrene, t-butylstyrene, and vinyltoluene. One of such vinyl-based monomers may be used alone or in combination of two or more. Out of those listed above, aromatic vinyl monomers are preferred, styrene is more preferred, because such monomers make it possible to easily increase refractive index.

The unsaturated alkyl carboxylate ester-based monomer is not particularly limited, and is preferably, for example, an ester of a C1 to C6 alcohol and acrylic acid or methacrylic acid. The ester of a C1 to C6 alcohol and acrylic acid or methacrylic acid may further contain a substituent such as hydroxy group or halogen group.

Examples of the ester of a C1 to C6 alcohol and acrylic acid or methacrylic acid encompass methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 3-hydroxypropyl (meth)acrylate, 2,3,4,5,6-pentahydroxyhexyl (meth)acrylate, and 2,3,4,5-tetrahydroxypentyl (meth)acrylate. One of such esters may be used alone or in combination of two or more.

Examples of the vinyl cyanide-based monomers encompass acrylonitrile, methacrylonitrile, and ethacrylonitrile. One of such vinyl cyanide-based monomers may be used alone or in combination of two or more.

The monomer C is not particularly limited, provided that the monomer C is a vinyl-based monomer other than the foregoing aromatic vinyl-based monomer, unsaturated alkyl carboxylate ester-based monomer, and vinyl cyanide-based monomer and does not impair the effects of the present invention. Specific examples of the monomer C encompass unsaturated fatty acids, acrylamide-based monomers, maleimide-based monomers, vinyl acetate, and acrylate ester monomers. One of such monomers may be used alone or in combination of two or more.

An unsaturated fatty acid can be selected from, for example, itaconic acid, maleic acid, fumaric acid, butenoic acid, acrylic acid, methacrylic acid, and the like.

An acrylamide-based monomer can be selected from, for example, acrylamide, methacrylamide, and N-methylacrylamide.

A maleimide-based monomer can be selected from, for example, N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, and N-phenylmaleimide.

A method of producing the vinyl-based copolymer is not particularly limited, and is, for example, emulsion polymerization, suspension polymerization, mass polymerization, solution polymerization, or the like.

The method of producing the vinyl-based copolymer may involve using a polymerization initiator as necessary. The polymerization initiator can be at least one appropriately selected from the group consisting of, for example, peroxides, azo compounds, potassium persulfate, and the like. The amount of a polymerization initiator added is not particularly limited.

Examples of peroxides encompass benzoyl peroxide, cumene hydroperoxide, dicumyl peroxide, diisopropylbenzene hydroperoxide, t-butylhydroperoxide, t-butyl peroxyacetate, t-butyl peroxybenzoate, t-butyl isopropyl carbonate, di-t-butyl peroxide, t-butyl peroctoate, 1,1-bis(t-butylperoxy)3,3,5-trimethylcyclohexane, 1,1-bis(t-butylperoxy)cyclohexane, and t-butylperoxy-2-ethylhexanoate. Out of those listed above, cumene hydroperoxide, 1,1-bis(t-butylperoxy)3,3,5-trimethylcyclohexane, and 1,1-bis(t-butylperoxy)cyclohexane are particularly preferred.

Examples of azo compounds encompass azobisisobutyronitrile, azobis(2,4-dimethylvaleronitrile), 2-phenyl azo-2,4-dimethyl-4 -methoxyvaleronitrile, 2-cyano-2-propylazoformamide, 1,1'-azobiscyclohexane-1-carbonitrile, azobis (4-methoxy-2,4-dimethylvaleronitrile), dimethyl 2,2'-azobisisobutyrate, 1-t-butyl azo-2-cyanobutane, and 2-t-butyl azo-2-cyano-4-methoxy-4-methylpentane. Out of those listed above, 1,1'-azobiscyclohexane-1-carbonitrile is particularly preferred.

The amount of the polymerization initiator added is not particularly limited.

Specific examples of the vinyl-based copolymer encompass polyvinyl chloride, chlorinated polyvinyl chloride, polystyrene, styrene-acrylonitrile copolymers, styrene-acrylonitrile-N-phenylmaleimide copolymers, α-methylstyrene-acrylonitrile copolymers, poly(methyl methacrylate), and methyl methacrylate-styrene copolymers. One of such copolymers may be used alone or in combination of two or more.

Examples of polyesters encompass polyethylene terephthalate and polybutylene terephthalate.

(Others)

In the present specification, fats and oils as well as fatty acid esters are also included in the resin (D). Examples of the fats and oils which can be suitably used as the resin (D) encompass epoxidized fats and oils such as epoxidized soybean oil and epoxidized linseed oil. Commercially available epoxidized soybean oil can also be used, and examples thereof encompass ADK CIZER O-130P manufactured by ADEKA Co., Ltd. Examples of the fatty acid esters which can be suitably used as the resin (D) encompass epoxidized fatty acid esters such as epoxidized fatty acid butyl, epoxidized fatty acid 2-ethylhexyl, epoxidized fatty acid octyl ester, and epoxidized fatty acid alkyl ester.

The epoxidized fats and oils and the epoxidized fatty acid esters are sometimes referred to as epoxy-based plasticizers. That is, in the present specification, epoxy-based plasticizers are also included in the resin (D). Examples of the epoxy-based plasticizers, other than the epoxidized fats and oils and the epoxidized fatty acid esters, encompass diepoxystearyl epoxyhexahydrophthalate and epoxyhexahydro Di(2-ethylhexyl)phthalate.

The above-described thermosetting resins, thermoplastic resins, mixtures of the thermosetting resins and the thermoplastic resins, fats and oils, and fatty acid esters can be each used in admixture with an antioxidant. In the present specification, the antioxidant is regarded as part of the resin (D), as long as the antioxidant is used in admixture with each of the above-described substances. In a case where only the antioxidant is used, the antioxidant is not regarded as the resin (D).

The antioxidant is not limited to any particular one. Examples of the antioxidant encompass (a) primary antioxidants such as phenol-based antioxidants, amine-based antioxidants, lactone-based antioxidants, and hydroxylamine-based antioxidants and (b) secondary antioxidants such as sulfur-based antioxidants and phosphorus-based antioxidants.

Examples of the phenol-based antioxidants encompass hindered phenol-based antioxidants. Examples of the hindered phenol-based antioxidants encompass a compound having a hindered phenol structure or a semi-hindered phenol structure in its molecule. Commercially available phenol-based antioxidants can also be used, and examples thereof encompass Irganox 245 (manufactured by BASF Japan Ltd.).

The amine-based antioxidants are not limited to any particular ones, and a wide range of conventionally known amine-based antioxidants can be used. Specific examples of the amine-based antioxidants encompass a 2,2,4-trimethyl-1,2-dihydroquinoline polymer, 6-ethoxy-1,2-dihydro-2,2,4-trimethylquinoline, and a reaction product of diphenylamine and acetone, each of which is an amine-ketone-based compound.

The amine-based antioxidants also encompass aromatic amine compounds. Examples of the aromatic amine compounds encompass naphthylamine-based antioxidants, diphenylamine-based antioxidants, and p-phenylenediamine-based antioxidants.

The lactone-based antioxidants, the hydroxylamine-based antioxidants, and the sulfur-based antioxidants are not limited to any particular ones. A wide range of conventionally known lactone-based antioxidants, hydroxylamine-based antioxidants, and sulfur-based antioxidants can be used.

The phosphorus-based antioxidants are not limited to any particular ones, and a wide range of conventionally known phosphorus-based antioxidants can be used. Phosphoric acid and phosphoric ester, each of which contains active hydrogen, can adversely affect the storage stability of the resin composition which contains the resulting powdery and/or granular material, and can adversely affect the heat resistance of the cured product or the molded product provided by the resin composition. Therefore, as the phosphorus-based antioxidants, alkyl phosphite, aryl phosphite, alkyl aryl phosphite compounds, and the like which do not contain phosphoric acid or phosphoric ester in their molecules are preferable.

The antioxidant can be other conventionally known substance. Examples of such an antioxidant encompass various substances described in, for example, "*Sanka Boshizai Handobukku* (Antioxidant Handbook)" published by Taiseisha (the date of publication of the first edition: Oct. 25, 1976), "*Kobunshitenkazai handobukku* (Polymeric additive Handbook)" published by CMC Publishing Co., Ltd. (the author and editor: HARUNA, Toru, the date of publication of the first edition: Nov. 7, 2010), and the like.

The resin (B) is preferably at least one selected from the group consisting of the thermosetting resins, mixtures of the thermosetting resins and the antioxidants, the thermoplastic resins, mixtures of the thermoplastic resins and the antioxidants, the fats and oils, mixtures of the fats and oils and the antioxidants, the fatty acid esters, mixtures of the fatty acid esters and the antioxidants, epoxy curing agents, and mixtures of the epoxy curing agents and the antioxidants, more preferably at least one selected from the group consisting of epoxy resins, acrylic polymers, mixtures of the epoxy resins and the antioxidants, mixtures of the acrylic polymers and the antioxidants, and mixtures of the epoxy-based plasticizers and the antioxidants, still more preferably at least one selected from the group consisting of the mixtures of the epoxy resins and the antioxidants, the mixtures of the acrylic polymers and the antioxidants, and the mixtures of the epoxy-based plasticizers and the antioxidants, and particularly preferably any of the mixtures of the epoxy-based plasticizers and the antioxidants. According to the above feature, the resulting resin composition which contains the powdery and/or granular material has advantages that (a) it is possible to provide the cured product or the molded product each of which has excellent heat resistance and (b) it is possible to improve the dispersibility of the fine polymer particles (A) in a matrix resin.

(Physical Properties of Resin (D))

The resin (D) is not particularly limited in its properties, provided that the resin (D) is a liquid having a viscosity of 100 mPa·s to 1,000,000 mPa·s at 25° C., a semisolid, or a solid. Note that the wording "the resin (D) has a viscosity of 100 mPa·s to 1,000,000 mPa·s at 25° C." means that "the resin (D) which is at 25° C. has a viscosity of 100 mPa·s to 1,000,000 mPa·s".

In a case where the resin (D) is a liquid, the viscosity of the resin (D) is preferably not more than 750,000 mPa·s, more preferably not more than 700,000 mPa·s, more preferably not more than 500,000 mPa·s, more preferably not more than 350,000 mPa·s, more preferably not more than 300,000 mPa·s, more preferably not more than 250,000 mPa·s, more preferably not more than 100,000 mPa·s, more preferably not more than 75,000 mPa·s, more preferably not more than 50,000 mPa·s, more preferably not more than 30,000 mPa·s, more preferably not more than 25,000 mPa·s, even more preferably not more than 20,000 mPa·s, and particularly preferably not more than 15,000 mPa·s, at 25° C. According to the above feature, the resin (D) has an advantage of having excellent flowability.

The viscosity of the resin (D) is more preferably not less than 200 mPa·s, more preferably not less than 300 mPa·s, more preferably not less than 400 mPa·s, more preferably not less than 500 mPa·s, even more preferably not less than 750 mPa·s, still more preferably not less than 1000 mPa·s, and particularly preferably not less than 1500 mPa·s, at 25° C. According to the above feature, the resin (D) is not impregnated into the fine polymer particles (A). Therefore, the resin (D) allows prevention of fusion between the fine polymer particles (A).

The viscosity of the resin (D) is more preferably 100 mPa·s to 750,000 mPa·s, more preferably 100 mPa·s to 700,000 mPa·s, more preferably 100 mPa·s to 350,000 mPa·s, more preferably 100 mPa·s to 300,000 mPa·s, more preferably 100 mPa·s to 50,000 mPa·s, even more preferably 100 mPa·s to 30,000 mPa·s, and particularly preferably 100 mPa·s to 15,000 mPa s, at 25° C.

In a case where the resin (D) is a semisolid, it can be said that the resin (D) is a semiliquid, and it can be said that the resin (D) has a viscosity of more than 1,000,000 mPa·s. In a case where the resin (D) is a semisolid or a solid, the resulting resin composition which contains the powdery and/or granular material has an advantage of being less sticky and easy to handle.

The viscosity of the resin (D) can be measured by a viscometer. A method of measuring the viscosity of the resin (D) will be described later in detail in Examples.

The resin (D) has a weight-average molecular weight of preferably not more than 200000, more preferably not more than 180000, even more preferably not more than 160000, particularly preferably not more than 140000. Provided that the weight-average molecular weight is within such a range, it is possible to prevent or reduce an increase in blend viscosity of the resin composition.

The resin (D) is preferably a resin whose differential scanning calorimetry (DSC) thermogram shows an endothermic peak at 25° C. or below, more preferably a resin whose differential scanning calorimetry (DSC) thermogram shows an endothermic peak at 0° C. or below.

The amount of the resin (D) contained in the present powdery and/or granular material is as follows: the fine polymer particles (A) are contained in an amount of 50% by weight to 99% by weight and the resin (D) is contained in an amount of 1% by weight to 50% by weight, where 100% by weight represents the total amount of the fine polymer particles (A) and the resin (D). The amount of the resin (D) can be set as appropriate according to the type of resin (D), physical properties (solid, semisolid, liquid, viscosity, or the like) of the resin (D), and the like, provided that the amount of the resin (D) is within the above range and that a powdery and/or granular material can be obtained. In a case where the resin (D) is liquid at 25° C. and the amount of the resin (D) contained in the powdery and/or granular material is large, there may be cases where a powdery and/or granular material is not obtained. In a case where the resin (D) is liquid at 25° C. and the amount of the resin (D) contained in the powdery and/or granular material is large, the flowability (thinness) of the powdery and/or granular material may decrease.

The following description discusses the amount of the resin (D) contained in the present powdery and/or granular material, from the viewpoint of achieving excellent anti-blocking property. The fine polymer particles (A) are contained in an amount of 50% by weight to 99% by weight and the resin (D) is contained in an amount of 1% by weight to 50% by weight, where 100% by weight represents the total amount of the fine polymer particles (A) and the resin (D). In terms of achieving excellent anti-blocking property, the fine polymer particles (A) may be contained in an amount of 55% by weight to 99% by weight and the resin (D) be contained in an amount of 1% by weight to 45% by weight, or the fine polymer particles (A) may be contained in an amount of 60% by weight to 99% by weight and the resin (D) be contained in an amount of 1% by weight to 40% by weight, or the fine polymer particles (A) may be contained in an amount of 65% by weight to 99% by weight and the resin (D) be contained in an amount of 1% by weight to 35% by weight, or the fine polymer particles (A) may be contained in an amount of 70% by weight to 99% by weight and the resin (D) be contained in an amount of 1% by weight to 30% by weight, or the fine polymer particles (A) may be contained in an amount of 75% by weight to 99% by weight and the resin (D) be contained in an amount of 1% by weight to 25% by weight, or the fine polymer particles (A) may be contained in an amount of 80% by weight to 99% by weight and the resin (D) be contained in an amount of 1% by weight to 20% by weight, or the fine polymer particles (A) may be contained in an amount of 85% by weight to 99% by weight and the resin (D) be contained in an amount of 1% by weight to 15% by weight, or the fine polymer particles (A) may be contained in an amount of 90% by weight to 99% by weight and the resin (D) be contained in an amount of 1% by weight to 10% by weight, or the fine polymer particles (A) may be contained in an amount of 95% by weight to 99% by weight and the resin (D) be contained in an amount of 1% by weight to 5% by weight.

The following description discusses the amount of the resin (D) contained in the present powdery and/or granular material, from the viewpoint of achieving good dispersibility of the fine polymer particles (A) in a matrix resin. In a case where 100% by weight represents the total amount of the fine polymer particles (A) and the resin (D), the fine polymer particles (A) may be contained in an amount of 50% by weight to 97% by weight and the resin (D) be contained in an amount of 3% by weight to 50% by weight, or the fine polymer particles (A) may be contained in an amount of 50% by weight to 95% by weight and the resin (D) be contained in an amount of 5% by weight to 50% by weight, or the fine polymer particles (A) may be contained in an amount of 50% by weight to 92% by weight and the resin (D) be contained in an amount of 8% by weight to 50% by weight, or the fine polymer particles (A) may be contained in an amount of 50% by weight to 90% by weight and the resin (D) be contained in an amount of 10% by weight to 50% by weight, or the fine polymer particles (A) may be contained in an amount of 50% by weight to 87% by weight and the resin (D) be contained in an amount of 13% by weight to 50% by weight, or the fine polymer particles (A) may be contained in an amount of 50% by weight to 85% by weight and the resin (D) be contained in an amount of 15% by weight to 50% by weight, or the fine polymer particles (A) may be contained in an amount of 50% by weight to 82% by weight and the resin (D) be contained in an amount of 18% by weight to 50% by weight, or the fine polymer particles (A) may be contained in an amount of 50% by weight to 80% by weight and the resin (D) be contained in an amount of 20% by weight to 50% by weight, or the fine polymer particles (A) may be contained in an amount of 60% by weight to 80% by weight and the resin (D) be contained in an amount of 20% by weight to 40% by weight.

Powder that contains the fine polymer particles (A) and the resin (D), before subjected to drying or after subjected to drying, may be formed into granules such as pellets with use of an apparatus such as an extruder. When the powder is formed into pellets, some other resin may be mixed as necessary.

For the fine polymer particles (A) to be prevented from fusing together, in the transmission electron microscope (TEM) image of the present powdery and/or granular material, the number of domains in each of which the longitudinal dimension of the resin (D) may be not less than 1.5 times the average particle size of the fine polymer particles (A) is not more than five, may be not more than three, not more than one, or not more than zero. The phrase "the number of domains in each of which the longitudinal dimension of the resin (D) is not less than 1.5 times the average particle size of the fine polymer particles (A) is not more than zero in the transmission electron microscope (TEM) image" means that the transmission electron microscope (TEM) image contains no domains in each of which the longitudinal dimension of the resin (D) is not less than 1.5 times the average particle size of the fine polymer particles (A).

The "longitudinal dimension" of the resin (D) refers to the longest dimension (the longest straight line connecting two points on the periphery) in the TEM image. The "average particle size" of the fine polymer particles (A) refers to, for example, the average of diameters of virtual circles equal in area to the projections (such diameters are area-equivalent circle diameters) of randomly selected thirty fine polymer particles (A) in a TEM image.

The volume-average particle size (Mv) of the powdery and/or granular material is preferably 30 μm to 500 μm, more preferably 30 μm to 300 μm, even more preferably 50 μm to 300 μm, particularly preferably 100 μm to 300 μm. With this feature, the powdery and/or granular material is such that the fine polymer particles (A) are highly dispersible in a matrix resin. Furthermore, with the above feature, the powdery and/or granular material can provide a resin composition in which the fine polymer particles (A) are uniformly dispersed in a matrix resin, which has a desired viscosity, and which is highly stable. In the present specification, the volume-average particle size of the powdery and/or granular material is a value obtained by carrying out measurement using a laser diffraction particle size distribution analyzer (Microtrac MT3000II) manufactured by MicrotracBEL Corp.

The particle-number-based distribution of the volume-average particle size of the powdery and/or granular material preferably has a full width at half maximum which is not less than 0.5 times and not more than time the volume-average particle size, because of the following advantages: the resulting powdery and/or granular material is less likely to contain fine powder that is a possible cause of dust explosion or coarse particles that are poorly dispersed.

In terms of achieving anti-blocking property and improving the dispersibility in the thermosetting resin (B) which is a matrix resin, the present powdery and/or granular material preferably further contains an anti-blocking agent. The anti-blocking agent is not particularly limited, provided that the effect of one or more embodiments of the present invention is obtained. Examples of the anti-blocking agent encompass: (i) anti-blocking agents composed of inorganic fine particles, such as fine particles of silicon dioxide, titanium oxide, aluminum oxide, zirconium oxide, aluminum silicate, diatomaceous earth, zeolite, kaolin, talc, calcium carbonate, calcium phosphate, barium sulfate, or magnesium hydrosilicate; (ii) anti-blocking agents composed of organic fine particles; and (iii) fat-based and/or oil-based anti-blocking agents such as polyethylene wax, higher fatty acid amides, metal soap, and silicone oil. Out of such anti-blocking agents, anti-blocking agents composed of fine particles (inorganic fine particles or organic fine particles) are preferred, anti-blocking agents composed of organic fine particles are more preferred. The anti-blocking agent is particularly preferably an anti-blocking agent composed of organic fine particles of a polymer that contains, as one or more structural units, one or more structural units derived from at least one type of monomer selected from aromatic vinyl monomers, vinyl cyanide monomers, and (meth)acrylate monomers.

An anti-blocking agent composed of fine particles, in general, is in the form of a dispersion composed of the fine particles and a medium in which the particles are dispersed or is in the form of a colloid. The fine particles in the anti-blocking agent have a volume-average particle size (Mv) of usually not greater than 10 μm, preferably 0.05 μm to 10 μm. The amount of the anti-blocking agent with respect to the total weight of the powdery and/or granular material is preferably 0.01% by weight to 5.0% by weight, more preferably 0.5% by weight to 3.0% by weight.

The anti-blocking agent and other optional component(s) (described later) can be added as appropriate during any step of a method of production of the powdery and/or granular material. For example, the anti-blocking agent and other optional component(s) can be added to an aqueous suspension before or after flocculation of the fine polymer particles (A). Alternatively, the anti-blocking agent and other optional component(s) can be added by directly mixing with the fine polymer particles (A) or the powdery and/or granular material.

The powdery and/or granular material has an excellent anti-blocking property. In the present specification, the anti-blocking property of the powdery and/or granular material can be evaluated on the basis of a force required to break a block of the powdery and/or granular material. The powdery and/or granular material is preferably such that a force required to break a block of the powdery and/or granular material is not more than 30000 Pa. It is noted here that the block is a block obtained by applying a load of 6.3 kg to the powdery and/or granular material after allowed to stand at 60° C. for 2 hours by placing a 6.3 kg weight on 30 g of the powdery and/or granular material contained in a cylindrical container having a diameter of 50 mm. It is also noted that the force (force required to break the block of the powdery and/or granular material) is a value obtained by measurement using a rheometer.

[2. Method of Producing Powdery and/or Granular Material]

A method of producing a powdery and/or granular material in accordance with one or more embodiments of the present invention is not particularly limited, and any of various methods can be used. Note that a method of producing fine polymer particles (A) has been described earlier.

A method for controlling the amount of the free polymer (FP) within the above-stated range is not particularly limited. Examples of the method for controlling the amount of the free polymer (FP) encompass: a method involving forming a graft part by polymerization at an appropriate temperature; a method involving adding monomer at an appropriate speed; a method involving carrying out polymerization with an appropriate solid content concentration; a method involving carrying out polymerization using an appropriate type of initiator in an appropriate amount; and a method involving carrying out polymerization using an appropriate type of reducing agent in an appropriate amount. For example, the appropriate temperature can be 50° C. to 90° C. The appropriate speed is the following speed: not more than 40 parts are added per hour. The appropriate solid content concentration is not less than 25% and not more than 50%. The appropriate type of initiator in an appropriate amount is an initiator that shows a solubility of not less than 2 wt % at 20° C. in an amount of not less than 0.01 parts with respect to 100 parts of monomer. The appropriate type of reducing agent in an appropriate amount is sodium formaldehyde sulfoxylate in an amount of 0.5 times to 1.2 times the amount of the initiator in terms of mole.

Besides the above, a method of producing a powdery and/or granular material containing fine polymer particles (A) is, for example, (i) a method involving subjecting an aqueous latex state containing fine polymer particles (A) to salting out and thereby allowing the fine polymer particles (A) to flocculate, and then dehydrating and drying them, (ii) a method involving spray-drying the aqueous latex containing fine polymer particles (A), or the like method.

The present production method preferably further includes the step of mixing fine polymer particles (A) and the resin (D). The fine polymer particles (A) and the resin (D) can be mixed together by any of various methods. A method of mixing the fine polymer particles (A) and the resin (D) together is, for example, (1) a method involving directly adding the resin (D) to the fine polymer particles (A) during a polymerization step for the fine polymer particles (A), a method involving adding the resin (D) in the form of an aqueous latex to the fine polymer particles (A) during a polymerization step for the fine polymer particles (A), or a method involving adding the resin (D) in the form of a solution to the fine polymer particles (A) during a polymerization step for the fine polymer particles (A), (2) a method involving directly adding the resin (D) to an aqueous latex of the fine polymer particles (A), a method involving adding the resin (D) in the form of an aqueous emulsion to an aqueous latex of the fine polymer particles (A), or a method involving adding the resin (D) in the form of a solution to an aqueous latex of the fine polymer particles (A), (3) a method involving forming the resin (D) by polymerization in the presence of the fine polymer particles (A), or the like method. A method involving adding the resin (D) in the form of an aqueous emulsion to an aqueous latex of the fine polymer particles (A) is preferred.

Note that, with regard to the details of the production method other than those described above, those described in the section (1-2. Method of producing fine polymer particles (A)) can apply as appropriate.

An agglutinate containing the fine polymer particles (A) and the resin (D) and a powdery and/or granular material containing the fine polymer particles (A) and the resin (D) are preferably operated (handled) in the environment at a temperature lower than the glass transition temperature of the graft part of the fine polymer particles (A) throughout the production method. In other words, the time for which an agglutinate containing the fine polymer particles (A) and the resin (D) and a powdery and/or granular material containing the fine polymer particles (A) and the resin (D) are subjected to the environment at a temperature equal to or higher than the glass transition temperature of the graft part of the fine polymer particles (A) is preferably shorter, throughout the production method. With this feature, the resulting powdery and/or granular material is such that the fine polymer particles (A) are even more dispersible in a matrix resin. As a result, the resulting powdery and/or granular material can provide a resin composition in which the fine polymer particles (A) are more uniformly dispersed in the matrix resin.

Adjusting the following temperatures in the production method makes it possible to shorten the time (period) for which an agglutinate containing the fine polymer particles (A) and the resin (D) and a powdery and/or granular material containing the fine polymer particles (A) and the resin (D) are subjected to the environment at a temperature equal to or higher than the glass transition temperature of the graft part of the fine polymer particles (A): the temperature of an aqueous latex that contains the fine polymer particles (A); the temperature of an aqueous latex (to which a flocculant has not been added) that contains the fine polymer particles (A) and the resin (D); the temperature of an aqueous solution of a flocculant; the temperature of an aqueous latex that contains the fine polymer particles (A), the resin (D), and the flocculant; the temperature during a heating step; the temperature during a drying step; the temperature of rinse water during a rinsing step; and/or the like.

The temperature lower than the glass transition temperature of the graft part of the fine polymer particles (A) varies depending on the composition of the graft part, and is appropriately set according to the composition of the graft part. The agglutinate that contains the fine polymer particles (A) and the resin (D) and the powdery and/or granular material that contains the fine polymer particles (A) and the resin (D) are handled, throughout the production method, preferably in the environment at a temperature lower than 90° C., more preferably in the environment at a temperature lower than 80° C., even more preferably in the environment at a temperature lower than 70° C. That is, each of the foregoing temperatures is preferably lower than 90° C., more preferably lower than 80° C., more preferably lower than 70° C., more preferably lower than 60° C., more preferably loser than 50° C., even more preferably lower than 40° C.

[3. Resin Composition]

A resin composition in accordance with one or more embodiments of the present invention contains the foregoing powdery and/or granular material and a thermosetting resin (B). It is noted here that the thermosetting resin (B) is a so-called matrix resin. A resin composition in accordance with one or more embodiments of the present invention may be hereinafter simply referred to as a present resin composition.

(3-1. Thermosetting Resin (B))

The thermosetting resin (B) preferably includes at least one type of thermosetting resin selected from the group consisting of: resins each containing a polymer obtained by polymerization of an ethylenically unsaturated monomer; epoxy resins; phenolic resins; polyol resins; and amino-formaldehyde resins. Examples of the thermosetting resin also encompass resins each containing a polymer obtained by polymerization of an aromatic polyester raw material. Examples of the aromatic polyester raw material encompass aromatic vinyl compounds, (meth)acrylic acid derivatives, vinyl cyanide compounds, radical-polymerizable monomers such as maleimide compounds, dimethyl terephthalate, and alkylene glycol. These thermosetting resins may be used alone or in combination of two or more.

(Ethylenically Unsaturated Monomer)

The ethylenically unsaturated monomer is not limited to any particular one, provided that the ethylenically unsaturated monomer has at least one ethylenically unsaturated bond in its molecule.

Examples of the ethylenically unsaturated monomer encompass acrylic acid, α-alkyl acrylic acids, α-alkyl acrylic acid esters, β-alkyl acrylic acids, β-alkyl acrylic acid esters, methacrylic acid, esters of acrylic acid, esters of methacrylic acid, vinyl acetate, vinyl esters, unsaturated esters, polyunsaturated carboxylic acids, polyunsaturated esters, maleic acid, maleic acid esters, maleic anhydride, and acetoxy styrene. These ethylenically unsaturated monomers may be used alone or in combinations of two or more.

(Epoxy Resins)

The epoxy resins are not limited to any particular ones, provided that the epoxy resins each have at least one epoxy bond in its molecule.

Specific examples of the epoxy resins encompass bisphenol A epoxy resin, bisphenol F epoxy resin, bisphenol AD epoxy resin, bisphenol S epoxy resin, glycidyl ester type epoxy resin, glycidyl amine type epoxy resin, novolac type epoxy resin, glycidyl ether epoxy resin of bisphenol A propylene oxide adduct, hydrogenated bisphenol A (or F) epoxy resin, fluorinated epoxy resin, rubber-modified epoxy resin containing polybutadiene or NBR, flame-resistant epoxy resin such as glycidyl ether of tetrabromo bisphenol A, p-oxybenzoic acid glycidyl ether ester type epoxy resin, m-aminophenol type epoxy resin, diaminodiphenylmethane-based epoxy resin, urethane-modified epoxy resin containing urethane bond, various types of alicyclic epoxy resin, glycidyl ether of a polyhydric alcohol, hydantoin-type epoxy resin, epoxidized unsaturated polymer such as petroleum resin, and amino-containing glycidyl ether resin. Examples of the polyhydric alcohol encompass N,N-diglycidyl aniline, N,N-diglycidyl-o-toluidine, triglycidyl isocyanurate, polyalkylene glycol diglycidyl ether, and glycerin. Other examples of the epoxy resins encompass an epoxy compound obtained by causing an addition reaction between one of the above epoxy resins and e.g. a bisphenol A (or F) or a polybasic acid. The epoxy resins are not limited to these examples. Typically used epoxy resins can be used as the epoxy resins. These epoxy resins may be used alone or in combination of two or more.

Out of these epoxy resins, epoxy resins each of which has at least two epoxy groups in one molecule are preferable in that, e.g., such resins have high reactivity during curing of the resin composition and make it easy for an obtained cured product to create a three-dimensional mesh. In addition, out of the epoxy resins each of which has at least two epoxy groups in one molecule, epoxy resins each of which may contain a bisphenol type epoxy resin as a main component, because they are economical and easily available.

(Phenolic Resins)

The phenolic resins are not limited to any particular ones, provided that the phenolic resins are each a compound obtained through a reaction between a phenol and an aldehyde. The phenol is not limited to any particular one, and examples thereof encompass phenols such as phenol, ortho-cresol, meta-cresol, para-cresol, xylenol, para-tertiary butylphenol, para-octylphenol, para-phenylphenol, bisphenol A, bisphenol F, and resorcin. In particular, phenol and cresol are preferred as the phenol.

The aldehyde is not limited to any particular one, and examples thereof encompass formaldehyde, acetaldehyde, butylaldehyde, and acrolein, and mixtures thereof. Alternatively, substances which are sources of the above aldehydes or solutions of the above aldehydes can be used. The aldehyde is preferably formaldehyde because an operation for reacting the phenol and the aldehyde is easy.

The molar ratio (F/P) between the phenol (P) and the aldehyde (F) in a reaction between the phenol and the aldehyde (such a molar ratio may be hereinafter referred to as a "reaction molar ratio") is not limited to any particular one. In a case where an acid catalyst is used in the reaction, the reaction molar ratio (F/P) is preferably 0.4 to 1.0, more preferably 0.5 to 0.8. In a case where an alkali catalyst is used in the reaction, the reaction molar ratio (F/P) is preferably 0.4 to 4.0, more preferably 0.8 to 2.5. In a case where the reaction molar ratio is equal to or higher than the above lower limit, a yield is less likely to excessively decrease and the resulting phenolic resin is less likely to have a low molecular weight. On the contrary, in a case where the reaction molar ratio is equal to or lower than the above upper limit, the phenolic resin is less likely to have an excessively high molecular weight and an excessively high softening point, and it is therefore possible to achieve sufficient flowability during heating. Furthermore, in a case where the reaction molar ratio is equal to or lower than the above upper limit, the molecular weight is easily controlled, and gelation may be less likely to occur or a partially gelatinized product may be less likely to be formed, each of which results from the conditions under which the reaction takes place.

(Polyol Resins)

The polyol resins are each a compound containing two or more active hydrogens as its terminal group(s), and are each bi- or more functional polyol with a molecular weight of about 50 to 20,000. Examples of the polyol resins encompass aliphatic alcohols, aromatic alcohols, polyether type polyols, polyester type polyols, polyolefin polyols, and acrylic polyols.

The aliphatic alcohols may be dihydric alcohols or trihydric or higher polyhydric alcohols (such as trihydric alcohols or tetrahydric alcohols). Examples of the dihydric alcohols encompass: alkylene glycols (in particular, alkylene glycols having about 1 to 6 carbon atoms) such as ethylene glycol, propylene glycol, 1,3-propanediol, 1,3-butanediol, 1,4-butanediol, 1,5-pentanediol, 1,6-hexanediol, 3-methyl-1,5-pentanediol, and neopentylglycol; and substances obtained through dehydrogenative condensation of two or more molecules (e.g., about two to six molecules) of any of the above alkylene glycols (such as diethylene glycol, dipropylene glycol, and tripropylene glycol). Examples of the trihydric alcohols encompass glycerin, trimethylolpropane, trimethylolethane, and 1,2,6-hexanetriol (in particular, trihydric alcohols having about 3 to 10 carbon atoms). Examples of the tetrahydric alcohols encompass pentaerythritol and diglycerin. Other examples encompass saccharides such as monosaccharides, oligosaccharides, and polysaccharides.

Examples of the aromatic alcohols encompass: bisphenols such as bisphenol A and bisphenol F; biphenyls such as dihydroxybiphenyl; polyhydric phenols such as hydroquinone and phenol-formaldehyde condensate; and naphthalenediol.

Examples of the polyether type polyols encompass: random copolymers and block copolymers obtained by ring-opening polymerization of ethylene oxide, propylene oxide, butylene oxide, styrene oxide, or the like in the presence of one or more active-hydrogen-containing initiators; and mixtures of these copolymers. Examples of the active-hydrogen-containing initiators used for the ring-opening polymerization to obtain the polyether type polyols encompass diols such as ethylene glycol, diethylene glycol, propylene glycol, dipropylene glycol, 1,3-butanediol, 1,4-butanediol, 1,6-hexanediol, neopentylglycol, and bisphenol A; triols such as trimethylolethane, trimethylolpropane, and glycerin; saccharides such as monosaccharides, oligosaccharides, and polysaccharides; sorbitol; and amines such as ammonia, ethylenediamine, urea, monomethyl diethanolamine, and monoethyl diethanolamine.

Examples of the polyester type polyols encompass polymers obtained by, in the presence of an esterification catalyst at a temperature falling within the range of 150° C. to 270° C., polycondensation of, for example, (a) a polybasic acid, such as maleic acid, fumaric acid, adipic acid, sebacic acid, phthalic acid, dodecanedioic acid, isophthalic acid, or azelaic acid, and/or an acid anhydride thereof and (b) a polyhydric alcohol such as ethylene glycol, propylene glycol, 1,4-butanediol, 1,6-hexanediol, diethylene glycol, dipropylene glycol, neopentylglycol, or 3-methyl-1,5-pentanediol. Examples of the polyester type polyols further encompass (a) polymers obtained by ring-opening polymerization of ε-caprolactone, valerolactone, or the like; and (b) active hydrogen compounds containing two or more active hydrogens, such as polycarbonate diol and castor oil.

Examples of the polyolefin type polyols encompass polybutadiene polyol, polyisoprene polyol, and hydrogenated versions thereof.

Examples of the acrylic polyols encompass: copolymers of, for example, (a) a hydroxyl-containing monomer such as hydroxyethyl (meth)acrylate, hydroxybutyl (meth)acrylate, or vinylphenol and (b) a general-purpose monomer such as n-butyl (meth)acrylate or 2-ethylhexyl (meth)acrylate; and mixtures thereof.

Out of these polyol resins, the polyether type polyols are preferred, because the resulting resin composition containing the powdery and/or granular material has a lower viscosity and has excellent workability, and the resin composition can provide the cured product which is well balanced between its hardness and toughness. Further, out of these polyol resins, the polyester type polyols are preferred, because the resulting resin composition containing the powdery and/or granular material can provide the cured product which has excellent adhesiveness.

(Amino-Formaldehyde Resins)

The amino-formaldehyde resins are not limited to any particular ones, provided that the amino-formaldehyde resins are each a compound obtained through a reaction between an amino compound and an aldehyde in the presence of an alkaline catalyst. Examples of the amino compound encompass: melamine; 6-substituted guanamines such as guanamine, acetoguanamine, and benzoguanamine; amine-substituted triazine compounds such as CTU guanamine (3,9-bis[2-(3,5-diamino-2,4,6-triazaphenyl)ethyl]-2,4,8,10-tetraoxaspiro[5,5]undecane) and CMTU guanamine (3,9-bis[(3,5-diamino-2,4,6-triazaphenyl)methyl]-2,4,8,10-tetraoxaspiro[5,5]undecane); and ureas such as urea, thiourea, and ethyleneurea. Examples of the amino compound also encompass: substituted melamine compounds which are different from melamine in that the hydrogen of an amino group is substituted by an alkyl group, an alkenyl group, and/or a phenyl group (described in Specification of U.S. Pat. No. 5,998,573 (a Japanese family member thereof: Japanese Patent Application Publication Tokukaihei No. 9-143238)); and substituted melamine compounds which are different from melamine in that the hydrogen of an amino group is substituted by a hydroxyalkyl group, a hydroxyalkyloxyalkyl group, and/or an aminoalkyl group (described in Specification of U.S. Pat. No. 5,322,915 (a Japanese family member thereof: Japanese Patent Application Publication Tokukaihei No. 5-202157)). Out of the above-listed compounds, melamine, guanamine, acetoguanamine and benzoguanamine, which may be polyfunctional amino compounds, and may be melamine as the amino compound, because they are industrially produced and inexpensive. The above-listed amino compounds may be used alone or in combination of two or more. In addition to these amino compounds, any of (a) phenols, such as phenol, cresol, alkylphenol, resorcin, hydroquinone, and/or pyrogallol, (b) anilines, and the like may be used.

Examples of the aldehyde encompass formaldehyde, paraformaldehyde, acetaldehyde, benzaldehyde, and furfural. Preferred aldehydes are formaldehyde and paraformaldehyde, because they are inexpensive and well react with the foregoing amino compound. In producing an amino-formaldehyde resin, the aldehyde may be used in the following amount: the amount of an effective aldehyde group in the aldehyde compound is preferably 1.1 mol to 6.0 mol, particularly preferably 1.2 mol to 4.0 mol, per mole of the amino compound.

(Aromatic Polyester Raw Material)

Examples of the aromatic polyester raw material encompass aromatic vinyl compounds, (meth)acrylic acid derivatives, vinyl cyanide compounds, radical-polymerizable monomers such as maleimide compounds, dimethyl terephthalate, and alkylene glycol. In the present specification, the term "(meth)acrylic acid" refers to an acrylic acid and/or a methacrylic acid.

(Physical Properties of Thermosetting Resin (B))

The thermosetting resin (B) is not particularly limited in terms of the properties thereof. The thermosetting resin (B) preferably has a viscosity of 100 mPa·s to 1,000,000 mPa·s at 25° C. The viscosity of the thermosetting resin (B) is more preferably not more than 50,000 mPa·s, even more preferably not more than 30,000 mPa·s, and particularly preferably not more than 15,000 mPa·s, at 25° C. According to the above feature, the thermosetting resin (B) has an advantage of having excellent flowability. It can also be said that the thermosetting resin (B) having a viscosity of 100 mPa·s to 1,000,000 mPa·s at 25° C. is a liquid.

As the flowability of the thermosetting resin (B) becomes greater, in other words, as the viscosity of the thermosetting resin (B) becomes lower, it becomes more difficult to disperse, in the thermosetting resin (B), the fine polymer particles (A) in the form of primary particles. Conventionally, it has been extremely difficult to disperse, in the thermosetting resin having a viscosity of not more than 1,000,000 mPa·s at 25° C., the fine polymer particles (A) in the form of the primary particles. However, the resin composition in accordance with one or more embodiments of the present invention has an advantage that the fine polymer particles (A) having the above feature are well dispersed in the thermosetting resin (B) having a viscosity of not more than 1,000,000 mPa·s at 25° C.

Further, the viscosity of the thermosetting resin (B) is more preferably not less than 100 mPa·s, even more preferably not less than 500 mPa·s, still more preferably not less than 1000 mPa·s, and particularly preferably not less than 1500 mPa·s at 25° C., because such a viscosity allows the thermosetting resin to get between the fine polymer particles (A) and thereby allows prevention of fusion between the fine polymer particles (A).

The viscosity of the thermosetting resin (B) is more preferably 100 mPa·s to 750,000 mPa·s, more preferably 100 mPa·s to 700,000 mPa·s, more preferably 100 mPa·s to 350,000 mPa·s, more preferably 100 mPa·s to 300,000 mPa·s, more preferably 100 mPa·s to 50,000 mPa·s, even more preferably 100 mPa·s to 30,000 mPa·s, and particularly preferably 100 mPa·s to 15,000 mPa s, at 25° C.

The thermosetting resin (B) may have a viscosity of more than 1,000,000 mPa·s. The thermosetting resin (B) may be a semisolid (semiliquid) or may be alternatively a solid. In a case where the thermosetting resin has a viscosity of more than 1,000,000 mPa·s, the resulting resin composition containing the powdery and/or granular material has advantages that the resin composition is less sticky and easy to handle.

The thermosetting resin (B) has an endothermic peak at preferably not higher than 25° C., more preferably not higher than 0° C., in its differential scanning calorimetry (DSC) thermogram. According to the above feature, the thermosetting resin (B) has an advantage of having excellent flowability.

(3-2. Blending Ratio Between Powdery and/or Granular Material and Thermosetting Resin (B)

The blending ratio between the present powdery and/or granular material and the thermosetting resin (B) is as follows. In a case where the total amount of the powdery and/or granular material and the thermosetting resin (B) is regarded as 100% by weight, the amount of the powdery and/or granular material usually may be 0.5% by weight to 50% by weight and the amount of the thermosetting resin (B) be 50% by weight to 99.5% by weight, the amount of the powdery and/or granular material may be 1% by weight to 50% by weight and the amount of the thermosetting resin (B) be 50% by weight to 99% by weight, the amount of the powdery and/or granular material may be 1% by weight to 45% by weight and the amount of the thermosetting resin (B) be 55% by weight to 99% by weight, the amount of the powdery and/or granular material may be 1% by weight to 40% by weight and the amount of the thermosetting resin (B) be 60% by weight to 99% by weight, the amount of the powdery and/or granular material may be 1% by weight to 35% by weight and the amount of the thermosetting resin (B) be 65% by weight to 99% by weight, the amount of the powdery and/or granular material may be 1% by weight to 30% by weight and the amount of the thermosetting resin (B) be 70% by weight to 99% by weight, the amount of the powdery and/or granular material may be 1% by weight to 25% by weight and the amount of the thermosetting resin (B) be 75% by weight to 99% by weight, the amount of the powdery and/or granular material may be 1.5% by weight to 25% by weight and the amount of the thermosetting resin (B) be 75% by weight to 98.5% by weight, the amount of the powdery and/or granular material may be 1.5% by weight to 20% by weight and the amount of the thermosetting resin (B) be 80% by weight to 98.5% by weight, the amount of the powdery and/or granular material may be 2.5% by weight to 20% by weight and the amount of the thermosetting resin (B) be 80% by weight to 97.5% by weight.

The temperature at which the powdery and/or granular material is mixed with the thermosetting resin (B) is generally the temperature at which the thermosetting resin (B) can flow. However, in a case where the resin (D) can flow at the temperature at which the thermosetting resin (B) can flow, it is easy to uniformly mix the resin (D) and the thermosetting resin (B). On the contrary, in a case where the thermosetting resin (B) is a liquid and the resin (D) (e.g., an epoxy resin) contained in the powdery and/or granular material to be added to the thermosetting resin (B) is a solid, it is difficult to uniformly mix the thermosetting resin (B) and the powdery and/or granular material. Note that, in the present specification, in a case where the thermosetting resin (B) is a liquid at 25° C., it is understood that "the viscosity of the thermosetting resin (B) at 25° C. is equal to or higher than the viscosity of the resin (D) at 25° C.".

(3-3. Organic Solvent)

The present resin composition preferably contains substantially no organic solvents. In a case where the foregoing powdery and/or granular material contains substantially no organic solvents, it is possible to obtain a resin composition that contains substantially no organic solvents. The wording "contains substantially no organic solvents" means that the resin composition contains organic solvent(s) in an amount of not more than 100 ppm.

The amount of an organic solvent contained in the present resin composition (also referred to as a solvent content) is preferably not more than 100 ppm, more preferably not more than 50 ppm, even more preferably not more than 25 ppm, and particularly preferably not more than 10 ppm. It can also be said that the amount of an organic solvent contained in the present resin composition is the amount of a volatile component (other than water) contained in the present resin composition. The amount of an organic solvent (volatile component) contained in the present resin composition can be determined, for example, as follows. That is, a given amount of the resin composition is heated with use of a hot air dryer or the like, the weight of the resin composition is measured before and after heating, and the weight lost in the heating is regarded as the amount of the organic solvent. Alternatively, the amount of an organic solvent (volatile component) contained in the present resin composition can also be determined by gas chromatography. In a case where no organic solvents are used in production of the present resin composition and a powdery and/or granular material contained in the resin composition, the amount of an organic solvent contained in the obtained resin composition can be regarded as 0 ppm.

Examples of organic solvents substantially not contained in the present resin composition encompass (a) esters such as methyl acetate, ethyl acetate, propyl acetate, and butyl acetate, (b) ketones such as acetone, methyl ethyl ketone, diethyl ketone, and methyl isobutyl ketone, (c) alcohols such as ethanol, (iso)propanol, and butanol, (d) ethers such as tetrahydrofuran, tetrahydropyran, dioxane, and diethyl ether, (e) aromatic hydrocarbons such as benzene, toluene, and xylene, and (f) halogenated hydrocarbons such as methylene chloride and chloroform.

(3-4. Foreign Matter Level)

The foreign matter level, evaluated using a grind gauge, of the present resin composition is preferably not more than 100 μm, more preferably not more than 80 μm, even more preferably not more than 60 μm, even more preferably not more than 40 μm, even more preferably not more than 20 μm, most preferably 0 μm. When the foreign matter level is within the above-stated range, no foreign matter in the resin composition is present. The foreign matter level can be determined by a method described in the section (Dispersibility of fine polymer particles (A) in resin composition) in Examples.

(3-5. Other Optional Components)

The present resin composition may contain, as necessary, other optional component(s) which is different from the above-described components. Examples of the other optional component encompass: curing agents; coloring agents such as pigments and colorants; extenders; ultraviolet ray absorbing agents; antioxidants; heat stabilizers (antigelling agents); plasticizing agents; leveling agents; defoaming agents; silane coupling agents; antistatic agents; flame retardants; lubricants; viscosity reducers; shrinkage reducing agents; inorganic filler; organic filler; thermoplastic resins; desiccants; and dispersion agents.

The present resin composition may further contain a known thermosetting resin other than the thermosetting resin (B), and may further contain a known thermoplastic resin.

[4. Cured Product]

A cured product in accordance with one or more embodiments of the present invention is obtained by curing the present resin composition described in the section [3. Resin composition]. The cured product in accordance with one or more embodiments of the present invention is hereinafter also simply referred to as a present cured product.

The present cured product has the above-described feature, and therefore does not have high viscosity and is easily workable. Moreover, the present cured product has (a) an excellent surface appearance, (b) high rigidity and a high elastic modulus, and (c) excellent toughness and excellent adhesiveness.

[5. Adhesive Agent]

An adhesive agent in accordance with one or more embodiments of the present invention need only be a thermosetting structural adhesive agent that contains the foregoing present powdery and/or granular material, the foregoing thermosetting resin (B), and an inorganic filler (C). An adhesive agent in accordance with one or more embodiments of the present invention may be hereinafter simply referred to as a present adhesive agent. The present adhesive agent has the above feature, and is therefore advantageous in that the thixotropy (viscosity at low rotation speed/viscosity at high rotation speed) is unlikely to decrease and stringiness is unlikely to decrease.

Any of components known to be blended in a typical adhesive agent or adhesive composition can be suitably used as the inorganic filler (C). For example, inorganic filler for imparting heat resistance, thermal conductivity, flame retardancy, electrical conductivity, and/or the like can be added. Examples of the inorganic filler (C) encompass inorganic fillers such as: metal-based powder such as zinc oxide powder and titanium oxide powder; carbon black such as acetylene black; talc; glass powder; silica powder; conducting particles; and glass powdery substances. Such fillers may be used alone or in combination of two or more.

With regard to the blending proportions of the respective components, the present powdery and/or granular material may be contained in an amount of 1 part by mass to 100 parts by mass and the inorganic filler (C) be contained in an amount of 0.1 parts by mass to 100 parts by mass, with respect to 100 parts by mass of the thermosetting resin (B). Provided that the blending proportions are within the above range, good adhesive strength can be achieved.

The present adhesive agent can be suitably used in various applications such as automotive interior materials, general woodworking, furniture, interior decoration, wall materials, and food packaging.

The present adhesive agent exhibits favorable adhesiveness to various adherends such as cold-rolled steel, aluminum, fiberglass-reinforced polyester (FRP), panels made of cured products obtained by curing thermosetting resins (for example, epoxy resin) reinforced with carbon fibers, panels made of thermoplastic resin sheets reinforced with carbon fibers, sheet molding compounds (SMC), an acrylonitrile-butadiene-styrene copolymer (ABS), polyvinyl chloride (PVC), polycarbonate, polypropylene, TPO, wood, and glass.

The present adhesive agent has excellent adhesiveness and excellent plasticity not only at low temperatures (approximately −20° C.) to ordinary temperatures but also at high temperatures (approximately 80° C.). Therefore, the present adhesive agent can be more suitably used as an adhesive agent for structures.

The adhesive agent for structures which employs the present adhesive agent can be used as an adhesive agent for, for example, structural members in the fields of automobiles, cars (for example, shinkansen (bullet trains) and trains), civil engineering, construction, building materials, woodworking, electricity, electronics, aircrafts, space industry, and the like. Specific examples of automobile-related applications encompass: bonding of interior materials such as ceilings, doors, and seats; bonding of automotive luminaires such as lamps; and bonding of exterior materials such as body side molding.

The present adhesive agent can be produced from the present powdery and/or granular material or resin composition. A method of producing the present adhesive agent is not limited to any particular one, and a known method can be employed.

[6. Other Uses]

A powdery and/or granular material or resin composition in accordance with one or more embodiments of the present invention can be used in various applications, and the applications are not limited to any particular ones. The present powdery and/or granular material or resin composition is preferably used in applications such as, for example, coating materials, binders for reinforcement fibers, composite materials, resin concrete, molding materials for 3D printers, sealants, electronic substrates, ink binders, wood chip binders, binders for rubber chips, foam chip binders, binders for castings, rock mass consolidation materials for floor materials and ceramics, and urethane foams. Examples of the urethane foams encompass automotive seats, automotive interior parts, sound absorbing materials, damping materials, shock absorbers (shock absorbing materials), heat insulating materials, and floor material cushions for construction.

The present powdery and/or granular material or resin composition is more preferably used for, out of the above applications, coating materials, binders for reinforcement fibers, composite materials, molding materials for 3D printers, sealants, and electronic substrates.

(6-1. Coating Material)

A coating material in accordance with one or more embodiments of the present invention contains the above-described present powdery and/or granular material or resin composition. The coating material in accordance with one or more embodiments of the present invention has the above feature, and therefore can provide a coating film having excellent load-bearing property and excellent wear resistance.

The coating material in accordance with one or more embodiments of the present invention is also simply referred to as a present coating material.

The present coating material is, for example, a material that contains an organic solvent and the present powdery and/or granular material, in which the fine polymer particles (A) are dispersed in the form of primary particles in the organic solvent. The present coating material is, for example, a material that contains an organic solvent and the present resin composition, in which the fine polymer particles (A) are dispersed in the form of primary particles in the organic solvent. With conventional techniques, it is very difficult to disperse the fine polymer particles (A) in the form of primary particles in an organic solvent. In contrast, the present powdery and/or granular material is advantageous in that it can provide a coating material in which the polymer particles (A) are more uniformly dispersed in the organic solvent. The present powdery and/or granular material may be a powdery and/or granular material for a coating material.

In a case where the present coating material is applied to, for example, a floor or a corridor, a generally used application method can be employed. For example, after a primer is applied to a base material which has been subjected to surface preparation, the primer is uniformly coated with the present coating material with use of a trowel, a roller, a rake, a spray gun, and/or the like depending on conditions under which the primer is coated with the present coating material. After the primer is coated with the present coating material, curing of the present coating material proceeds, so that a good-performance coating is obtained. The coating film obtained by curing the present coating material can be a coating film having excellent load-bearing property and excellent wear resistance.

Depending on a method of applying the present coating material, the viscosity of a resin composition used for the coating material may be adjusted. For example, in a case where a trowel or a rake is used to apply the present coating material, the viscosity of the resin composition used for the present coating material can be adjusted to, generally, approximately 500 cps/25° C. to 9,000 cps/25° C. In a case where a roller or a spray is used to apply the present coating material, the viscosity of the resin composition used for the present coating material can be adjusted to, generally, approximately 100 cps/25° C. to 3,000 cps/25° C.

The base material (in other words, the material of the floor or the corridor) to which the present coating material is applied is not limited to any particular one. Specific examples of the base material encompass: (a) inorganic base materials such as concrete walls, concrete plates, concrete blocks, concrete masonry unit (CMU), mortar plates, autoclaved light-weight concrete (ALC) plates, gypsum boards (such as Dens Glass Gold manufactured by Georgia Pacific), and slate boards; (b) organic base materials such as wood-based base materials (such as wood, plywood, and oriented strand board (OSB)), asphalt, waterproof sheets made of modified bitumen, waterproof sheets made of ethylene-propylene-diene rubber (EPDM), waterproof sheets made of TPO, plastics, FRP, and urethane foam heat insulating materials; and (c) metal-based base materials such as metal panels.

A case will be described where the present coating material is applied to a metal base material or a porous base material. A laminate, obtained by applying and then curing the coating material, imparts excellent corrosion resistance to the base material. Furthermore, a coating film, obtained by applying and then curing the coating material, can impart excellent crack resistance and excellent load-bearing property to the base material. Therefore, a mode in which the present coating material is applied to a metal base or a porous base material is a particularly preferable mode.

A method of applying the present coating material is not limited to any particular one, and the present coating material can be applied by a known method such as a trowel, a rake, a brush, a roller, an air spray, and/or an airless spray.

Purposes of use of the present coating material are not particularly limited. Examples of the purposes of use encompass automobiles, electrical apparatuses, office equipment, construction materials, wood, coated floors, paving, heavy-duty anticorrosion, anticorrosion of concrete, waterproofing of rooftops and roofs, anticorrosion of rooftops and roofs, coating film waterproof materials for underground waterproofing, automotive refinishing, can coating, topcoat, intercoat, undercoat, primer, electro-deposition paint, highly weather resistant paint, non-yellowing paint, and the like. In a case where the present coating material is used for a coating material for coated floors, a coating material for paving, and the like, the present coating material can be used in factories, laboratories, warehouses, clean rooms, and the like.

The present coating material can be produced with use of the powdery and/or granular material or resin composition. A method of producing the present coating material is not limited to any particular one, and a known method can be employed.

(6-6-1. Film)

A film in accordance with one or more embodiments of the present invention contains the foregoing present powdery and/or granular material or resin composition. The film in accordance with one or more embodiments of the present invention has the above feature, and therefore has excellent load-bearing property and excellent wear resistance.

The film in accordance with one or more embodiments of the present invention is also simply referred to as a present film.

The present film is, for example, a film obtained by allowing an organic solvent to evaporate from a dope solution that contains the organic solvent and the present powdery and/or granular material. The present film is, for example, a film obtained by allowing an organic solvent to evaporate from a dope solution that contains the organic solvent and the present resin composition. In such dope solutions, the fine polymer particles (A) are dispersed in the form of primary particles in the organic solvent. With conventional techniques, it is very difficult to disperse the fine polymer particles (A) in the form of primary particles in an organic solvent. In contrast, the present powdery and/or granular material can provide a dope solution in which the fine polymer particles (A) are more uniformly dispersed in an organic solvent, and therefore is advantageous in that it can provide a film in which the fine polymer particles (A) are more uniformly dispersed. The present powdery and/or granular material may be a powdery and/or granular material for a film.

Purposes of use of the present film are not particularly limited. The present film can be used as an optical film such as a polarizer protective film, a decorative film, a conductive film, an electromagnetic wave absorption sheet, an antireflective film, and the like.

The present film can be produced with use of the present powdery and/or granular material or resin composition. A method of producing the present film is not particularly limited, and a known method can be used.

(6-2. Composite Material)

A composite material in accordance with one or more embodiments of the present invention contains, as a binder for reinforcement fibers, the above-described present powdery and/or granular material or resin composition. The composite material in accordance with one or more embodiments of the present invention has the above feature, and therefore has an advantage of having excellent toughness and excellent impact resistance.

The composite material in accordance with one or more embodiments of the present invention is also simply referred to as a present composite material.

The present composite material can contain reinforcement fibers. The reinforcement fibers are not limited to any particular ones. Example of the reinforcement fibers encompass glass fibers, continuous glass fibers, carbon fibers, natural fibers, metal fibers, thermoplastic resin fibers, boron fibers, aramid fibers, polyethylene fibers, and xyron-reinforced fibers. Out of these reinforcement fibers, glass fibers and carbon fibers are particularly preferable.

A method of producing the present composite material (molding method) is not limited to any particular one. Examples of the method encompass: an autoclave molding method in which a prepreg is used; a filament winding molding method; a hand lay-up molding method; a vacuum bag molding method; a resin transfer molding (RTM) method; a vacuum-assisted resin transfer molding (VARTM) method; a pultrusion molding method; an injection molding method, a sheet winding molding method; a spray up molding method; a bulk molding compound (BMC) method; and a sheet molding compound (SMC) method.

In particular, in a case where carbon fibers are used as the reinforcement fibers, an autoclave molding method in which a prepreg is used; a filament winding molding method; a hand lay-up molding method; a vacuum bag molding method; a resin transfer molding (RTM) method; a vacuum-assisted resin transfer molding (VARTM) method; or the like is preferably employed as the method of producing the present composite material.

Purposes of use of the present composite material are not particularly limited. Examples of the purposes of use encompass aircraft, spacecraft, automobiles, bicycles, watercraft, weapons, wind turbines, sports goods, containers, building materials, water-proof materials, printed circuit boards, and electrical insulating materials.

The present composite material can be produced with use of the present powdery and/or granular material or resin composition. In regard to further details of the reinforcement fibers, the production method (molding method), producing conditions (molding conditions), agents blended, uses, and the like concerning the present composite material, any of those disclosed in the following documents can be employed: United States Patent Application Publication No. 2006/0173128, United States Patent Application Publication No. 2012/0245286, Published Japanese Translation of PCT International Application, Tokuhyo, No. 2002-530445 (PCT International Application WO2000/029459), Japanese Patent Application Publication, Tokukaisho, No. 55-157620 (U.S. Pat. No. 4,251,428), Published Japanese Translation of PCT International Application, Tokuhyo, No. 2013-504007 (PCT International Application WO2011/028271), Japanese Patent Application Publication, Tokukai, No. 2007-125889 (United States Patent Application Publication No. 2007/0098997), and Japanese Patent Application Publication, Tokukai, No. 2003-220661 (United States Patent Application Publication No. 2003/0134085).

(6-3. Molding Material for 3D Printer)

A molding material for 3D printers in accordance with one or more embodiments of the present invention contains the above-described present powdery and/or granular material or resin composition. The molding material for 3D printers in accordance with one or more embodiments of the present invention has the above feature, and therefore has an advantage of having excellent toughness and excellent impact resistance.

The molding material for 3D printers in accordance with one or more embodiments of the present invention is also simply referred to as a present molding material.

Purposes of use of the present molding material are not particularly limited. Examples of the purposes of use encompass: goods made as samples for testing design, functions, and the like before making actual products; aircraft components, building components, and medical components.

The present molding material can be produced with use of the present powdery and/or granular material or resin composition. A method of producing the present molding material is not limited to any particular one, and a known method can be employed.

(6-4. Sealant)

A sealant in accordance with one or more embodiments of the present invention is obtained with use of the above-described present powdery and/or granular material or resin composition. The sealant in accordance with one or more embodiments of the present invention has the above feature, and therefore has an advantage of having excellent toughness and excellent impact resistance.

The sealant in accordance with one or more embodiments of the present invention is also simply referred to as a present sealant.

Purposes of use of the present sealant are not particularly limited. Examples of the purposes of use encompass sealing for use in electrical devices such as semiconductors and in power devices.

The present sealant can be produced with use of the present powdery and/or granular material or resin composition. A method of producing the present sealant is not limited to any particular one, and a known method can be employed.

(6-5. Electronic Substrate)

An electronic substrate in accordance with one or more embodiments of the present invention includes the above-described present powdery and/or granular material or resin composition. The electronic substrate in accordance with one or more embodiments of the present invention has the above feature, and therefore has an advantage of having excellent toughness and excellent impact resistance.

The electronic substrate in accordance with one or more embodiments of the present invention is also simply referred to as a present electronic substrate.

Purposes of use of the present electronic substrate are not particularly limited. Examples of the purposes of use encompass printed circuits, printed wiring, printed circuit boards, products provided with a printed circuit therein, printed wiring boards, and printed boards.

The present electronic substrate can be produced from the present resin composition with use of the present resin composition. A method of producing the present electronic substrate is not limited to any particular one, and a known method can be employed.

Embodiment 2

If living organisms such as barnacles attach themselves to an underwater structure such as a watercraft, issues arise in terms of lowered fuel efficiency and service life. To address this, generally an antifouling paint is applied to the underwater structure.

Various antifouling paints have been developed. For example, the foregoing Patent Literature 3 discloses an antifouling paint composition containing: a hydrolyzable resin that contains a silicon-containing group and a metal atom-containing group containing a divalent metal atom M; a thermoplastic resin; and/or a plasticizing agent.

Furthermore, the foregoing Patent Literature 4 discloses a paint composition that shows a solubility of not more than 15 g/L in artificial seawater at 23° C., that absorbs artificial seawater by not less than 0.01% by mass, and that contains organic polymer particles having a particle size of 0.05 μm to 100 μm.

However, the conventional technique as described above is not sufficient in terms of durability, and has room for further improvements.

Embodiment 2 of the present invention was made in view of the above issues, and was provided a novel antifouling paint composition for an underwater structure that can provide a highly durable coating film and a technique of using the antifouling paint composition.

The inventor of the present invention conducted diligent research in order to attain the above, and found that a highly durable coating film is obtained by employing an antifouling paint composition for an underwater structure that contains a binder resin and fine polymer particles. On the basis of this finding, the inventor accomplished the present invention.

Specifically, Embodiment 2 of the present invention includes the following.

[1] An antifouling paint composition for an underwater structure, containing a binder resin (E), fine polymer particles (A'), and a resin (D), in which: the fine polymer particles (A') contain a rubber-containing graft copolymer that includes an elastic body and a graft part grafted to the elastic body; the elastic body contains at least one selected from the group consisting of diene-based rubbers, (meth) acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the fine polymer particles (A') have a glass transition temperature of not higher than 80° C.; the resin (D) is a liquid which has a viscosity of 100 mPa·s to 1,000,000 mPa·s at 25° C., a semisolid, or a solid; and the antifouling paint composition contains the fine polymer particles (A') in an amount of 50% by weight to 99% by weight and the resin (D) in an amount of 1% by weight to 50% by weight, where 100% by weight represents a total amount of the fine polymer particles (A') and the resin (D).

[2] A method of producing an antifouling paint composition for an underwater structure, including: a powdery and/or granular material preparing step including obtaining a powdery and/or granular material which contains fine polymer particles (A') and a resin (D); and a mixing step including mixing a binder resin (E) and the powdery and/or granular material, in which: the fine polymer particles (A') contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the fine polymer particles (A') have a glass transition temperature of not higher than 80° C.; the resin (D) is a liquid which has a viscosity of 100 mPa·s to 1,000,000 mPa·s at 25° C., a semisolid, or a solid; and the antifouling paint composition contains the fine polymer particles (A') in an amount of 50% by weight to 99% by weight and the resin (D) in an amount of 1% by weight to 50% by weight, where 100% by weight represents a total amount of the fine polymer particles (A') and the resin (D).

Embodiment 2 of the present invention brings about the following effect: it is possible to provide an antifouling paint composition for an underwater structure that can provide a highly durable coating film and a technique of using the antifouling paint composition.

The following description will discuss Embodiment 2 of the present invention.

1. Technical Idea of Embodiment 2 of the Present Invention

The inventor of the present invention conducted diligent research, and found that the foregoing techniques disclosed in Patent Literatures 3 and 4 have the following issues.

The inventor of the present invention found the following issue on his own: paint applied to an underwater structure (coating film on an underwater structure) may undergo cracking due to long-term exposure to water, repetitive drying and wetting, and/or the like. Furthermore, a coating film made of an antifouling paint composition for an underwater structure typically has low strength, and is required to have improved strength. That is, paint applied to an underwater structure (coating film on an underwater structure) is required to have higher durability.

The inventor of the present invention conducted diligent research in order to solve the above issue, and found that the above issue can be solved by employing an antifouling paint composition for an underwater structure that contains a binder resin, fine polymer particles having specific features, and a resin. On the basis of this finding, the inventor accomplished the present invention.

Furthermore, the inventor of the present invention made the following finding. In an antifouling paint composition for an underwater structure, the degree of dispersion of fine polymer particles in a binder resin affects the durability of the coating film obtained from the antifouling paint composition for an underwater structure. Specifically, when the fine polymer particles are well dispersed in the binder resin, good durability would be achieved. Note that, in the present specification, the dispersion of fine polymer particles refers to the dispersion of fine polymer particles as primary particles.

It is very difficult to disperse a powdery and/or granular material containing fine polymer particles in a binder resin of an antifouling paint composition for an underwater structure. In view of this, the inventor of the present invention further conducted research in order to uniformly disperse the fine polymer particles in the binder resin. As a result, the inventor made the following novel finding: by blending a resin and the fine polymer particles with the binder resin, it is possible to uniformly disperse the fine polymer particles in the binder resin, and thus possible to improve the durability of the coating film obtained from the antifouling paint composition for an underwater structure.

2. Antifouling Paint Composition for Underwater Structure

An antifouling paint composition for an underwater structure, in accordance with one or more embodiments of the present invention, contains a binder resin (E), fine polymer particles (A'), and a resin (D). The fine polymer particles (A') contain a rubber-containing graft copolymer that includes an elastic body and a graft part grafted to the elastic body. The elastic body contains at least one selected from the group consisting of diene-based rubbers, (meth)acrylate-based rubbers, and organosiloxane-based rubbers. The graft part contains a polymer that contains, as one or more structural units, one or more structural units derived from at least one type of monomer selected from the group consisting of aromatic vinyl monomers, vinyl cyanide monomers, and (meth)acrylate monomers. The fine polymer particles (A') have a glass transition temperature of not higher than 80° C. The resin (D) is a liquid which has a viscosity of 100 mPa·s to 1,000,000 mPa·s at 25° C., a semisolid, or a solid. The antifouling paint composition contains the fine polymer particles (A') in an amount of 50% by weight to 99% by weight and the resin (D) in an amount of 1% by weight to 50% by weight, where 100% by weight represents the total amount of the fine polymer particles (A') and the resin (D). The "glass transition temperature" may be hereinafter referred to as "Tg". The "antifouling paint composition for an underwater structure" may be hereinafter referred to as "composition". The "antifouling paint composition for an underwater structure in accordance with one or more embodiments of the present invention" may be hereinafter referred to as "present composition". It is possible to form an antifouling coating film (coating film) on an underwater structure by applying the present composition on the underwater structure.

The present composition contains the fine polymer particles (A'), and is therefore advantageous in that it can provide a coating film having excellent durability. In the present specification, the phrase of "having excellent durability" means "having excellent strength and elongation". In other words, it can be said that the fine polymer particles (A') have the function of imparting strength and the property of elongating to the coating film obtained from the antifouling paint composition for an underwater structure. More specifically, the present composition can provide a coating film that is excellent in elongation, and therefore can provide a coating film that is not prone to cracks even in a case where the coating film undergoes long-term exposure to water, repetitive drying and wetting, and/or the like. The present composition can provide a coating film having excellent strength, and therefore can provide a conventionally-required, high-strength coating film. The strength and elongation of an antifouling paint composition for an underwater structure can be measured by carrying out a tensile test on the coating film obtained from the antifouling paint composition for an underwater structure. The tensile test will be described later in detail.

Furthermore, the inventor of the present invention made the following novel finding: since the present composition contains the fine polymer particles (A'), the present composition can provide a coating film with large contact angle and/or a coating film with low elastic modulus. It is inferred that, because a coating film with large contact angle is less prone to attachment of living organisms than a coating film with small contact angle, the coating film with large contact angle has a better antifouling property. Furthermore, it is inferred that, because living organisms attached to a coating film with low elastic modulus more easily detach from the coating film due to a flow of water as compared to a coating film with high elastic modulus, the coating film with low elastic modulus has a better antifouling property. That is, the present composition contains the fine polymer particles (A') and therefore is advantageous in that it can provide a coating film to which living organisms do not easily attach and/or a coating film from which the attached living organisms easily detach, i.e., a coating film having an excellent antifouling property. Note that one or more embodiments of the present invention are not limited by the above inference.

(2-1. Binder Resin (E))

A resin typically used in an antifouling paint composition for an underwater structure can be used as the binder resin (E). Examples of the binder resin (E) encompass hydrolyzable resins, resins decomposable by hydration, and silicone-type resins. A hydrolyzable resin means a resin that is decomposable via a reaction with water. A hydrolyzable resin may also be referred to as a self-polishing resin, a self-eroding resin, a self-decaying resin, or the like.

Examples of hydrolyzable resins encompass (a) acrylic resins such as silyl group-containing acrylic resins, metal-containing acrylic resins, and copolymers of a silyl group-containing acrylic resin and a metal-containing acrylic resin and (b) polyester resins. Examples of hydrolyzable resins also encompass acrylic resins, polyester resins, and hydrolyzable resins disclosed in PCT International Publication No. WO2005/116155, PCT International Publication No. WO2011/046086, and the like.

In a case where the binder resin (E) is a hydrolyzable resin, the resulting composition is considered to be capable of providing a coating film that has an even better antifouling property. The following is an inferred reason therefor. It is considered that living organisms such as barnacles attach themselves to the fine polymer particles (A') in the coating film. In a case where the binder resin (E) is a hydrolyzable resin, as the hydrolysis of the binder resin (E) proceeds, the fine polymer particles (A') in the coating film detach from the coating film. In this process, the living organisms attached to the fine polymer particles (A') can also detach from the coating film together with the fine polymer particles (A'). As a result, the coating film is less prone to attachment of living organisms. One or more embodiments of the present invention are not limited by such inference.

Examples of resins decomposable by hydration encompass vinyl chloride-vinyl acetate resins, vinyl chloride-vinyl isobutyl ether resins, vinyl methyl ether resins, and hydrophilic group-containing acrylic resins. A resin decomposable by hydration can also be referred to as a resin having affinity with sea water, and can also be referred to as a slightly soluble resin.

Examples of silicone-type resins encompass (a) organopolysiloxane, (b) organosilane and/or partially hydrolyzed and condensed versions thereof, disclosed in Japanese Patent No. 6487159, Japanese Patent Application Publication, Tokukai, No. 2019-055592, and the like.

A commercial product may be used as the binder resin (E). Examples of the commercial product encompass (a) product names "UNAGI TORYO ICHIBAN", "UNAGI TORYO ICHIBAN LF-sea", "UNAGI TORYO ICHIBAN AZAYAKA", "MANPAN", "LF-sea", "A-LF-sea", "ECOLOFLEX SPC", and "AQUA TERRACE" etc. manufactured by NIPPON PAINT MARINE COATINGS Co. Ltd. and (b) product names "SEAFLO NEO" series, "CMP BIOCLEAN" series, "SEA GRAND PRIX" series, "SEA PREMIER" series, and "SEA TENDER" series etc. manufactured by Chugoku Marine Paints, Ltd.

(2-2. Fine Polymer Particles (A'))

The fine polymer particles (A') contain a rubber-containing graft copolymer that includes an elastic body and a graft part grafted to the elastic body.

(2-2-1. Elastic Body)

The elastic body is not particularly limited, and may contain a natural rubber-based elastic body, a diene-based rubber-based elastic body, a (meth)acrylate-based rubber-based elastic body, a polysiloxane rubber-based elastic body, and/or the like. The elastic body may contain at least one selected from the group consisting of diene-based rubber-based elastic bodies, (meth)acrylate-based rubber-based elastic bodies, and polysiloxane rubber-based elastic bodies. The elastic body can also be referred to as rubber particle(s). In the present specification, a (meth)acrylate means an acrylate and/or a methacrylate. A polysiloxane rubber-based elastic body may also be referred to as an organosiloxane-based rubber.

A case where the elastic body contains a diene-based rubber (case A) will be described. In the case A, the resulting resin composition can provide a coating film which has excellent toughness and impact resistance and which shows a large contact angle. It can be said that a coating film that has excellent toughness and/or excellent impact resistance is a coating film that has excellent durability.

The diene-based rubber is an elastic body containing, as a structural unit, a structural unit derived from a diene-based monomer. The diene-based monomer can also be referred to as a conjugated diene-based monomer. In the case A, the diene-based rubber may contain (i) the structural unit derived from the diene-based monomer in an amount of 50% by weight to 100% by weight and (ii) a structural unit derived from a vinyl-based monomer, which is different from the diene-based monomer and which is copolymerizable with the diene-based monomer, in an amount of 0% by weight to 50% by weight, with respect to 100% by weight of structural units. In the case A, the diene-based rubber may contain, as a structural unit, a structural unit derived from a (meth)acrylate-based monomer in an amount smaller than the amount of the structural unit derived from the diene-based monomer.

Examples of the diene-based monomer encompass 1,3-butadiene, isoprene (2-methyl-1,3-butadiene), and 2-chloro-1,3-butadiene. These diene-based monomers may be used alone or in combination of two or more.

Examples of the vinyl-based monomer which is different from the diene-based monomer and which is copolymerizable with the diene-based monomer (hereinafter also referred to as vinyl-based monomer A) encompass: (a) vinyl arenes such as styrene, α-methylstyrene, monochlorostyrene, and dichlorostyrene; (b) vinyl carboxylic acids such as acrylic acid and methacrylic acid; (c) vinyl cyanides such as acrylonitrile and methacrylonitrile; (d) vinyl halides such as vinyl chloride, vinyl bromide, and chloroprene; (e) vinyl acetate; (f) alkenes such as ethylene, propylene, butylene, and isobutylene; and (g) polyfunctional monomers such as diallyl phthalate, triallyl cyanurate, triallyl isocyanurate, and divinylbenzene. These vinyl-based monomers A may be used alone or in combination of two or more. Out of these vinyl-based monomers A, styrene is particularly preferable.

In the case A, the diene-based rubber is preferably (i) butadiene rubber which is constituted by a structural unit derived from 1,3-butadiene (also referred to as polybutadiene rubber) or (ii) butadiene-styrene rubber which is a copolymer of 1,3-butadiene and styrene (also referred to as polystyrene-butadiene). According to the above feature, since the fine polymer particles (A') contain the diene-based rubber, a desired effect can be more brought about. The butadiene-styrene rubber is more preferable in that the butadiene-styrene rubber makes it possible to, by adjustment of refractive index, increase the transparency of the resulting coating film.

A case where the elastic body includes a (meth)acrylate-based rubber (case B) will be described. The case B allows wide-ranging polymer design for the elastic body by combinations of many types of monomers.

The (meth)acrylate-based rubber is an elastic body containing, as a structural unit, a structural unit derived from a (meth)acrylate-based monomer. In the case B, the (meth) acrylate-based rubber may contain (i) the structural unit derived from the (meth)acrylate-based monomer in an amount of 50% by weight to 100% by weight and (ii) a structural unit derived from a vinyl-based monomer, which is different from the (meth)acrylate-based monomer and which is copolymerizable with the (meth)acrylate-based monomer, in an amount of 0% by weight to 50% by weight, with respect to 100% by weight of structural units. In the case B, the (meth)acrylate-based rubber may contain, as a structural unit, a structural unit derived from a diene-based monomer in an amount smaller than the amount of the structural unit derived from the (meth)acrylate-based monomer.

Examples of the (meth)acrylate-based monomer encompass: (a) alkyl (meth)acrylates such as methyl (meth)acrylate, ethyl (meth)acrylate, butyl (meth)acrylate, 2-ethylhexyl (meth)acrylate, octyl (meth)acrylate, dodecyl (meth)acrylate, stearyl (meth)acrylate, and behenyl (meth)acrylate; (b) aromatic ring-containing (meth)acrylates such as phenoxyethyl (meth)acrylate and benzyl (meth)acrylate; (c) hydroxyalkyl (meth)acrylates such as 2-hydroxyethyl (meth)acrylate and 4 -hydroxybutyl (meth)acrylate; (d) glycidyl (meth)acrylates such as glycidyl (meth)acrylate and glycidyl alkyl (meth)acrylate; (e) alkoxy alkyl (meth)acrylates; (f) allyl alkyl (meth)acrylates such as allyl (meth) acrylate and allyl alkyl (meth)acrylate; and (g) polyfunctional (meth)acrylates such as monoethylene glycol di(meth) acrylate, triethylene glycol di(meth)acrylate, and tetraethylene glycol di(meth)acrylate. These (meth)acrylate-based monomers may be used alone or in combination of two or more. Out of these (meth)acrylate-based monomers, ethyl (meth)acrylate, butyl (meth)acrylate, and 2-ethylhexyl (meth)acrylate are preferred, and butyl (meth)acrylate is more preferred.

In the case B, the (meth)acrylate-based rubber is preferably at least one selected from the group consisting of ethyl (meth)acrylate rubbers, butyl (meth)acrylate rubbers, and 2-ethylhexyl (meth)acrylate rubbers, and is more preferably a butyl (meth)acrylate rubber. An ethyl (meth)acrylate rubber is a rubber composed of structural units derived from ethyl (meth)acrylate(s), a butyl (meth)acrylate rubber is a rubber composed of structural units derived from butyl (meth)acrylate(s), and a 2-ethylhexyl (meth)acrylate rubber is a rubber composed of structural units derived from 2-ethylhexyl (meth)acrylate(s). With the above feature, the Tg of the elastic body is low, and therefore there is an advantage in that the resulting fine polymer particles (A') and a mixture of the resulting fine polymer particles (A') and a resin (D) (described later) have low elastic modulus.

Examples of the vinyl-based monomer which is different from the (meth)acrylate-based monomer and which is copolymerizable with the (meth)acrylate-based monomer (hereinafter also referred to as vinyl-based monomer B) encompass the monomers listed as the examples of the vinyl-based monomer A. Such vinyl-based monomers B may be used alone or in combination of two or more. Out of such vinyl-based monomers B, styrene is particularly preferable.

A case where the elastic body includes a polysiloxane rubber-based elastic body (case C) will be described. In the case C, the resulting resin composition can provide a coating film which has sufficient heat resistance and excellent impact resistance at low temperatures. In the case (C), the fine polymer particles (A') and a mixture of the fine polymer particles (A') and the resin (D) are advantageous in that the contact angle is large. Therefore, the composition obtained in the case C can provide a coating film that shows a large contact angle.

Examples of the polysiloxane rubber-based elastic body encompass (a) polysiloxane-based polymers composed of alkyl or aryl disubstituted silyloxy units, such as dimethylsilyloxy, diethylsilyloxy, methylphenylsilyloxy, diphenylsilyloxy, and dimethylsilyloxy-diphenylsilyloxy, and (b) polysiloxane-based polymers composed of alkyl or aryl monosubstituted silyloxy units, such as organohydrogensilyloxy in which some of sidechain alkyls have been substituted with hydrogen atoms. These polysiloxane-based polymers may be used alone or in combination of two or more.

In the present specification, a polymer composed of dimethylsilyloxy unit is referred to as a dimethylsilyloxy rubber, a polymer composed of methylphenylsilyloxy unit is referred to as a methylphenylsilyloxy rubber, and a polymer composed of dimethylsilyloxy unit and diphenylsilyloxy unit is referred to as a dimethylsilyloxy-diphenylsilyloxy rubber. In the case C, the polysiloxane rubber-based elastic body is preferably (a) at least one selected from the group consisting of dimethylsilyloxy rubbers, methylphenylsilyloxy rubbers and dimethylsilyloxy-diphenylsilyloxy rubbers, because the resulting composition can provide a coating film which has excellent heat resistance, and is more preferably (b) a dimethylsilyloxy rubber because it can be easily acquired and is economical.

In the case C, the fine polymer particles (A') may contain a polysiloxane rubber-based elastic body in an amount of not less than 80% by weight, more preferably not less than 90% by weight, with respect to 100% by weight of the elastic body contained in the fine polymer particles (A'). With this feature, the resulting composition can provide a coating film that has excellent heat resistance.

In one or more embodiments of the present invention, the elastic body is preferably at least one selected from the group consisting of butadiene rubbers, butadiene-styrene rubbers, butadiene-(meth)acrylate rubbers, ethyl (meth)acrylate rubbers, butyl (meth)acrylate rubbers, 2-ethylhexyl (meth)acrylate rubbers, dimethylsilyloxy rubbers, methylphenylsilyloxy rubbers, and dimethylsilyloxy-diphenylsilyloxy rubbers, and is more preferably at least one selected from the group consisting of butadiene rubbers, butadiene-styrene rubbers, butyl (meth)acrylate rubbers, and dimethylsilyloxy rubbers.

(Crosslinked Structure of Elastic Body)

The elastic body preferably has a crosslinked structure introduced therein, because stable dispersion of the fine polymer particles (A') in the binder resin (E) can be maintained. A method of introducing a crosslinked structure to the elastic body is the same as that described in Embodiment 1. The foregoing description applies and only a difference from that in Embodiment 1 is described here. Note that the “matrix resin” and “thermosetting resin” in Embodiment 1 are each read as “binder resin (E)”.

Examples of a method of introducing the crosslinked structure into the polysiloxane rubber-based elastic body encompass: (a) a method that involves also partially using a polyfunctional alkoxysilane compound together with another material during formation of the polysiloxane rubber-based elastic body by polymerization; (b) a method that involves introducing into the polysiloxane rubber-based elastic body a reactive group such as a reactive vinyl group or a mercapto group, thereafter adding e.g. an organic peroxide or a polymerizable vinyl monomer, and carrying out a radical reaction; and (c) a method that involves, during formation of the polysiloxane rubber-based elastic body by polymerization, mixing a crosslinking monomer(s), such as a polyfunctional monomer and/or a mercapto group-containing compound, together with another material and then carrying out polymerization.

(Glass Transition Temperature of Elastic Body)

The glass transition temperature of the elastic body is the same as that described in Embodiment 1. The foregoing description applies and only a difference from that in Embodiment 1 is described here. With this feature, it is possible to obtain fine polymer particles (A') having low Tg and a mixture of the fine polymer particles (A') and the resin (D) (described later) having low Tg. As a result, the mixture of the fine polymer particles (A') and the resin (D) is advantageous in that the mixture has low elastic modulus and high elongation (excellent elongation). As a result, the resulting composition can provide a coating film having excellent toughness, a coating film having low elastic modulus, and/or a coating film having excellent elongation.

(Volume-Average Particle Size of Elastic Body)

The volume-average particle size of the elastic body is the same as that described in Embodiment 1. The foregoing description applies, and descriptions for the volume-average particle size of the elastic body are omitted here.

(Proportion of Elastic Body)

The proportion of the elastic body is the same as that described in Embodiment 1. The foregoing description applies, and descriptions for the proportion of the elastic body are omitted here.

(Gel Content of Elastic Body)

The gel content of the elastic body is the same as that described in Embodiment 1. The foregoing description applies and only a difference from that in Embodiment 1 is described here. The elastic body is preferably insoluble in the binder resin (E) used.

(Variations of Elastic Body)

Variations of the elastic body are the same as those described in Embodiment 1. The foregoing description applies and only a difference from that in Embodiment 1 is described here. In one or more embodiments of the present invention, the “elastic body” of the fine polymer particles (A') is, for example, one type of elastic body selected from the group consisting of diene-based rubber-based elastic bodies, (meth)acrylate-based rubber-based elastic bodies, and polysiloxane rubber-based elastic bodies, and may be composed only of one type of elastic body containing only one type of structural unit.

In one or more embodiments of the present invention, the elastic body may be composed of a plurality of types of elastic bodies which differ in structural unit composition from each other. In such a case, the “elastic body” of the fine polymer particles (A') may be, for example, two or more types selected from the group consisting of diene-based rubbers, (meth)acrylate-based rubbers, and organosiloxane-based rubbers. In such a case, the “elastic body” of the fine polymer particles (A') may be, for example, one selected from the group consisting of diene-based rubbers, (meth)acrylate-based rubbers, and organosiloxane-based rubbers. In other words, the “elastic body” of the fine polymer particles (A') may be two or more types, which differ in structural unit composition from each other, of the following rubbers: diene-based rubbers, (meth)acrylate-based rubbers, and organosiloxane-based rubbers.

(2-2-2. Graft Part)

The graft part is the same as that described in Embodiment 1. The foregoing description applies and only differences from that in Embodiment 1 are described here.

(Graft Rate of Graft Part)

The non-grafted polymer constitutes a part of the fine polymer particles (A') in accordance with one or more embodiments of the present invention.

In Embodiment 2, the graft rate of the graft part is preferably not less than 70%, more preferably not less than 80%, even more preferably not less than 90%. In a case where the graft rate is not less than 70%, there is an advantage in that the viscosity of the composition does not become too high.

(2-2-3. Surface-Crosslinked Polymer)

The surface-crosslinked polymer is the same as that described in Embodiment 1, and the foregoing description applies.

(2-2-4. Physical Properties of Fine Polymer Particles (A'))

The following description will discuss physical properties of the fine polymer particles (A').

(Volume-Average Particle Size (Mv) of Fine Polymer Particles (A'))

The volume-average particle size (Mv) of the fine polymer particles (A') is the same as that described in Embodiment 1, and the foregoing description applies.

(Glass Transition Temperature of Fine Polymer Particles (A'))

The glass transition temperature of the fine polymer particles (A') is preferably not higher than 80° C., more preferably not higher than 70° C., more preferably not higher than 60° C., more preferably not higher than 50° C., more preferably not higher than 40° C., more preferably not higher than 30° C., more preferably not higher than 20° C., more preferably not higher than 10° C., more preferably not higher than 0° C., more preferably not higher than −20° C., more preferably not higher than −40° C., more preferably not higher than −45° C., more preferably not higher than −50° C., more preferably not higher than −55° C., more preferably not higher than −60° C., more preferably not higher than −65° C., more preferably not higher than −70° C., more preferably not higher than −75° C., more preferably not higher than −80° C., more preferably not higher than −85° C., more preferably not higher than −90° C., more preferably not higher than −95° C., more preferably not higher than −100° C., more preferably not higher than −105° C., more preferably not higher than −110° C., more preferably not higher than −115° C., even more preferably not higher than −120° C., particularly preferably not higher than −125° C. With this feature, it is possible to obtain a mixture of the fine polymer particles (A') and the resin (D) (described later) having low Tg. As a result, the mixture of the fine polymer particles (A') and the resin (D) is advantageous in that the mixture has low elastic modulus and high elongation. As a result, the resulting composition can provide a coating film having excellent toughness, a coating film having low elastic modulus, and/or a coating film having excellent elongation.

The Tg of the fine polymer particles (A') can be determined by, for example, the composition of the structural unit contained in the elastic body contained in the fine polymer particles (A') and/or the composition of the structural unit contained in the graft part contained in the fine polymer particles (A'). In other words, it is possible to adjust the Tg of the resulting fine polymer particles (A') by changing the composition of monomer used in producing (forming by polymerization) the fine polymer particles (A').

(Strength at Break of Fine Polymer Particles (A'))

The strength at break (MPa) of the fine polymer particles (A') is preferably not more than 50.0 MPa, more preferably not more than 25.0 MPa, more preferably not more than 20.0 MPa, more preferably not more than 16.0 MPa, more preferably not more than 15.0 MPa, more preferably not more than 14.0 MPa, more preferably not more than 15.0 MPa, more preferably not more than 12.0 MPa, more preferably not more than 11.0 MPa, more preferably not more than 10.0 MPa, more preferably not more than 9.0 MPa, more preferably not more than 8.0 MPa, more preferably not more than 7.0 MPa, even more preferably not more than 6.0 MPa, particularly preferably not more than 5.0 MPa. The strength at break (MPa) of the fine polymer particles (A') is preferably not less than 1.0 MPa, more preferably not less than 2.0 MPa, more preferably not less than 3.0 MPa, more preferably not less than 4.0 MPa, more preferably not less than 5.0 MPa, more preferably not less than 6.0 MPa, more preferably not less than 7.0 MPa, more preferably not less than 8.0 MPa, more preferably not less than 9.0 MPa, more preferably not less than 10.0 MPa, more preferably not less than 11.0 MPa, more preferably not less than 12.0 MPa, more preferably not less than 13.0 MPa, even more preferably not less than 14.0 MPa, particularly preferably not less than 15.0 MPa.

(Elongation of Fine Polymer Particles (A'))

The elongation (%) of the fine polymer particles (A') is preferably not less than 1.0%, more preferably not less than 5.0%, more preferably not less than 10.0%, more preferably not less than 50.0%, more preferably not less than 60.0%, more preferably not less than 70.0%, more preferably not less than 80.0%, more preferably not less than 90.0%, more preferably not less than 100.0%, more preferably not less than 110.0%, more preferably not less than 120.0%, more preferably not less than 130.0%, more preferably not less than 140.0%, more preferably not less than 150.0%, even more preferably not less than 160.0%, even more preferably not less than 170.0%, particularly preferably not less than 180.0%. With this feature, the resulting composition can provide a coating film that has excellent elongation. As a result, the resulting composition can provide a coating film having even higher durability. Note that the upper limit of the elongation of the fine polymer particles (A') is not particularly limited, and is typically not more than 300%.

(Elastic Modulus of Fine Polymer Particles (A'))

The elastic modulus of the fine polymer particles (A') is preferably not more than 50.00 MPa, more preferably not more than 10.00 MPa, more preferably not more than 2.00 MPa, more preferably not more than 1.50 MPa, more preferably not more than 1.00 MPa, more preferably not more than 0.50 MPa, more preferably not more than 0.40 MPa, more preferably not more than 0.35 MPa, more preferably not more than 0.30 MPa, more preferably not more than 0.28 MPa, more preferably not more than 0.26 MPa, more preferably not more than 0.24 MPa, more preferably not more than 0.22 MPa, more preferably not more than 0.20 MPa, more preferably not more than 0.18 MPa, more preferably not more than 0.16 MPa, more preferably not more than 0.14 MPa, even more preferably not more than 0.12 MPa, particularly preferably not more than 0.10 MPa. With this feature, the resulting composition can possibly provide a coating film that has low elastic modulus. As a result, the resulting composition can possibly provide a coating film having an even higher antifouling property. Note that the lower limit of the elastic modulus of the fine polymer particles (A') is not particularly limited, and is typically not less than 0 MPa.

(Contact Angle of Fine Polymer Particles (A'))

In the present specification, the contact angle on a plate-shape member obtained by forming the fine polymer particles (A') into a plate shape is referred to as the contact angle on the fine polymer particles (A'). The contact angle on the fine polymer particles (A') is preferably not less than 50 degrees, more preferably not less than 60 degrees, more preferably not less than 65 degrees, more preferably not less than 70 degrees, more preferably not less than 75 degrees, more preferably not less than 80 degrees, more preferably not less than 85 degrees, more preferably not less than 90 degrees, more preferably not less than 95 degrees, more preferably not less than 100 degrees, more preferably not less than 105 degrees, even more preferably not less than 110 degrees, even more preferably not less than 115 degrees, particularly preferably not less than 120 degrees. With this feature, the resulting composition can provide a coating film with large contact angle, e.g., a coating film with a contact angle of not less than 50 degrees. As a result, the resulting composition can provide a coating film having an even better antifouling property. Note that the upper limit of the contact angle on the fine polymer particles (A') is not particularly limited, and is typically not more than 180 degrees.

Methods for measuring the glass transition temperature, strength at break, elongation, elastic modulus, and contact angle, respectively, of the fine polymer particles (A') will be described in detail in the following Examples.

(2-2-5. Method of Producing Fine Polymer Particles (A'))

The method of producing the fine polymer particles (A') is the same as that described in Embodiment 1. The foregoing description applies and only differences from that in Embodiment 1 are described here.

(Method of Producing Elastic Body)

A case will be considered where the elastic body includes at least one type of elastic body selected from the group consisting of diene-based rubbers and (meth)acrylate-based rubbers. In this case, the elastic body can be produced by, for example, a method such as emulsion polymerization, suspension polymerization, or microsuspension polymerization. As the method of producing the elastic body, a method disclosed in, for example, WO 2005/028546 can be used.

A case will be considered where the elastic body includes a polysiloxane rubber-based elastic body. In this case, the elastic body can be produced by, for example, a method such as emulsion polymerization, suspension polymerization, or microsuspension polymerization. As the method of producing the elastic body, a method disclosed in, for example, WO 2006/070664 can be used.

(2-3. Resin (D))

Three is a surprising advantage that, by blending the resin (D) together with the fine polymer particles (A') in the binder resin (E), the fine polymer particles (A') can be uniformly dispersed in the binder resin (E). As a result, the resulting composition can provide a coating film having even better durability.

The resin (D) is the same as that described in Embodiment 1. The foregoing description applies and only differences from that in Embodiment 1 are described here. The resin (D) may be, for example, a thermosetting resin, a thermoplastic resin, or a combination of a thermosetting resin and a thermoplastic resin. With regard to the thermosetting resin, the same thermosetting resins as those for the thermosetting resin B of Embodiment 1 can be employed, with regard to the thermoplastic resin, the same thermoplastic resins as those for the resin (D) of Embodiment 1 can be employed, and the foregoing descriptions apply. The descriptions in the section (Others) also apply.

The resin (D) can be the same resin (a resin having the same composition) as the binder resin (E). It is preferable that the binder resin (E) and the resin (D) do not undergo phase separation in the antifouling paint composition for an underwater structure. The resin (D) is preferably a resin compatible with the binder resin (E).

(Physical Properties of Resin (D))

Physical properties of the resin (D) are the same as those described in Embodiment 1. The foregoing descriptions apply, and only differences from those in Embodiment 1 are descried here. In Embodiment 2, the viscosity of the resin (D) at 25° C. is more preferably not less than 100 mPa·s, more preferably not less than 200 mPa·s, more preferably not less than 300 mPa·s, more preferably not less than 400 mPa·s, more preferably not less than 500 mPa·s, even more preferably not less than 750 mPa·s, even more preferably not less than 1000 mPa·s, particularly preferably not less than 1500 mPa·s. With this feature, the resin (D) is not impregnated into the fine polymer particles (A'). Thus, the fine polymer particles (A') are prevented by the resin (D) from fusing each other.

(2-4. Antifouling Agent (G))

The present composition may further contain an antifouling agent (G). In a case where the composition contains a hydrolyzable resin and/or a resin decomposable by hydration as the binder resin (E), the composition may further contain the antifouling agent (G), because it is possible to provide a coating film having an even better antifouling property and/or a coating film that has a more long-lasting antifouling property. In a case where the composition contains a silicone-type resin as the binder resin (E), the composition does not need to contain the antifouling agent (G). On the other hand, a coating film obtained from a composition not containing the antifouling agent (G) is less prone to damage than a coating film obtained from a composition containing the antifouling agent (G). Therefore, a coating film obtained from a composition not containing the antifouling agent (G) is more advantageous than a coating film obtained from a composition containing the antifouling agent (G) in that the coating film obtained from a composition not containing the antifouling agent (G) has higher durability.

The antifouling agent (G) is not particularly limited, and a known antifouling agent can be used. Examples of the antifouling agent (G) encompass: inorganic compounds, metal-containing organic compounds, and metal-free organic compounds.

Examples of the antifouling agent (G) encompass: metal salts such as zinc oxide, cuprous oxide, 2-pyridinethiol 1-oxide zinc salts (also called zinc pyrithione), and copper salts; pyridine triphenylborane; tetramethylthiuram disulfide; carbamate-based compounds (such as zinc dimethyldithiocarbamate, zinc ethylenebisdithiocarbamate, 3-iodo-2-propyl butylcarbamate, bisdimethyl dithiocarbamoyl zinc ethylenebisdithiocarbamate, and manganese-2 ethylene bisdithiocarbamate); 2-methylthio-4-t-butylamino-6-cyclopropylamino-s-triazine; 2,4,5,6-tetrachloroisophthalonitrile; N,N-dimethyl dichlorophenyl urea; copper rhodanide; 4,5,-dichloro-2-n-octyl-3(2H)isothiazolone (also called 4,5-dichloro-2-n-octyl-4-isothiazolin-3-one); N-(fluorodichloromethylthio) phthalimide; N,N'-dimethyl-N'-phenyl-(N-fluorodichloromethylthio) sulfamide; tetramethylthiuram disulfide; 2,4,6-trichlorophenylmaleimide; 2,3,5,6-tetrachloro-4-(methylsulfonyl)pyridine; diiodomethyl paratrisulfone; phenyl(bispyridyl)bismuth dichloride; 2-(4-thiazolyl)-benzimidazole; triphenylboron pyridine salt; stearylamine-triphenylboron; laurylamine-triphenylboron; 1,1-dichloro-N-[(dimethylamino)sulfonyl]-1-fluoro-N-phenylmethanesulfenamide; 1,1-dichloro-N-[(dimethylamino) sulfonyl]-1-fluoro-N-(4-methylphenyl)methanesulfenamide; N'-(3,4-dichlorophenyl)-N,N'-dimethylurea; N'-tert-butyl-N-cyclopropyl-6-(methylthio)-1,3,5-triazine-2,4-diamine; and 4-bromo-2-(4-chlorophenyl)-5-(trifluoromethyl)-1H-pyrrole-3-carbonitrile.

(2-5. Anti-Blocking Agent)

The present composition may further contain an anti-blocking agent. In a case where an anti-blocking agent is blended together with the fine polymer particles (A') and the resin (D) in the binder resin (E), the fine polymer particles (A') can be uniformly dispersed in the binder resin (E). As a result, the resulting composition can provide a coating film that has even better durability. In a case where an anti-blocking agent is blended together with the fine polymer particles (A') and the resin (D) in the binder resin (E), the resulting composition can contain the anti-blocking agent.

The anti-blocking agent is the same as that described in Embodiment 1. The foregoing descriptions apply, and only differences from those in Embodiment 1 are descried here.

(2-6. Organic Solvent)

The present composition may contain an organic solvent. Examples of the organic solvent encompass hydrocarbons, halogenated hydrocarbons, ethers, esters, ketones, and alcohols. Examples of an organic solvent which is a hydrocarbon encompass n-hexane, isohexane, n-heptane, n-octane, isooctane, n-decane, n-dodecane, cyclohexane, methylcyclohexane, cyclopentane, toluene, xylene, benzene, ethylbenzene, decalin, white spirit, and naphtha. Examples of an organic solvent which is a halogenated hydrocarbon encompass methylene chloride, chloroform, tetrachloroethane, and trichloroethylene. Examples of an organic solvent which is an ether encompass dioxane, ethyl ether, diethyl ether, butyl diglycol, 2-butoxyethanol, tetrahydrofuran, tetrahydropyran, ethylene glycol monomethyl ether, ethylene glycol monoethyl ether, ethylene glycol monobutyl ether, ethylene glycol diethyl ether, ethylene glycol dibutyl ether, diethylene glycol monomethyl ether, diethylene glycol monoethyl ether, propylene glycol monomethyl ether, and propylene glycol monomethyl ether acetate (also called PMAC). Examples of an organic solvent which is an ester encompass methyl acetate, ethyl acetate, propyl acetate, butyl acetate, benzyl acetate, methoxypropyl acetate, ethylene glycol monomethyl ether acetate, ethylene glycol monoethyl ether acetate, n-butyl acetate, and 2-ethoxyethyl acetate. Examples of an organic solvent which is a ketone encompass acetone, methyl ethyl ketone, diethyl ketone, ethyl isobutyl ketone, methyl isobutyl ketone (also called MIBK), methyl isoamyl ketone, and diacetone alcohol. Examples of an organic solvent which is an alcohol encompass methanol, ethanol, n-propanol, (iso)propanol, n-butanol, isobutene, benzyl alcohol, ethylene glycol, and propylene glycol. A mixture of any of the alcohols listed and water can also be used as an organic solvent. Examples of the organic solvent also encompass dimethylformamide, dimethylsulfoxide, and N-methylpyrrolidone. Such organic solvents may be used alone or in combination of two or more.

In one or more embodiments of the present invention, the organic solvent is preferably an organic solvent which is a hydrocarbon, more preferably toluene, xylene, benzene, and/or ethylbenzene, and particularly preferably ethylbenzene.

(2-7. Other Optional Components)

The present composition may contain, as necessary, other optional component(s) other than the above-described components. Examples of the optional component encompass: curing agents; coloring agents such as pigments and colorants; extenders; pigment dispersing agents; ultraviolet ray absorbing agents; the foregoing antioxidants; heat stabilizers (antigelling agents); plasticizing agents; leveling agents; defoaming agents; silane coupling agents; antistatic agents; flame retardants; lubricants; viscosity reducers; viscosity modifiers; thixotropy-imparting agents; shrinkage reducing agents; inorganic filler; organic filler; thermoplastic resins; desiccants; dispersion agents; thermal conductivity improving agents; water binders; anti-sag agents; antiflooding agents; anti-settling agents; coating film wear regulating agents; surface control agents; monobasic organic acids; camphor; and castor oil.

(2-8. Physical Properties of Coating Film Obtained from Antifouling Paint Composition for Underwater Structure)

The following description will discuss physical properties of a coating film obtained from an antifouling paint composition for an underwater structure. In the present specification, the values of physical properties of a coating film obtained from an antifouling paint composition for an underwater structure are those obtained by carrying out measurement by the methods described later in Examples.

(Strength of Coating Film Obtained from Antifouling Paint Composition for Underwater Structure)

The present composition preferably satisfies the following condition: when a coating film having a thickness of 100 μm is obtained from an antifouling paint composition for an underwater structure, the strength of the coating film is not less than 3.20 MPa. When a coating film having a thickness of 100 μm is obtained from an antifouling paint composition for an underwater structure, the strength of the coating film is preferably not less than 2.10 MPa, more preferably not less than 2.50 MPa, more preferably not less than 3.00 MPa, more preferably not less than 3.20 MPa, more preferably not less than 3.50 MPa, more preferably not less than 3.80 MPa, more preferably not less than 4.00 MPa, more preferably not less than 5.00 MPa, even more preferably not less than 6.00 MPa, particularly preferably not less than 7.00 MPa. With the feature, the resulting composition can provide a coating film that has excellent strength. As a result, the resulting composition can provide a coating film that has even better durability. Note that, when a coating film having a thickness of 100 μm is obtained from an antifouling paint composition for an underwater structure, the lower limit of the strength of the coating film is not particularly limited, and is typically not less than 0 MPa.

(Elongation of Coating Film Obtained from Antifouling Paint Composition for Underwater Structure)

The present composition preferably satisfies the following condition: when a coating film having a thickness of 100 μm is obtained from an antifouling paint composition for an underwater structure, the elongation of the coating film is not less than 2.0%. When a coating film having a thickness of 100 μm is obtained from an antifouling paint composition for an underwater structure, the elongation of the coating film is preferably not less than 1.0%, more preferably not less than 1.5%, more preferably not less than 2.0%, more preferably not less than 2.1%, more preferably not less than 2.2%, more preferably not less than 2.5%, more preferably not less than 3.0%, more preferably not less than 3.5%, more preferably not less than 4.0%, more preferably not less than 4.5%, even more preferably not less than 5.0%, particularly preferably not less than 5.5%. With the feature, the resulting composition can provide a coating film that has excellent elongation. As a result, the resulting composition can provide a coating film that has even better durability. Note that, when a coating film having a thickness of 100 μm is obtained from an antifouling paint composition for an underwater structure, the upper limit of the elongation of the coating film is not particularly limited, and is typically not more than 300%.

The present composition preferably satisfies the following conditions: when a coating film having a thickness of 100 μm is obtained from an antifouling paint composition for an underwater structure, (a) the strength of the coating film is not less than 3.20 MPa and (b) the elongation of the coating film is not less than 2.0%.

(Elastic Modulus of Coating Film Obtained from Antifouling Paint Composition for Underwater Structure)

The present composition preferably satisfies the following condition: when a coating film having a thickness of 100 μm is obtained from an antifouling paint composition for an underwater structure, the elastic modulus of the coating film is not more than 1.50 GPa. When a coating film having a thickness of 100 μm is obtained from an antifouling paint composition for an underwater structure, the elastic modulus of the coating film is preferably not more than 50.00 GPa, more preferably not more than 10.00 GPa, more preferably not more than 5.00 GPa, more preferably not more than 2.00 GPa, more preferably less than 1.65 GPa, more preferably not more than 1.60 GPa, more preferably not more than 1.55 GPa, more preferably not more than 1.50 GPa, more preferably not more than 1.45 GPa, more preferably not more than 1.40 GPa, more preferably not more than 1.35 GPa, even more preferably not more than 1.30 GPa, particularly preferably not more than 1.25 GPa. With the feature, the resulting composition can provide a coating film that has low elastic modulus. As a result, the resulting composition can provide a coating film that has an even better antifouling property. Note that, when a coating film having a thickness of 100 μm is obtained from an antifouling paint composition for an underwater structure, the lower limit of the elastic modulus of the coating film is not particularly limited, and is typically not less than 0 MPa.

(Contact Angle on Surface of Coating Film Obtained from Antifouling Paint Composition for Underwater Structure)

The present composition preferably satisfies the following condition: when a coating film having a thickness of 100 μm is obtained from an antifouling paint composition for an underwater structure, the contact angle on the surface of the coating film is not less than 102 degrees. When a coating film having a thickness of 100 μm is obtained from an antifouling paint composition for an underwater structure, the contact angle on the surface of the coating film is preferably not less than 50 degrees, more preferably not less than 60 degrees, more preferably not less than 70 degrees, more preferably not less than 80 degrees, more preferably not less than 90 degrees, more preferably not less than 100 degrees, more preferably not less than 101 degrees, more preferably not less than 102 degrees, more preferably not less than 103 degrees, more preferably not less than 104 degrees, even more preferably not less than 105 degrees, even more preferably not less than 110 degrees, particularly preferably not less than 120 degrees. With the feature, the resulting composition can provide a coating film that shows large contact angle. As a result, the resulting composition can provide a coating film that has an even better antifouling property. Note that, when a coating film having a thickness of 100 μm is obtained from an antifouling paint composition for an underwater structure, the upper limit of the contact angle on the surface of the coating film is not particularly limited, and is typically not more than 180 degrees.

3. Method of Producing Antifouling Paint Composition for Underwater Structure A method of producing an antifouling paint composition for an underwater structure, in accordance with one or more embodiments of the present invention, includes: a powdery and/or granular material preparing step including obtaining a powdery and/or granular material which contains fine polymer particles (A') and a resin (D); and a mixing step including mixing a binder resin (E) and the powdery and/or granular material. The fine polymer particles (A') contain a rubber-containing graft copolymer that includes an elastic body and a graft part grafted to the elastic body. The elastic body contains at least one selected from the group consisting of diene-based rubbers, (meth)acrylate-based rubbers, and organosiloxane-based rubbers. The graft part contains a polymer that contains, as one or more structural units, one or more structural units derived from at least one type of monomer selected from the group consisting of aromatic vinyl monomers, vinyl cyanide monomers, and (meth)acrylate monomers. The fine polymer particles (A') have a glass transition temperature of not higher than 80° C. The resin (D) is a liquid which has a viscosity of 100 mPa·s to 1,000,000 mPa·s at 25° C., a semisolid, or a solid. The antifouling paint composition contains the fine polymer particles (A') in an amount of 50% by weight to 99% by weight and the resin (D) in an amount of 1% by weight to 50% by weight, where 100% by weight represents the total amount of the fine polymer particles (A') and the resin (D). The "method for producing an antifouling paint composition for an underwater structure in accordance with one or more embodiments of the present invention" may be referred to as a "method of producing a present composition" or "present production method".

The present production method has the above features, and therefore can provide an antifouling paint composition for an underwater structure that can provide a coating film having excellent durability, specifically a coating film having excellent strength and elongation. Furthermore, since the present production method has the above features, the composition obtained via the present production method can provide a coating film that shows excellent contact angle and/or a coating film that has low elastic modulus. As a result, the composition obtained via the present production method is advantageous in that it can provide a coating film that has an excellent antifouling property.

The following description will discuss the steps of the present production method in detail. Matters other than those described below (for example, components and amounts thereof, etc.) are not particularly limited, and the foregoing descriptions in the section [2. Antifouling paint composition for underwater structure] apply as appropriate.

(3-1. Powdery and/or Granular Material Preparing Step)

In the powdery and/or granular material preparing step, a method for obtaining a powdery and/or granular material that contains fine polymer particles (A') and a resin (D) is not particularly limited, and a known method can be used.

As described earlier, the fine polymer particles (A') can be obtained as an aqueous latex via, for example, emulsion polymerization. In the powdery and/or granular material preparing step, the powdery and/or granular material containing the fine polymer particles (A') and the resin (D) can be obtained by, for example, (a1) adding the resin (D) to the aqueous latex that contains the fine polymer particles (A'), (a2) allowing the fine polymer particles (A') and the resin (D) in the obtained aqueous latex to agglutinate together, (a3) collecting the obtained agglutinate that contains the fine polymer particles (A') and the resin (D), and (a4) drying the collected agglutinate.

A method for adding the resin (D) to the aqueous latex that contains the fine polymer particles (A') is not particularly limited. Examples of the method encompass (a) a method involving adding the resin (D) directly to the aqueous latex, (b) a method involving separately preparing an aqueous latex that contains the resin (D) and then adding the aqueous latex that contains the resin (D) to the aqueous latex that contains the fine polymer particles (A'), and (c) a method involving separately preparing a solution that contains the resin (D) and then adding the solution that contains the resin (D) to the aqueous latex that contains the fine polymer particles (A'). A method of adding the resin (D) to the aqueous latex is preferably a method involving separately preparing an aqueous latex that contains the resin (D) and then adding the aqueous latex that contains the resin (D) to the aqueous latex that contains the fine polymer particles (A').

The powdery and/or granular material preparing step may be configured as described below. Specifically, the powdery and/or granular material preparing step may be configured as described below: a powdery and/or granular material that contains fine polymer particles (A') and a resin (D) is obtained by (b1) forming a resin (D) in an aqueous latex that contains the fine polymer particles (A'), (b2) allowing the fine polymer particles (A') and the resin (D) in the obtained aqueous latex to agglutinate together, (b3) collecting the obtained agglutinate that contains the fine polymer particles (A') and the resin (D), and (b4) drying the collected agglutinate.

The powdery and/or granular material preparing step can include the step of obtaining an agglutinate that contains the fine polymer particles (A') and the resin (D). A method for allowing the fine polymer particles (A') and the resin (D) in the aqueous latex to agglutinate together is not particularly limited. The method can be, for example, a known method such as a method involving carrying out salting out using a salt, a method using a solvent, or a method involving spraying the aqueous latex. It is noted here that, when the fine polymer particles (A') and the resin (D) in the aqueous latex are allowed to agglutinate together, a mixture that contains (i) the agglutinate containing the fine polymer particles (A') and the resin (D) and (ii) an aqueous solvent may also be referred to as slurry.

In order to achieve a good anti-blocking property and to allow the fine polymer particles (A') to be well dispersed in the binder resin (E) in the resulting composition, the fine polymer particles (A') and the resin (D) in the aqueous latex may be allowed to agglutinate in the presence of an anti-blocking agent.

A method for collecting the agglutinate that contains the fine polymer particles (A') and the resin (D) is not particularly limited, provided that the aqueous solvent and the agglutinate in the slurry can be separated. A known method can be employed. The method for collecting the agglutinate that contains the fine polymer particles (A') and the resin (D) can be, for example, a method involving subjecting the slurry to filtration, a method involving subjecting the slurry to centrifugal dehydration, or the like.

The method for drying the agglutinate is not particularly limited, and can be a known method such as using a dryer.

The powdery and/or granular material preparing step may be configured as described below. Specifically, the powdery and/or granular material preparing step may be configured as described below: powder that contains fine polymer particles (A') and a resin (D) is obtained by (c1) using an aqueous latex that contains only the fine polymer particles (A') and allowing the fine polymer particles (A') in the aqueous latex to agglutinate, (c2) collecting the obtained agglutinate of the fine polymer particles (A'), (c3) mixing the collected agglutinate of the fine polymer particles (A') with the resin (D), and (b4) drying the obtained mixture.

A method for collecting the agglutinate of the fine polymer particles (A') can be, for example, a method similar to the foregoing method for collecting the agglutinate that contains the fine polymer particles (A') and the resin (D). A method for mixing the collected agglutinate of the fine polymer particles (A') with the resin (D) is not particularly limited. The method can be, for example, a mechanical mixing method using a planetary centrifugal mixer, a planetary mixer, a disper mixer, or the like.

(3-1-1. Physical Properties of Powdery and/or Granular Material)

The following description discusses physical properties of the powdery and/or granular material that contains the fine polymer particles (A') and the resin (D), obtained in the powdery and/or granular material preparing step. Note that the physical properties of the powdery and/or granular material can also be referred to as, in other words, physical properties of a mixture of the fine polymer particles (A') and the resin (D).

(Domain of Resin (D) in TEM Image)

For the fine polymer particles (A') in the powdery and/or granular material to be prevented from fusing together, in the powdery and/or granular material, the resin (D) may have a longitudinal dimension not less than 1.5 times the average particle size of the fine polymer particles (A') in the form of primary particles be small in amount. Specifically, when the powdery and/or granular material is subjected to transmission electron microscopy (TEM) and a TEM image is obtained, in the TEM image, the number of domains in each of which the longitudinal dimension of the resin (D) is not less than 1.5 times the average particle size of the fine polymer particles (A') is preferably not more than five, more preferably not more than three, even more preferably not more than one, most preferably not more than zero.

A known method can be used as the transmission electron microscopy. An example is a method involving: freezing a powdery and/or granular material and then slicing the frozen product with use of an ultramicrotome to obtain a slice sample having a thickness of about 100 nm; and then staining the slice with osmium ($OsO_4$) and then subjecting the sample to transmission electron microscopy (TEM). The "longitudinal dimension" of the resin (D) refers to the longest dimension (the longest straight line connecting two points on the periphery) in the TEM image. The "average particle size" of the fine polymer particles (A') in the form of primary particles can be calculated from, for example, the average of diameters of virtual circles equal in area to the projections (such diameters are area-equivalent circle diameters) of randomly selected thirty fine polymer particles (A') in a TEM image.

(Glass Transition Temperature of Powdery and/or Granular Material)

The glass transition temperature of the powdery and/or granular material is preferably not higher than 80° C., more preferably not higher than 70° C., more preferably not higher than 60° C., more preferably not higher than 50° C., more preferably not higher than 40° C., more preferably not higher than 30° C., more preferably not higher than 20° C., more preferably not higher than 10° C., more preferably not higher than 0° C., more preferably not higher than −20° C., more preferably not higher than −40° C., more preferably not higher than −50° C., more preferably not higher than −60° C., more preferably not higher than −70° C., more preferably not higher than −80° C., more preferably not higher than −90° C., more preferably not higher than −100° C., more preferably not higher than −110° C., even more preferably not higher than −120° C., particularly preferably not higher than −125° C. With this feature, there is an advantage in that the powdery and/or granular material, i.e., a mixture of the fine polymer particles (A') and the resin (D), has low elastic modulus and high elongation. As a result, the resulting composition can provide a coating film that has excellent toughness, a coating film that has low elastic modulus, and/or a coating film that has excellent elongation.

The Tg of the powdery and/or granular material, i.e., a mixture of the fine polymer particles (A') and the resin (D), can be determined by, for example, the Tg of the fine polymer particles (A') and the type of the resin (D). In other words, it is possible to adjust the Tg of the powdery and/or granular material, i.e., a mixture of the fine polymer particles (A') and the resin (D), by changing the Tg of the fine polymer particles (A') and the type of the resin (D).

(Strength at Break of Powdery and/or Granular Material)

The strength at break (MPa) of the powdery and/or granular material is preferably not more than 50.0 MPa, more preferably not more than 25.0 MPa, more preferably not more than 15.0 MPa, more preferably not more than 10.0 MPa, more preferably not more than 9.0 MPa, more preferably not more than 8.0 MPa, more preferably not more than 7.0 MPa, more preferably not more than 6.0 MPa, even more preferably not more than 5.0 MPa, particularly preferably not more than 4.0 MPa. The strength at break (MPa) of the powdery and/or granular material is preferably not less than 1.0 MPa, more preferably not less than 2.0 MPa, more preferably not less than 3.0 MPa, more preferably not less than 4.0 MPa, more preferably not less than 5.0 MPa, more preferably not less than 6.0 MPa, more preferably not less than 7.0 MPa, even more preferably not less than 8.0 MPa, particularly preferably not less than 9.0 MPa.

(Elongation of Powdery and/or Granular Material)

The elongation (%) of the powdery and/or granular material is preferably not less than 1.0%, more preferably not less than 5.0%, more preferably not less than 10.0%, more preferably not less than 50.0%, more preferably not less than 75.0%, more preferably not less than 100.0%, even more preferably not less than 110.0%, even more preferably not less than 120.0%, particularly preferably not less than 125.0%. With this feature, the resulting composition can provide a coating film that has excellent elongation. As a result, the resulting composition can provide a coating film that has even better durability. Note that the upper limit of the elongation of the powdery and/or granular material, i.e., a mixture of the fine polymer particles (A') and the resin (D), is not particularly limited and is typically not more than 300%.

(Elastic Modulus of Powdery and/or Granular Material)

The elastic modulus of the powdery and/or granular material is preferably not more than 50.00 MPa, more preferably not more than 10.00 MPa, more preferably not more than 2.00 MPa, more preferably not more than 1.00 MPa, more preferably not more than 0.50 MPa, more preferably not more than 0.40 MPa, more preferably not more than 0.30 MPa, more preferably not more than 0.25 MPa, more preferably not more than 0.20 MPa, even more preferably not more than 0.15 MPa, particularly preferably not more than 0.10 MPa. With this feature, the resulting composition can possibly provide a coating film that has low elastic modulus. As a result, the resulting composition can possibly provide a coating film that has an even better antifouling property. Note that the lower limit of the elastic modulus of the powdery and/or granular material, i.e., a mixture of the fine polymer particles (A') and the resin (D), is not particularly limited and is typically not less than 0 MPa.

(Contact Angle on Powdery and/or Granular Material)

The contact angle on the powdery and/or granular material is preferably not less than 50 degrees, more preferably not less than 60 degrees, more preferably not less than 65 degrees, more preferably not less than 70 degrees, more preferably not less than 72 degrees, more preferably not less than 75 degrees, more preferably not less than 80 degrees, more preferably not less than 85 degrees, more preferably not less than 90 degrees, more preferably not less than 95 degrees, more preferably not less than 100 degrees, more preferably not less than 105 degrees, even more preferably not less than 110 degrees, even more preferably not less than 115 degrees, particularly preferably not less than 120 degrees. With this feature, the resulting composition can provide a coating film with large contact angle, for example, a coating film with a contact angle of not less than 50 degrees. As a result, the resulting composition can provide a coating film that has an even better antifouling property. Note that the upper limit of the contact angle on the powdery and/or granular material, i.e., a mixture of the fine polymer particles (A') and the resin (D), is not particularly limited and is typically not more than 180 degrees.

Methods of measuring the glass transition temperature, strength at break, elongation, elastic modulus, and contact angle, respectively, of the powdery and/or granular material, i.e., a mixture of the fine polymer particles (A') and the resin (D), will be described later in detail in Examples.

The powdery and/or granular material has an excellent anti-blocking property. In the present specification, the anti-blocking property of the powdery and/or granular material can be evaluated on the basis of a force required to break a block of the powdery and/or granular material. The powdery and/or granular material is preferably such that a force required to break a block of the powdery and/or granular material is not more than 30000 Pa. It is noted here that the block is a block obtained by applying a load of 6.3 kg to the powdery and/or granular material after allowed to stand at 60° C. for 2 hours by placing a 6.3 kg weight on 30 g of the powdery and/or granular material contained in a cylindrical container having a diameter of 50 mm. It is also noted that the force (force required to break the block of the powdery and/or granular material) is a value obtained by measurement using a rheometer.

(3-2. Mixing Step)

In the mixing step involving mixing the binder resin (E) and the powdery and/or granular material, a method for mixing the binder resin (E) and the powdery and/or granular material is not particularly limited. The method can be, for example, a mechanical mixing method using a planetary centrifugal mixer, a planetary mixer, a disper mixer, or the like.

4. Method of Using Antifouling Paint Composition for Underwater Structure

A method of using the present composition can also be referred to as a method of forming a coating film (antifouling coating film) using the present composition. The method of using the present composition includes the step of applying an antifouling paint composition for an underwater structure to an underwater structure. This feature makes it possible to form a coating film made of the composition on the outer surface or inner surface of the underwater structure.

A method for applying the composition in the step of applying is not particularly limited, and can be a known method. The method for applying the composition can be, for example, a flow casting method, an immersion method, a spraying method, brush and brush application, roller, dip coater, electrostatic coating, electro-deposition coating, or the like.

An applying robot can be used in the step of applying. The applying robot can be used to extrude the composition into the form of beads, a monofilament, or a swirl on the underwater structure and apply the composition to the underwater structure. Alternatively, a jet spray method or a streaming method can be used to apply the composition on the underwater structure.

The composition applied on the underwater structure may be dried. By applying the composition on the underwater structure as described above and optionally drying the composition, it is possible to form a coating film having an antifouling property on the underwater structure.

5. Coating Film

A coating film formed by the method described in the above section [4. Method of using antifouling paint composition for underwater structure] is also one or more embodiments of the present invention. Specifically, a coating film in accordance with one or more embodiments of the present invention is a coating film made of the antifouling paint composition for an underwater structure described in the foregoing section [2. Antifouling paint composition for underwater structure]. A coating film in accordance with other embodiments of the present invention is a coating film made of an antifouling paint composition for an underwater structure produced by the production method described in the foregoing section [3. Method of producing antifouling paint composition for underwater structure].

A coating film in accordance with one or more embodiments of the present invention has the above feature, and therefore is advantageous in that it has excellent durability. A coating film in accordance with one or more embodiments of the present invention has the above feature, and therefore is advantageous in that it has excellent elongation. A coating film in accordance with one or more embodiments of the present invention has the above feature, and therefore is advantageous in that it has large contact angle and accordingly has an excellent antifouling property.

A coating film in accordance with one or more embodiments of the present invention contains the binder resin (E), the fine polymer particles (A'), and the resin (D). The fine polymer particles (A') contain a rubber-containing graft copolymer that includes (a) an elastic body and (b) a graft part which is grafted to the elastic body and which is composed of a polymer that contains, as one or more structural units, one or more structural units derived from at least one type of monomer selected from the group consisting of aromatic vinyl monomers, vinyl cyanide monomers, and (meth)acrylate monomers. The coating film contains the fine polymer particles (A') in an amount of 50% by weight to 99% by weight and the resin (D) in an amount of 1% by weight to 50% by weight, where 100% by weight represents the total amount of the fine polymer particles (A') and the resin (D). A mixture of the fine polymer particles (A') and the resin (D) has a glass transition temperature of not higher than 80° C. The coating film in accordance with one or more embodiments of the present invention may further optionally contain an antifouling agent (G).

(5-1. Physical Properties of Coating Film)

There are preferred aspects for each of the aspects of the strength (MPa), elongation (%), and elastic modulus (GPa) of a coating film, and aspects of the strength (MPa), elongation (%), and elastic modulus (GPa) of a coating film, which has a thickens of 100 μm and which has been obtained from an antifouling paint composition for an underwater structure as described earlier, can apply as appropriate. The contact angle (degree) on the surface of a coating film includes preferred aspects, and the contact angle (degree) on the surface of a coating film, which has a thickens of 100 μm and which has been obtained from an antifouling paint composition for an underwater structure as described earlier, can apply as appropriate.

6. Uses

The present composition can be suitably used as an antifouling paint to prevent the fouling of the outer surfaces or inner surfaces of various underwater structures. Examples of the underwater structures encompass: watercrafts; materials for aquaculture and fishing (such as ropes, fishing nets, fishing equipment, bobbers, buoys, and tetrapod); oil fences; supply and drainage ports at thermal or nuclear power plants; pipes for cooling conduits and seawater utilization equipment etc.; undersea tunnels; submarine bases; very large floating structures; harbor facilities; ocean civil engineering works at canals and waterways etc.; industrial water-related facilities; bridges; and floats.

(1) A powdery and/or granular material adapted to be blended with a thermosetting resin, containing fine polymer particles (A), in which: the fine polymer particles (A) contain a rubber-containing graft copolymer that includes an elastic body and a graft part grafted to the elastic body; the elastic body contains, as a structural unit, a structural unit derived from butadiene; the graft part contains a polymer that contains, as one or more structural units, one or more structural units derived from at least one type of monomer selected from the group consisting of aromatic vinyl monomers, vinyl cyanide monomers, and (meth)acrylate monomers; the fine polymer particles (A) have a volume-average particle size of not less than 90 nm; and the polymer of the graft part has a weight-average molecular weight of not more than 200000.

(2) The powdery and/or granular material described in (1), further containing a resin (D), in which: the resin (D) is a liquid which has a viscosity of 100 mPa·s to 1,000,000 mPa·s at 25° C., a semisolid, or a solid; and the powdery and/or granular material comprises the fine polymer particles (A) in an amount of 50% by weight to 99% by weight and the resin (D) in an amount of 1% by weight to 50% by weight, where 100% by weight represents a total amount of the fine polymer particles (A) and the resin (D).

(3) The powdery and/or granular material described in (1) or (2), in which: the fine polymer particles (A) further contain a free polymer (FP) composed of a polymer that contains, as one or more structural units, one or more structural units derived from at least one type of monomer selected from the group consisting of aromatic vinyl monomers, vinyl cyanide monomers, and (meth)acrylate monomers; and the free polymer (FP) is contained in an amount of not more than 8% by weight.

(4) The powdery and/or granular material described in any of (1) to (3), in which a graft rate of the graft part is not less than 80%.

(5) The powdery and/or granular material described in any of (1) to (4), in which a proportion of the elastic body in the fine polymer particles (A) is not less than 70% by weight.

(6) The powdery and/or granular material described in any of (1) to (5), in which the graft part contains a polymer that contains, as a structural unit, a structural unit derived from a (meth)acrylate monomer.

(7) The powdery and/or granular material described in (3), in which the free polymer (FP) includes a polymer that contains, as a structural unit, a structural unit derived from a (meth)acrylate monomer.

(8) The powdery and/or granular material described in any of (1) to (7), in which a force required to break a block of the powdery and/or granular material is not more than 30000 Pa, in which: the block is a block obtained by applying a load of 6.3 kg to the powdery and/or granular material after allowed to stand at 60° C. for 2 hours by placing a 6.3 kg weight on 30 g of the powdery and/or granular material contained in a cylindrical container having a diameter of 50 mm; and the force is a value obtained by measurement using a rheometer.

(9) The powdery and/or granular material described in any of (1) to (8), in which the powdery and/or granular material has a volume-average particle size (Mv) of 30 μm to 500 μm.

(10) A resin composition containing:

a powdery and/or granular material described in any of (1) to (9); and a thermosetting resin (B).

(11) A cured product obtained by curing a resin composition described in (10).

(12) A thermosetting structural adhesive agent containing: a powdery and/or granular material described in any of (1) to (9); a thermosetting resin (B); and an inorganic filler (C).

Furthermore, one or more embodiments of the present invention include the following features.

[1] An antifouling paint composition for an underwater structure, containing a binder resin (E), fine polymer particles (A'), and a resin (D), in which: the fine polymer particles (A') contain a rubber-containing graft copolymer that includes an elastic body and a graft part grafted to the elastic body; the elastic body contains at least one selected from the group consisting of diene-based rubbers, (meth) acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the fine polymer particles (A') have a glass transition temperature of not higher than 80° C.; the resin (D) is a liquid which has a viscosity of 100 mPa·s to 1,000,000 mPa·s at 25° C., a semisolid, or a solid; and the antifouling paint composition contains the fine polymer particles (A') in an amount of 50% by weight to 99% by weight and the resin (D) in an amount of 1% by weight to 50% by weight, where 100% by weight represents a total amount of the fine polymer particles (A') and the resin (D).

[2] The antifouling paint composition described in [1], further containing an antifouling agent (G).

[3] The antifouling paint composition described in [1] or [2], in which the elastic body contains a polysiloxane rubber-based elastic body.

[4] The antifouling paint composition described in any one of [1] to [3], in which an elastic modulus of the fine polymer particles (A') is not more than 2.00 MPa.

[5] The antifouling paint composition described in any one of [1] to [4], in which an elongation of the fine polymer particles (A') is not less than 10.0%.

[6] The antifouling paint composition described in any one of [1] to [5], in which a contact angle on the fine polymer particles (A') is not less than 50 degrees.

[7] The antifouling paint composition described in any one of [1] to [6], which satisfies the following conditions: when a coating film having a thickness of 100 μm is obtained from the antifouling paint composition for an underwater structure, (a) a strength of the coating film is not less than 3.20 MPa and (b) an elongation of the coating film is not less than 2.0%.

[8] The antifouling paint composition described in [7], which satisfies the following condition: when a coating film having a thickness of 100 μm is obtained from the antifouling paint composition for an underwater structure, a contact angle on a surface of the coating film is not less than 102 degrees.

[9] The antifouling paint composition described in [7] or [8], which satisfies the following condition: when a coating film having a thickness of 100 μm is obtained from the antifouling paint composition for an underwater structure, an elastic modulus of the coating film is not more than 1.50 GPa.

A coating film made of an antifouling paint composition described in any one of [1] to [9].

[11] A method of producing an antifouling paint composition for an underwater structure, including: a powdery and/or granular material preparing step including obtaining a powdery and/or granular material which contains fine polymer particles (A') and a resin (D); and a mixing step including mixing a binder resin (E) and the powdery and/or granular material, in which: the fine polymer particles (A') contain a rubber-containing graft copolymer that includes an elastic body and a graft part grafted to the elastic body; the elastic body contains at least one selected from the group consisting of diene-based rubbers, (meth)acrylate-based rubbers, and organosiloxane-based rubbers; the graft part contains a polymer that contains, as one or more structural units, one or more structural units derived from at least one type of monomer selected from the group consisting of aromatic vinyl monomers, vinyl cyanide monomers, and (meth)acrylate monomers; the fine polymer particles (A') have a glass transition temperature of not higher than 80° C.; the resin (D) is a liquid which has a viscosity of 100 mPa·s to 1,000,000 mPa·s at 25° C., a semisolid, or a solid; and the antifouling paint composition contains the fine polymer particles (A') in an amount of 50% by weight to 99% by weight and the resin (D) in an amount of 1% by weight to 50% by weight, where 100% by weight represents a total amount of the fine polymer particles (A') and the resin (D).

[12] The antifouling paint composition described in [11], in which an elastic modulus of the powdery and/or granular material is not more than 2.00 MPa.

[13] The antifouling paint composition described in [11] or [12], in which an elongation of the powdery and/or granular material is not less than 10.0%.

[14] The antifouling paint composition described in any one of [11] to [13], in which a contact angle on the powdery and/or granular material is not less than 50 degrees.

[15] A method of producing an antifouling paint composition described in any one of [11] to [14], in which a force required to break a block of the powdery and/or granular material is not more than 30000 Pa, in which: the block is a block obtained by applying a load of 6.3 kg to the powdery and/or granular material after allowed to stand at 60° C. for 2 hours by placing a 6.3 kg weight on 30 g of the powdery and/or granular material contained in a cylindrical container having a diameter of 50 mm; and the force is a value obtained by measurement using a rheometer.

EXAMPLES

The following description will discuss one or more embodiments of the present invention in detail with reference to Examples and Comparative Examples. Note that the embodiments of the present invention are not limited to these examples. Embodiments of the present invention can be altered as appropriate within the scope of the gist disclosed herein. One or more embodiments of the present invention also include, in their technical scope, embodiments achieved by altering the embodiments. Note that in the following Examples and Comparative Examples, "parts" means "parts by weight", and "%" means "% by weight".

Example A

<Evaluation Method>

First, the following description will discuss methods of evaluating resin compositions produced in Examples and Comparative Examples.

(Measurement of Volume-Average Particle Size)

The volume-average particle size (Mv) of an elastic body or fine polymer particles (A) dispersed in an aqueous latex was measured with use of Nanotrac WaveII-EX150 (manufactured by MicrotracBEL Corp.). A test specimen used for measurement was prepared by diluting the aqueous latex in deionized water. When the measurement was made, the refractive index of water and the refractive index of the elastic body or the fine polymer particles (A) obtained in each of Production Examples were inputted, measurement time was set to 120 seconds, and the concentration of the test specimen was adjusted such that a load index fell within the range of 1 to 10.

The volume-average particle size (Mv) of each powdery and/or granular material was measured using a laser diffraction particle size distribution analyzer Microtrac MT3000II (manufactured by MicrotracBEL Corp.).

(Dispersibility of Fine Polymer Particles (A) in Resin Composition)

A resin composition was placed on a grindometer (grind gage), fine polymer particles (A) on the gauge were scraped with use of a metal scraper, and the state of dispersion was visually checked. The point on the scale of the grindometer, at which there are five to ten particles (which became apparent by the scraping) within a range 3 mm in width, was read. Note that this method of evaluating dispersibility can also be used to evaluate foreign matter level.

(Amount of Free Polymer (FP) Contained in Fine Polymer Particles (A))

2 g of powder of the fine polymer particles (A) was dissolved in 50 mL of methyl ethyl ketone to obtain a MEK solution of the powder. Next, the obtained MEK solution was separated into a part soluble in MEK (MEK-soluble part) and a part insoluble in MEK (MEK-insoluble part). Specifically, the obtained MEK solution was subjected to centrifugation with use of a centrifugal separator (CP60E manufactured by Hitachi Koki Co., Ltd.) at 30000 rpm for one hour, and thereby separated into the MEK-soluble part and the MEK-insoluble part. Note, here, that three sets of centrifugation operations were carried out in total. Next, 20 ml of condensed MEK-soluble part was mixed with 200 mL of methanol, an aqueous calcium chloride solution, obtained by dissolving 0.01 g of calcium chloride in water, was added to the mixture, and stirred for one hour. Then, the obtained mixture was separated into a methanol-soluble part and a methanol-insoluble part. The amount of the methanol-insoluble part was used as "the amount of free polymer" (FP amount).

(Weight Average Molecular Weight of Free Polymer (FP) Contained in Fine Polymer Particles (A))

20 mg of the free polymer thus obtained was dissolved in 10 ml of THF, and the weight-average molecular weight was measured using HLC-82201 (manufactured by TOSOH CORPORATION).

(Blend Viscosity of Resin Composition)

A resin composition was measured for viscosity with use of a digital viscometer DV-II+Pro manufactured by BROOKFIELD at a temperature of 50° C. with varying shear rates and using different spindles as necessary.

(Anti-Blocking Property of Mixture of Fine Polymer Particles and Resin (D) (Powdery and/or Granular Material))

With use of each of the powdery and/or granular materials obtained in the Production Examples, and the following operations (1) to (3) were carried out in this order to prepare a block of the powdery and/or granular material. (1) 30 g of the powdery and/or granular material was placed in a cylindrical container having a diameter of 50 mm. (2) A load of 6.3 kg was applied to the powdery and/or granular material after allowed to stand at 60° C. for 2 hours by placing a 6.3 kg weight on the powdery and/or granular material in the container. (3) The obtained block was removed from the container. Next, a force required to break the obtained block of the powdery and/or granular material was measured using a rheometer. The anti-blocking property was evaluated on the basis of the obtained result with reference to the following criteria.

Acceptable: A force required to break the block of the powdery and/or granular material is not more than 30000 Pa.

Unacceptable: A force required to break the block of the powdery and/or granular material is more than 30000 Pa.

<1. Formation of Elastic Body>

Production Example 1-1: Preparation of Polybutadiene Rubber Latex (R-1)

Into a pressure-resistant polymerization apparatus were introduced 200 parts by weight of deionized water, 0.03 parts by weight of tripotassium phosphate, 0.002 parts by weight of disodium ethylenediaminetetraacetate (EDTA), 0.001 parts by weight of ferrous sulfate heptahydrate, and 1.55 parts by weight of sodium dodecylbenzenesulfonate (SDBS) as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 100 parts by weight of butadiene (Bd) was introduced into the pressure-resistant polymerization apparatus, and the temperature inside the pressure-resistant polymerization apparatus was raised to 45° C. Subsequently, 0.03 parts by weight of paramenthane hydroperoxide (PHP) was introduced into the pressure-resistant polymerization apparatus, and then 0.10 parts by weight of sodium formaldehyde sulfoxylate (SFS) was introduced into the pressure-resistant polymerization apparatus. Polymerization was then started. At the time 15 hours had elapsed from the start of the polymerization, residual monomers not used in the polymerization were removed by devolatilization under reduced pressure, and thereby the polymerization was ended. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-1), which contained an elastic body containing polybutadiene rubber as a main component, was obtained.

The volume-average particle size of the elastic body contained in the obtained aqueous latex was 70 nm.

Production Example 1-2: Preparation of Polybutadiene Rubber Latex (R-2)

Into a pressure-resistant polymerization apparatus were introduced 7 parts by weight of a solid content of the polybutadiene rubber latex (R-1) obtained in Production Example 1-1, 200 parts by weight of deionized water, 0.03 parts by weight of tripotassium phosphate, 0.002 parts by weight of EDTA, and 0.001 parts by weight of ferrous sulfate heptahydrate. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 93 parts by weight of Bd was introduced into the pressure-resistant polymerization apparatus, and the temperature inside the pressure-resistant polymerization apparatus was raised to 45° C. Thereafter, 0.02 parts by weight of PHP was introduced into the pressure-resistant polymerization apparatus, and then 0.10 parts by weight of SFS was introduced into the pressure-resistant polymerization apparatus. Polymerization was then started. At the time 30 hours had elapsed from the start of the polymerization, residual monomers not used in the polymerization were removed by devolatilization under reduced pressure, and thereby the polymerization was ended. During the polymerization, PHP, EDTA, ferrous sulfate heptahydrate, and SDBS were each added to the pressure-resistant polymerization apparatus in discretionarily selected amounts and discretionarily selected points in time. By the polymerization, an aqueous latex (R-2), which contained an elastic body containing polybutadiene rubber as a main component, was obtained. The volume-average particle size of the elastic body contained in the obtained aqueous latex was 195 nm.

Production Example 1-3: Preparation of Polystyrene-Butadiene Rubber Latex (R-3)

Into a pressure-resistant polymerization apparatus were introduced 160 parts by weight of deionized water, 0.002 parts by weight of EDTA, 0.001 parts by weight of ferrous sulfate heptahydrate, 0.029 parts by weight of polyoxyethylene lauryl ether phosphate, and 0.003 parts by weight of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 76.5 parts by weight of Bd and 23.5 parts by weight of styrene (St) were introduced into the pressure-resistant polymerization apparatus, and the temperature inside the pressure-resistant polymerization apparatus was raised to 45° C. Thereafter, 0.03 parts by weight of PHP was introduced into the pressure-resistant polymerization apparatus, and then 0.05 parts by weight of SFS was introduced into the pressure-resistant polymerization apparatus. Polymerization was then started. At the time 20 hours had elapsed from the start of the polymerization, residual monomers not used in the polymerization were removed by devolatilization under reduced pressure, and thereby the polymerization was ended. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-3), which contained an elastic body containing polystyrene-butadiene rubber as a main component, was obtained. The volume-average particle size of the elastic body contained in the obtained aqueous latex was 192 nm.

Production Example 1-4: Preparation of Polystyrene-Polybutadiene Rubber Latex (R-4)

Into a pressure-resistant polymerization apparatus were introduced 200 parts by weight of deionized water, 0.03 parts by weight of tripotassium phosphate, 0.002 parts by weight of disodium ethylenediaminetetraacetate (EDTA), 0.001 parts by weight of ferrous sulfate heptahydrate, and 1.55 parts by weight of sodium dodecylbenzenesulfonate (SDBS) as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 76.5 parts by weight of Bd and 23.5 parts by weight of styrene (St) were introduced into the pressure-resistant polymerization apparatus, and the temperature inside the pressure-resistant polymerization apparatus was raised to 45° C. Subsequently, 0.03 parts by weight of paramenthane hydroperoxide (PHP) was introduced into the pressure-resistant polymerization apparatus, and then 0.10 parts by weight of sodium formaldehyde sulfoxylate (SFS) was introduced into the pressure-resistant polymerization apparatus. Polymerization was then started. At the time 13 hours had elapsed from the start of the polymerization, residual monomers not used in the polymerization were removed by devolatilization under reduced pressure, and thereby the polymerization was ended. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-4), which contained an elastic body containing polybutadiene rubber as a main component, was obtained. The volume-average particle size of the elastic body contained in the obtained aqueous latex was 70 nm.

Production Example 1-5: Preparation of Polystyrene-Butadiene Rubber Latex (R-5)

Into a pressure-resistant polymerization apparatus were introduced 160 parts by weight of deionized water, 0.002 parts by weight of EDTA, 0.001 parts by weight of ferrous sulfate heptahydrate, 0.02 parts by weight of polyoxyethylene lauryl ether phosphate, and 0.003 parts by weight of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 76.5 parts by weight of Bd and 23.5 parts by weight of styrene (St) were introduced into the pressure-resistant polymerization apparatus, and the temperature inside the pressure-resistant polymerization apparatus was raised to 45° C. Thereafter, 0.03 parts by weight of PHP was introduced into the pressure-resistant polymerization apparatus, and then 0.05 parts by weight of SFS was introduced into the pressure-resistant polymerization apparatus. Polymerization was then started. At the time 25 hours had elapsed from the start of the polymerization, residual monomers not used in the polymerization were removed by devolatilization under reduced pressure, and thereby the polymerization was ended. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-5), which contained an elastic body containing polystyrene-butadiene rubber as a main component, was obtained. The volume-average particle size of the elastic body contained in the obtained aqueous latex was 220 nm.

Production Example 1-6: Preparation of Polystyrene-Butadiene Rubber Latex (R-6)

Into a pressure-resistant polymerization apparatus were introduced 160 parts by weight of deionized water, 0.002 parts by weight of EDTA, 0.001 parts by weight of ferrous sulfate heptahydrate, 0.06 parts by weight of polyoxyethylene lauryl ether phosphate, and 0.003 parts by weight of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 76.5 parts by weight of Bd and 23.5 parts by weight of styrene (St) were introduced into the pressure-resistant polymerization apparatus, and the temperature inside the pressure-resistant polymerization apparatus was raised to 45° C. Thereafter, 0.03 parts by weight of PHP was introduced into the pressure-resistant polymerization apparatus, and then 0.05 parts by weight of SFS was introduced into the pressure-resistant polymerization apparatus. Polymerization was then started. At the time 25 hours had elapsed from the start of the polymerization, residual monomers not used in the polymerization were removed by devolatilization under reduced pressure, and thereby the polymerization was ended. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-6), which contained an elastic body containing polystyrene-butadiene rubber as a main component, was obtained. The volume-average particle size of the elastic body contained in the obtained aqueous latex was 160 nm.

Production Example 1-7: Preparation of Polystyrene-Butadiene Rubber Latex (R-7)

Into a pressure-resistant polymerization apparatus were introduced 160 parts by weight of deionized water, 0.002 parts by weight of EDTA, 0.001 parts by weight of ferrous sulfate heptahydrate, 0.08 parts by weight of polyoxyethylene lauryl ether phosphate, and 0.003 parts by weight of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 76.5 parts by weight of Bd and 23.5 parts by weight of styrene (St) were introduced into the pressure-resistant polymerization apparatus, and the temperature inside the pressure-resistant polymerization apparatus was raised to 45° C. Thereafter, 0.03 parts by weight of PHP was introduced into the pressure-resistant polymerization apparatus, and then 0.05 parts by weight of SFS was introduced into the pressure-resistant polymerization apparatus. Polymerization was then started. At the time 25 hours had elapsed from the start of the polymerization, residual monomers not used in the polymerization were removed by devolatilization under reduced pressure, and thereby the polymerization was ended. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-7), which contained an elastic body containing polystyrene-butadiene rubber as a main component, was obtained. The volume-average particle size of the elastic body contained in the obtained aqueous latex was 140 nm.

<2. Preparation of Fine Polymer Particles (A) (Formation of Graft Part by Polymerization)>

Production Example 2-1; Preparation of Fine Polymer Particle Latex (L-1)

Into a glass reaction vessel were introduced 172 parts by weight of the polystyrene-polybutadiene rubber latex (R-3) (including 60 parts by weight of the elastic body containing polystyrene-polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-1) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-1) was 30%.

Production Example 2-2; Preparation of Fine Polymer Particle Latex (L-2)

Into a glass reaction vessel were introduced 172 parts by weight of the polybutadiene rubber latex (R-2) (including 60 parts by weight of the elastic body containing polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-2) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the aqueous latex (L-2) was 30%.

Production Example 2-3; Preparation of Fine Polymer Particle Latex (L-3)

Into a glass reaction vessel were introduced 172 parts by weight of the polystyrene-polybutadiene rubber latex (R-3) (including 60 parts by weight of the elastic body containing polystyrene-polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-3) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-3) was 30%.

Production Example 2-4; Preparation of Fine Polymer Particle Latex (L-4)

Into a glass reaction vessel were introduced 172 parts by weight of the polystyrene-polybutadiene rubber latex (R-3) (including 60 parts by weight of the elastic body containing polystyrene-polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of cumene hydroperoxide (CHP) was added continuously to the glass reaction vessel over 80 minutes. Subsequently, 0.012 parts by weight of CHP was added to the glass reaction vessel, and the resultant mixture in the glass reaction vessel was stirred for another hour so as to finish polymerization. Through the above operations was obtained an aqueous latex (L-4) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-4) was 30%.

Production Example 2-5; Preparation of Fine Polymer Particle Latex (L-5)

Into a glass reaction vessel were introduced 172 parts by weight of the polybutadiene rubber latex (R-1) (including 60 parts by weight of the elastic body containing polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-5) containing the fine polymer particles (A). 99% or more of the monomer component had been polymerized. The volume-average particle size of the fine polymer particles (A) contained in the obtained aqueous latex was 80 nm. The solid content concentration (concentration of the fine polymer particles (A)) of the obtained aqueous latex (L-5) was 30%.

Production Example 2-6; Preparation of Fine Polymer Particle Latex (L-6)

Into a glass reaction vessel were introduced 172 parts by weight of the polystyrene-polybutadiene rubber latex (R-4) (including 60 parts by weight of the elastic body containing polystyrene-polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-6) containing the fine polymer particles (A). 99% or more of the monomer component had been polymerized. The volume-average particle size of the fine polymer particles (A) contained in the obtained aqueous latex was 80 nm. The solid content concentration (concentration of the fine polymer particles (A)) of the obtained aqueous latex (L-6) was 30%.

Production Example 2-7; Preparation of Fine Polymer Particle Latex (L-7)

Into a glass reaction vessel were introduced 172 parts by weight of the polystyrene-polybutadiene rubber latex (R-3) (including 60 parts by weight of the elastic body containing polystyrene-polybutadiene rubber as a main component) and 288 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-7) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-7) was 20%.

Production Example 2-8; Preparation of Fine Polymer Particle Latex (L-8)

Into a glass reaction vessel were introduced 172 parts by weight of the polystyrene-polybutadiene rubber latex (R-3) (including 60 parts by weight of the elastic body containing polystyrene-polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.34 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-8) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-8) was 30%.

Production Example 2-9; Preparation of Fine Polymer Particle Latex (L-9)

Into a glass reaction vessel were introduced 172 parts by weight of the polystyrene-polybutadiene rubber latex (R-5) (including 60 parts by weight of the elastic body containing polystyrene-polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-9) containing the fine polymer particles (A). 99% or more of the monomer component had been polymerized. The volume-average particle size of the fine polymer particles (A) contained in the obtained aqueous latex was 230 nm. The solid content concentration (concentration of the fine polymer particles (A)) of the obtained aqueous latex (L-9) was 30%.

Production Example 2-10; Preparation of Fine Polymer Particle Latex (L-10)

Into a glass reaction vessel were introduced 172 parts by weight of the polystyrene-polybutadiene rubber latex (R-6) (including 60 parts by weight of the elastic body containing polystyrene-polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-10) containing the fine polymer particles (A). 99% or more of the monomer component had been polymerized. The volume-average particle size of the fine polymer particles (A) contained in the obtained aqueous latex was 170 nm. The solid content concentration (concentration of the fine polymer particles (A)) of the obtained aqueous latex (L-10) was 30%.

Production Example 2-11; Preparation of Fine Polymer Particle Latex (L-11)

Into a glass reaction vessel were introduced 172 parts by weight of the polystyrene-polybutadiene rubber latex (R-7) (including 60 parts by weight of the elastic body containing polystyrene-polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 38 parts by weight of methyl methacrylate (MMA), 2 parts by weight of butyl acrylate, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-11) containing the fine polymer particles (A). 99% or more of the monomer component had been polymerized. The volume-average particle size of the fine polymer particles (A) contained in the obtained aqueous latex was 150 nm. The solid content concentration (concentration of the fine polymer particles (A)) of the obtained aqueous latex (L-11) was 30%.

Production Example 2-12; Preparation of Fine Polymer Particle Latex (L-14)

Into a glass reaction vessel were introduced 201 parts by weight of the polystyrene-polybutadiene rubber latex (R-3) (including 70 parts by weight of the elastic body containing polystyrene-polybutadiene rubber as a main component) and 109 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 28.5 parts by weight of methyl methacrylate (MMA), 1.5 parts by weight of butyl acrylate, and 0.1 parts by weight of t-butyl hydroperoxide (BHP) was added continuously to the glass reaction vessel over 60 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-14) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-14) was 30%.

Production Example 2-13; Preparation of Fine Polymer Particle Latex (L-15)

Into a glass reaction vessel were introduced 230 parts by weight of the polystyrene-polybutadiene rubber latex (R-3) (including 80 parts by weight of the elastic body containing polystyrene-polybutadiene rubber as a main component) and 90 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 19 parts by weight of methyl methacrylate (MMA), 1 part by weight of butyl acrylate, and 0.1 parts by weight of t-butyl hydroperoxide (BHP) was added continuously to the glass reaction vessel over 40 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-15) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-15) was 30%.

Production Example 2-14; Preparation of Fine Polymer Particle Latex (L-16)

Into a glass reaction vessel were introduced 201 parts by weight of the polybutadiene rubber latex (R-2) (including 70 parts by weight of the elastic body containing polybutadiene rubber as a main component) and 109 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 28.5 parts by weight of methyl methacrylate (MMA), 1.5 parts by weight of butyl acrylate, and 0.1 parts by weight of t-butyl hydroperoxide (BHP) was added continuously to the glass reaction vessel over 60 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-16) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-16) was 30%.

Production Example 2-15; Preparation of Fine Polymer Particle Latex (L-17)

Into a glass reaction vessel were introduced 230 parts by weight of the polybutadiene rubber latex (R-2) (including 80 parts by weight of the elastic body containing polybutadiene rubber as a main component) and 90 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 19 parts by weight of methyl methacrylate (MMA), 1 part by weight of butyl acrylate, and 0.1 parts by weight of t-butyl hydroperoxide (BHP) was added continuously to the glass reaction vessel over 40 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-17) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-17) was 30%.

Production Example 2-16; Preparation of Fine Polymer Particle Latex (L-18)

Into a glass reaction vessel were introduced 244 parts by weight of the polybutadiene rubber latex (R-2) (including 85 parts by weight of the elastic body containing polybutadiene rubber as a main component) and 81 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 14.25 parts by weight of methyl methacrylate (MMA), 0.75 parts by weight of butyl acrylate, and 0.1 parts by weight of t-butyl hydroperoxide (BHP) was added continuously to the glass reaction vessel over 30 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-18) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-18) was 30%.

Production Example 2-17; Preparation of Fine Polymer Particle Latex (L-19)

Into a glass reaction vessel were introduced 258 parts by weight of the polybutadiene rubber latex (R-2) (including 90 parts by weight of the elastic body containing polybutadiene rubber as a main component) and 72 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 9.5 parts by weight of methyl methacrylate (MMA), 0.5 parts by weight of butyl acrylate, and 0.1 parts by weight of t-butyl hydroperoxide (BHP) was added continuously to the glass reaction vessel over 20 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-19) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-19) was 30%.

Production Example 2-18; Preparation of Fine Polymer Particle Latex (L-20)

Into a glass reaction vessel were introduced 172 parts by weight of the polybutadiene rubber latex (R-2) (including 60 parts by weight of the elastic body containing polybutadiene rubber as a main component) and 128 parts by weight of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.003 parts by weight of EDTA, 0.0007 parts by weight of ferrous sulfate heptahydrate, and 0.14 parts by weight of SFS were added to the glass reaction vessel, and the resultant mixture was stirred for 10 minutes. Thereafter, a mixture of 20 parts by weight of methyl methacrylate (MMA), 20 parts by weight of styrene, and 0.1 parts by weight of t-butyl hydroperoxide (BHP) was added continuously to the glass reaction vessel over 80 minutes. Subsequently, 0.012 parts by weight of BHP was added to the glass reaction vessel, and the resultant mixture in the glass reaction vessel was stirred for another hour so as to finish polymerization. Through the above operations was obtained an aqueous latex (L-20) containing the fine polymer particles (A). 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-20) was 30%.

<3. Preparation of Powdery and/or Granular Material>

[Example 1A] (Production Example 3-1: Preparation of Powdery and/or Granular Material (P-1))

600 parts by weight of ion exchanged water having 4 parts by weight of calcium chloride dissolved therein and having its temperature controlled to 70° C. was prepared. Furthermore, 333 parts by weight of the aqueous latex (L-1) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-1) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 2A] (Production Example 3-2: Preparation of Powdery and/or Granular Material (P-2))

600 parts by weight of ion exchanged water having 4 parts by weight of calcium chloride dissolved therein and having its temperature controlled to 70° C. was prepared. Furthermore, 333 parts by weight of the aqueous latex (L-2) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-2) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Comparative Example 1A] (Production Example 3-3: Preparation of Powdery and/or Granular Material (P-3))

600 parts by weight of ion exchanged water having 4 parts by weight of calcium chloride dissolved therein and having its temperature controlled to 70° C. was prepared. Furthermore, 333 parts by weight of the aqueous latex (L-3) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-3) was obtained.

[Example 3A] (Production Example 3-4: Preparation of Powdery and/or Granular Material (P-4))

600 parts by weight of ion exchanged water having 4 parts by weight of calcium chloride dissolved therein and having its temperature controlled to 70° C. was prepared. Furthermore, 333 parts by weight of the aqueous latex (L-4) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-4) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Comparative Example 2A] (Production Example 3-5: Preparation of Powdery and/or Granular Material (P-5))

600 parts by weight of ion exchanged water having 4 parts by weight of calcium chloride dissolved therein and having its temperature controlled to 70° C. was prepared. Furthermore, 333 parts by weight of the aqueous latex (L-5) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-5) was obtained.

[Comparative Example 3A] (Production Example 3-6: Preparation of Powdery and/or Granular Material (P-6))

600 parts by weight of ion exchanged water having 4 parts by weight of calcium chloride dissolved therein and having its temperature controlled to 70° C. was prepared. Furthermore, 333 parts by weight of the aqueous latex (L-6) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-6) was obtained.

[Example 4A] (Production Example 3-7: Preparation of Powdery and/or Granular Material (P-7))

600 parts by weight of ion exchanged water having 4 parts by weight of calcium chloride dissolved therein and having its temperature controlled to 70° C. was prepared. Furthermore, 500 parts by weight of the aqueous latex (L-7) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-7) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 5A] (Production Example 3-8: Preparation of Powdery and/or Granular Material (P-8))

600 parts by weight of ion exchanged water having 4 parts by weight of calcium chloride dissolved therein and having its temperature controlled to 70° C. was prepared. Furthermore, 333 parts by weight of the aqueous latex (L-8) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-8) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 6A] (Production Example 3-9: Preparation of Powdery and/or Granular Material (P-9))

600 parts by weight of ion exchanged water having 4 parts by weight of calcium chloride dissolved therein and having its temperature controlled to 70° C. was prepared. Furthermore, 333 parts by weight of the aqueous latex (L-9) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-9) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 7A] (Production Example 3-10: Preparation of Powdery and/or Granular Material (P-10))

600 parts by weight of ion exchanged water having 4 parts by weight of calcium chloride dissolved therein and having its temperature controlled to 70° C. was prepared. Furthermore, 333 parts by weight of the aqueous latex (L-10) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-10) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 8A] (Production Example 3-11: Preparation of Powdery and/or Granular Material (P-11))

600 parts by weight of ion exchanged water having 4 parts by weight of calcium chloride dissolved therein and having its temperature controlled to 70° C. was prepared. Furthermore, 333 parts by weight of the aqueous latex (L-11) (equivalent to 100 parts by weight of the fine polymer particles (A)) and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-11) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 9A] (Production Example 3-12: Preparation of Powdery and/or Granular Material (P-12))

Into a glass reaction vessel equipped with a thermometer, a stirrer, a reflux condenser, a nitrogen inlet, and a monomer adding device were introduced 220 parts by weight of deionized water, 0.9 parts of polyoxyethylene lauryl ether phosphate, and 0.1 parts of sodium hydroxide. While the materials thus introduced were stirred at 68° C., the headspace of the glass reaction vessel was sufficiently replaced with nitrogen, so as to remove oxygen from the glass reaction vessel. Next, a mixture of 100 parts by weight of BA, 7.0 parts by weight of 2-ethylhexyl thioglycolate, and 1.0 part by weight of BHP was added continuously to the glass reaction vessel over 300 minutes. Next, 0.05 parts by weight of BHP was added to the glass reaction vessel, and the reaction mixture was stirred for another hour to finish polymerization. Through these operations, aqueous emulsion (L-12) containing polybutyl acrylate as resin (D) was obtained. 99% or more of the monomer component had been polymerized. The volume-average particle size of the resin (D) contained in the aqueous emulsion (L-12) was 80 nm, and the solid content concentration (concentration of resin (D)) of the aqueous emulsion (L-12) was 33%.

600 parts by weight of ion exchanged water having 4 parts by weight of calcium chloride dissolved therein and having its temperature controlled to 70° C. was prepared. Furthermore, 333 parts by weight of the aqueous latex (L-1) (equivalent to 100 parts by weight of the fine polymer particles (A)), 16.1 parts by weight of the aqueous resin emulsion (L-12) (equivalent to 5.3 parts by weight of the resin (D)), and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-12) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 10A] (Production Example 3-13: Preparation of Powdery and/or Granular Material (P-13))

600 parts by weight of ion exchanged water having 4 parts by weight of calcium chloride dissolved therein and having its temperature controlled to 70° C. was prepared. Furthermore, 333 parts by weight of the aqueous latex (L-1) (equivalent to 100 parts by weight of the fine polymer particles (A)), 8.8 parts by weight of an aqueous emulsion of liquid-state epoxy resin W2821R70 (L-13) (which is resin (D)) (manufactured by Mitsubishi Chemical Corporation, solid content concentration: 70% by weight, epoxy resin content: 60%) (equivalent to 5.3 parts by weight of epoxy resin), and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-13) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 11A] (Production Example 3-14: Preparation of Powdery and/or Granular Material (P-14))

600 parts by weight of ion exchanged water having 4 parts by weight of calcium chloride dissolved therein and having its temperature controlled to 70° C. was prepared. Furthermore, 333 parts by weight of the aqueous latex (L-14) (equivalent to 100 parts by weight of the fine polymer particles (A)), 8.8 parts by weight of an aqueous emulsion of liquid-state epoxy resin W2821R70 (L-13) (which is resin (D)) (manufactured by Mitsubishi Chemical Corporation, solid content concentration: 70% by weight, epoxy resin content: 60%) (equivalent to 5.3 parts by weight of epoxy resin), and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-14) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 12A] (Production Example 3-15: Preparation of Powdery and/or Granular Material (P-15))

600 parts by weight of ion exchanged water having 4 parts by weight of calcium chloride dissolved therein and having its temperature controlled to 70° C. was prepared. Furthermore, 333 parts by weight of the aqueous latex (L-15) (equivalent to 100 parts by weight of the fine polymer particles (A)), 8.8 parts by weight of an aqueous emulsion of liquid-state epoxy resin W2821R70 (L-13) (which is resin (D)) (manufactured by Mitsubishi Chemical Corporation, solid content concentration: 70% by weight, epoxy resin content: 60%) (equivalent to 5.3 parts by weight of epoxy resin), and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-15) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 13A] (Production Example 3-16: Preparation of Powdery and/or Granular Material (P-16))

600 parts by weight of ion exchanged water having 4 parts by weight of calcium chloride dissolved therein and having its temperature controlled to 70° C. was prepared. Furthermore, 333 parts by weight of the aqueous latex (L-16) (equivalent to 100 parts by weight of the fine polymer particles (A)), 8.8 parts by weight of an aqueous emulsion of liquid-state epoxy resin W2821R70 (L-13) (which is resin (D)) (manufactured by Mitsubishi Chemical Corporation, solid content concentration: 70% by weight, epoxy resin content: 60%) (equivalent to 5.3 parts by weight of epoxy resin), and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-16) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

[Example 14A] (Production Example 3-17: Preparation of Powdery and/or Granular Material (P-17))

600 parts by weight of ion exchanged water having 4 parts by weight of calcium chloride dissolved therein and having its temperature controlled to 70° C. was prepared. Furthermore, 333 parts by weight of the aqueous latex (L-17) (equivalent to 100 parts by weight of the fine polymer particles (A)), 8.8 parts by weight of an aqueous emulsion of liquid-state epoxy resin W2821R70 (L-13) (which is resin (D)) (manufactured by Mitsubishi Chemical Corporation, solid content concentration: 70% by weight, epoxy resin content: 60%) (equivalent to 5.3 parts by weight of epoxy resin), and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-17) was obtained. The obtained powdery and/or granular material was evaluated for anti-blocking property, and evaluated as “acceptable”. The obtained powdery and/or granular material was measured for the volume-average particle size, and the volume-average particle size was not more than 10 mm.

[Example 15A] (Production Example 3-18: Preparation of Powdery and/or Granular Material (P-18))

600 parts by weight of ion exchanged water having 4 parts by weight of calcium chloride dissolved therein and having its temperature controlled to 70° C. was prepared. Furthermore, 333 parts by weight of the aqueous latex (L-18) (equivalent to 100 parts by weight of the fine polymer particles (A)), 8.8 parts by weight of an aqueous emulsion of liquid-state epoxy resin W2821R70 (L-13) (which is resin (D)) (manufactured by Mitsubishi Chemical Corporation, solid content concentration: 70% by weight, epoxy resin content: 60%) (equivalent to 5.3 parts by weight of epoxy resin), and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-18) was obtained. The obtained powdery and/or granular material was evaluated for anti-blocking property, and evaluated as “acceptable”. The obtained powdery and/or granular material was measured for the volume-average particle size, and the volume-average particle size was not more than 10 mm.

[Example 16A] (Production Example 3-19: Preparation of Powdery and/or Granular Material (P-19))

600 parts by weight of ion exchanged water having 4 parts by weight of calcium chloride dissolved therein and having its temperature controlled to 70° C. was prepared. Furthermore, 333 parts by weight of the aqueous latex (L-19) (equivalent to 100 parts by weight of the fine polymer particles (A)), 8.8 parts by weight of an aqueous emulsion of liquid-state epoxy resin W2821R70 (L-13) (which is resin (D)) (manufactured by Mitsubishi Chemical Corporation, solid content concentration: 70% by weight, epoxy resin content: 60%) (equivalent to 5.3 parts by weight of epoxy resin), and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-19) was obtained. The obtained powdery and/or granular material was evaluated for anti-blocking property, and evaluated as “acceptable”. The obtained powdery and/or granular material was measured for the volume-average particle size, and the volume-average particle size was not more than 10 mm.

[Example 17A] (Production Example 3-20: Preparation of Powdery and/or Granular Material (P-20))

600 parts by weight of ion exchanged water having 4 parts by weight of calcium chloride dissolved therein and having its temperature controlled to 70° C. was prepared. Furthermore, 333 parts by weight of the aqueous latex (L-20) (equivalent to 100 parts by weight of the fine polymer particles (A)), 8.8 parts by weight of an aqueous emulsion of liquid-state epoxy resin W2821R70 (L-13) (which is resin (D)) (manufactured by Mitsubishi Chemical Corporation, solid content concentration: 70% by weight, epoxy resin content: 60%) (equivalent to 5.3 parts by weight of epoxy resin), and 1.1 parts by weight of Irganox 1135 (octyl 3-(4-hydroxy-3,5-diisopropylphenyl) propionate, manufactured by BASF Japan Ltd.) were mixed to obtain an aqueous latex. The obtained aqueous latex was introduced into 600 parts by weight of the ion exchanged water, and a slurry containing a flocculate containing the fine polymer particles (A) was obtained. The obtained slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-20) was obtained. The obtained powdery and/or granular material was evaluated for anti-blocking property, and evaluated as “acceptable”. The obtained powdery and/or granular material was measured for the volume-average particle size, and the volume-average particle size was not more than 10 mm.

The powdery and/or granular materials (P-1) to (P-20) were measured for their physical properties (particle size, amount of free polymer (FP) contained (FP content), weight-average molecular weight of graft part correlated with weight-average molecular weight of FP, MEK insoluble part, proportion of elastic body in fine polymer particles (A) (proportion of elastic body), graft rate, and composition of graft part of fine polymer particles (A) (graft part composition)). The results are shown in Table 1.

<Preparation of Resin Composition>

Furthermore, 20 parts by weight of a powdery and/or granular material (each of the powdery and/or granular materials (P-1) to (P-20)) and 80 parts by weight of bisphenol A epoxy resin (JER828 manufactured by Mitsubishi Chemical Corporation) were weighed out and mixed with use of a planetary centrifugal mixer at 2000 rpm for 80 minutes. In this way, resin compositions were obtained. Each of the obtained resin compositions was evaluated for dispersibility (30 minutes, 80 minutes) and blend viscosity. The results are shown in Table 1.

TABLE 1

| | | | Physical properties of powdery and/or granular material | | | | | | | Physical properties of resin composition | | |
|---|---|---|---|---|---|---|---|---|---|---|---|---|
| | Powdery and/or granular material | Elastic body | Particle size (nm) | FP content (%) | Molecular weight of graft part (Mw) | MEK insoluble part (%) | Proportion of elastic body | Graft rate (%) | Composition of graft part | Dispersibility in 30 min. (μm) | Dispersibility in 80 min. (μm) | Blend viscosity (mPa · s) SR(s − 1) = 1 |
| Ex. 1A | P-1 | SBR | 200 | 5.4 | 137,427 | 92.5 | 60 | 86.2 | MMA(38)/BA(2) | 100 | 0 | 26,988 |
| Ex. 2A | P-2 | Bd | 200 | 4.3 | 124,397 | 93.0 | 60 | 89.0 | MMA(38)/BA(2) | 100 | 0 | 17,463 |
| Com. Ex. 1A | P-3 | SBR | 200 | 6.3 | 212,002 | 91.3 | 60 | 83.9 | MMA(38)/BA(2) | 100 | 0 | 111,000 |
| Ex. 3A | P-4 | SBR | 200 | 10 | 123,272 | 87.3 | 60 | 74.3 | MMA(38)/BA(2) | 100 | 0 | 41,276 |
| Com. Ex. 2A | P-5 | Bd | 80 | 1.9 | 75,683 | 94.6 | 60 | 95.1 | MMA(38)/BA(2) | 100 | 100 | — |
| Com. Ex. 3A | P-6 | SBR | 80 | 1.8 | 75,156 | 95.1 | 60 | 95.4 | MMA(38)/BA(2) | 100 | 50 | — |
| Ex. 4A | P-7 | SBR | 200 | 7.2 | 170,995 | 90.0 | 60 | 81.5 | MMA(38)/BA(2) | 100 | 0 | 71,438 |
| Ex. 5A | P-8 | SBR | 200 | 7.3 | 71,547 | 89.6 | 60 | 81.2 | MMA(38)/BA(2) | 100 | 0 | 17,463 |
| Ex. 6A | P-9 | SBR | 230 | 7.6 | 132,391 | 90.6 | 60 | 80.7 | MMA(38)/BA(2) | 100 | 0 | 30,412 |
| Ex. 7A | P-10 | SBR | 170 | 4.9 | 116,544 | 93.7 | 60 | 87.6 | MMA(38)/BA(2) | 100 | 0 | 29,856 |
| Ex. 8A | P-11 | SBR | 150 | 2.6 | 112,479 | 95.5 | 60 | 93.4 | MMA(38)/BA(2) | 100 | 0 | 22,453 |
| Ex. 9A | P-12 | SBR | 200 | 5 | 129,939 | 83.2 | 60 | 85.8 | MMA(38)/BA(2) | 0 | 0 | 22,225 |
| Ex. 10A | P-13 | SBR | 200 | 5.1 | 137,087 | 83.4 | 60 | 85.6 | MMA(38)/BA(2) | 0 | 0 | 23,813 |
| Ex. 11A | P-14 | SBR | 200 | 2.5 | 136,262 | 86.4 | 70 | 90.6 | MMA(28.5)/BA(1.5) | 0 | 0 | 7,938 |
| Ex. 12A | P-15 | SBR | 200 | 1.4 | 95,695 | 86.3 | 80 | 92.0 | MMA(19)/BA(1) | 0 | 0 | 3,175 |
| Ex. 13A | P-16 | Bd | 200 | 3.3 | 136,758 | 84.3 | 70 | 87.4 | MMA(28.5)/BA(1.5) | 0 | 0 | 6,350 |
| Ex. 14A | P-17 | Bd | 200 | 1.4 | 164,987 | 87.6 | 80 | 92.1 | MMA(19)/BA(1) | 0 | 0 | 3,175 |
| Ex. 15A | P-18 | Bd | 200 | 1.9 | 145,759 | 87.0 | 85 | 85.8 | MMA(14.25)/BA(0.75) | 0 | 0 | 1,588 |
| Ex. 16A | P-19 | Bd | 200 | 1.6 | 147,409 | 87.0 | 90 | 81.9 | MMA(9.5)/BA(0.5) | 0 | 0 | 4,763 |
| Ex. 17A | P-20 | Bd | 200 | 9.9 | 121,084 | 79.1 | 60 | 72.2 | MMA(20)/St(20) | 0 | 0 | 33,338 |

Note:
Ex. stands for Example, Com.Ex. stands for Comparative Example

Example B

<Evaluation Method>

First, the following description discusses a method for evaluating antifouling paint compositions for an underwater structure produced in Examples and Comparative Examples. In the following description, the meaning of the term "fine polymer particles" includes both the fine polymer particles (A') (which are fine polymer particles in accordance with one or more embodiments of the present invention) and fine polymer particles outside the scope of the present invention, unless otherwise specifically noted.

(Measurement of Volume-Average Particle Size)

Measurement of volume-average particle size was carried out in the same manner as described in Embodiment 1. The foregoing descriptions apply.

(Differential Scanning Calorimetry (DSC) of Resin (D))

Measurement was carried out using the resin (D) (a mixture of 67 parts by weight of epoxidized soybean oil [ADK CIZER O-130P manufactured by ADEKA CORPORATION] and 33 parts by weight of triethylene glycol bis[3-(−t-butyl-4-hydroxy-5-methylphenyl)propionate] [Irganox 245, manufactured by BASF JAPAN LTD.]) used in the antifouling paint compositions for an underwater structure with use of a DSC7020 (manufactured by Hitachi High-Tech Science Corporation) at a temperature increase rate of 10° C./min. As a result, it showed −17.3° C.

(Measurement of Viscosity of Resin (D))

Viscosity was measured using the resin (D) (a mixture of 67 parts by weight of epoxidized soybean oil [ADK CIZER O-130P manufactured by ADEKA CORPORATION] and 33 parts by weight of triethylene glycol bis[3-(4-butyl-4-hydroxy-5-methylphenyl)propionate] [Irganox 245, manufactured by BASF JAPAN LTD.]) used in in the antifouling paint compositions for an underwater structure, at a measurement temperature of 25° C. using a digital viscometer DV-II+Pro manufactured by BROOKFIELD and also using a spindle CPE-52 for some viscosity ranges, under the conditions in which shear rate was changed as necessary. As a result, it showed 1800 mPa·s.

(Method for Preparing Planar Plate Made of Fine Polymer Particles or Planar Plate Made of Mixture of Fine Polymer Particles and Resin (D))

The powdery and/or granular materials (P-1) and (P-6) to (P-8) were used as fine polymer particles. The powdery and/or granular materials (P-2) to (P-5) were used as mixtures of fine polymer particles and the resin (D). The powdery and/or granular material obtained in each production example was rolled under the conditions at 200° C., and then pressed under the conditions at 200° C. and at 100 kgf/cm$^2$, thereby shaping the powdery and/or granular material into the form of a plate. Through such shaping, a planar plate made of the fine polymer particles (A') or a planar plate made of a mixture of fine polymer particles and the resin (D) was obtained. The thickness of the planar plate was 1 mm.

(Method for Measuring Glass Transition Temperature of Fine Polymer Particles or Grass Transition Temperature of Mixture of Fine Polymer Particles and Resin (D))

A graph of tan δ was obtained by carrying out dynamic viscoelasticity measurement with respect to a planar plate made of fine polymer particles or a planar plate made of a mixture of fine polymer particles and the resin (D), with use of a dynamic viscoelasticity measurement device DVA-200 (IT Keisoku Seigyo Kabushikigaisha) under a tension condition. In the graph of tan δ thus obtained, the peak temperature of tan δ was regarded as the glass transition temperature. In a case where two peaks were found in the graph of tan δ, the lower peak temperature was regarded as the glass transition temperature of the fine polymer particles or the mixture of the fine polymer particles and the resin (D) in the present specification. The results are shown in Table 2.

(Method of Measuring Strength at Break, Elongation, and Elastic Modulus of Fine Polymer Particles or of Mixture of Fine Polymer Particles and Resin (D))

A dumbbell shape in JISK-7113-2 was cut from a planar plate made of fine polymer particles or from a planar plate made of a mixture of fine polymer particles and the resin (D), and used as a sample. With use of the obtained sample, a tensile test was carried out using a tensile tester manufactured by Shimadzu Corporation at 10 mm/minute, and strength at break, elongation, and elastic modulus were measured. Note that the sample was pulled at 10 mm/minute, and the stress at the point in time in which the sample was broken was regarded as "strength at break" and the elongation of the sample at the point in time in which the sample was broken was regarded as "elongation". The results are shown in Table 2.

(Method of Measuring Contact Angle on Fine Polymer Particles or on Mixture of Fine Polymer Particles and Resin (D))

With use of a planar plate made of fine polymer particles (A') or a planar plate made of a mixture of fine polymer particles and the resin (D), contact angle was measured using a contact angle meter. The results are shown in Table 2.

(Anti-Blocking Property of Mixture of Fine Polymer Particles and Resin (D) (Powdery and/or Granular Material))

With use of each of the powdery and/or granular materials obtained in the Production Examples, the following operations (1) to (3) were carried out in this order to prepare a block of the powdery and/or granular material. (1) 30 g of the powdery and/or granular material was placed in a cylindrical container having a diameter of 50 mm. (2) A load of 6.3 kg was applied to the powdery and/or granular material after allowed to stand at 60° C. for 2 hours by placing a 6.3 kg weight on the powdery and/or granular material in the container. (3) The obtained block was removed from the container. Next, a force required to break the obtained block of the powdery and/or granular material was measured using a rheometer. The anti-blocking property was evaluated on the basis of the obtained result with reference to the following criteria.

Acceptable: A force required to break the block of the powdery and/or granular material is not more than 30000 Pa.

Unacceptable: A force required to break the block of the powdery and/or granular material is more than 30000 Pa.

(Method of Preparing Coating Film Made of Antifouling Paint Composition for Underwater Structure)

Each of the antifouling paint compositions for an underwater structure obtained in the Examples and Comparative Examples was applied to a Teflon (registered trademark) sheet such that the layer of the antifouling paint composition would be 100 μm in thickness. The obtained Teflon (registered trademark) sheet was allowed to stand at 23° C. for 2 days, and a coating film made of the antifouling paint composition for an underwater structure, having a thickness of 100 μm, was formed on the Teflon (registered trademark) sheet. The formed coating film was removed from the Teflon (registered trademark) sheet and used as a coating film.

(Method of Measuring Strength, Elongation, and Elastic Modulus of Coating Film)

A strip shape 1 cm in width was cut from the obtained coating film, and used as a sample. With use of the obtained sample, a tensile test was carried out using a tensile tester manufactured by Shimadzu Corporation at 20 mm/minute, and strength, elongation, and elastic modulus were measured. Note that the sample was pulled at 20 mm/minute, and the stress at the point in time in which the sample was broken was regarded as "strength" and the elongation of the sample at the point in time in which the sample was broken was regarded as "elongation". The results are shown in Table 3. Note that the coating film made of the antifouling paint composition for an underwater structure of Comparative Example 3 was too brittle to be subjected to the tensile test. Therefore, the result of Comparative Example 3 is described as "Unmeasurable".

(Method of Measuring Contact Angle on Coating Film)

A strip shape 1 cm in width was cut from the obtained coating film, and used as a sample. With use of the obtained sample, contact angle was measured using a contact angle meter. The results are shown in Table 3.

(Method of Determining Whether or not there is Foreign Matter in Coating Film)

The surface of the obtained coating film was visually checked, and whether or not there is foreign matter was determined with reference to the following criteria. The results are shown in Table 3.

There is no foreign matter (absent): there are no visible particles of 0.2 mm or larger within an area of 9 cm$^2$ (width 3 cm×length 3 cm) or there is one such particle within the area.

There is foreign matter (present): there are two or more visible particles of 0.2 mm or larger within an area of 9 cm$^2$ (width 3 cm×length 3 cm).

<1. Preparation of Fine Polymer Particles (A')>

Production Example 1-1: Preparation of Aqueous Latex (L-1) Containing Fine Polymer Particles (A')

Into a pressure-resistant polymerization apparatus were introduced 160 parts by weight of deionized water, 0.002 parts by weight of disodium ethylenediaminetetraacetate (EDTA), 0.001 parts by weight of ferrous sulfate heptahydrate, 0.029 parts by weight of polyoxyethylene lauryl ether phosphate, and 0.003 parts by weight of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 76.5 parts by weight of butadiene (Bd) and 23.5 parts by weight of styrene (St) were introduced into the pressure-resistant polymerization apparatus, and the temperature inside the pressure-resistant polymerization apparatus was raised to 45° C. Thereafter, 0.03 parts by weight of paramenthane hydroperoxide (PHP) was introduced into the pressure-resistant polymerization apparatus, and then 0.05 parts by weight of sodium formaldehyde sulfoxylate (SFS) was introduced into the pressure-resistant polymerization apparatus. Polymerization was then started. At the time 20 hours had elapsed from the start of the polymerization, residual monomers not used in the polymerization were removed by devolatilization under reduced pressure, and thereby the polymerization was ended. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-1), which contained an elastic body containing polystyrene-butadiene rubber as a main component, was obtained. The volume-average particle size of the elastic body contained in the obtained aqueous latex was 192 nm.

Into a glass reaction vessel were introduced 250 parts by weight of the aqueous latex (R-1) of polystyrene-butadiene rubber (including 70 parts by weight of the elastic body containing polybutadiene rubber as a main component) and 82 parts by weight of deionized water. The glass reaction vessel had a thermometer, a stirrer, a reflux condenser, a nitrogen inlet, and a monomer adding device. While gas in the glass reaction vessel was replaced with nitrogen, the materials thus introduced were stirred at 60° C. Next, 2.6 parts by weight of 1,3-butylene glycol dimethacrylate and 0.07 parts by weight of t-butyl hydroperoxide (BHP) were added to the glass reaction vessel, and the resultant mixture was stirred for 10 minutes. Next, 0.004 parts by weight of EDTA, 0.001 parts by weight of ferrous sulfate heptahydrate, and 0.13 parts by weight of SFS were added to the glass reaction vessel, and the resultant mixture in the glass reaction vessel was stirred for 30 minutes. Next, 0.013 parts by weight of BHP was added to the glass reaction vessel, and the resultant mixture was stirred for another 30 minutes. Next, a mixture of 28.5 parts by weight of methyl methacrylate (MMA), 1.5 parts by weight of butyl acrylate (BA), and 0.085 parts by weight of BHP was continuously added to the glass reaction vessel over 120 minutes. Then, 0.013 parts by weight of BHP was added to the glass reaction vessel, and the resultant mixture in the glass reaction vessel was stirred for another hour so as to finish polymerization. Through the above operations was obtained an aqueous latex (L-1) containing the fine polymer particles (A'). 99% or more of the monomer component had been polymerized. The volume-average particle size of the fine polymer particles (A') contained in the obtained aqueous latex was 200 nm.

Production Example 1-2: Preparation of Aqueous Latex (L-2) Containing Fine Polymer Particles (A')

Into a pressure-resistant polymerization apparatus were introduced 168 parts by weight of deionized water and 0.04 parts by weight of sodium dodecylbenzenesulfonate (SDBS). Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 8.5 parts by weight of BA, 0.085 parts by weight of allyl methacrylate, and 0.0028 parts by weight of BHP were introduced into the pressure-resistant polymerization apparatus, and the temperature inside the pressure-resistant polymerization apparatus was raised to 60° C. Thereafter, 0.004 parts by weight of EDTA, 0.001 parts by weight of ferrous sulfate heptahydrate, and 0.2 parts by weight of SFS were introduced into the pressure-resistant polymerization apparatus. Polymerization was then started. At the time 30 minutes had elapsed from the start of the polymerization, 0.15 parts by weight of SDBS was introduced into the pressure-resistant polymerization apparatus. After another 10 minutes (at the time 40 minutes had elapsed from the start of the polymerization), a mixture of 61.5 parts by weight of BA, 0.615 parts by weight of allyl methacrylate, and 0.0203 parts by weight of BHP was continuously added to the pressure-resistant polymerization apparatus over 150 minutes. Next, the mixture in the pressure-resistant polymerization apparatus was stirred for another hour, and then a mixture of 28.5 parts by weight of MMA, 1.5 parts by weight of BA, and 0.085 parts by weight of BHP was continuously added to the pressure-resistant polymerization apparatus over 90 minutes. Next, 0.013 parts by weight of BHP was added to the pressure-resistant polymerization apparatus, and the mixture in the pressure-resistant polymerization apparatus was stirred for another hour, so as to end the polymerization. Through the above operations was obtained an aqueous latex (L-2) containing the fine polymer particles (A'). 99% or more of the monomer component had been polymerized. The volume-average particle size of the fine polymer particles (A') contained in the obtained aqueous latex was 187 nm.

Production Example 1-3: Preparation of Aqueous Latex (L-3) Containing Fine Polymer Particles (A')

251 parts by weight of deionized water, 0.5 parts by weight of SDS, 100 parts by weight of octamethylcyclotetrasiloxane (D4), 2 parts by weight of tetraethoxysilane, and 2 parts by weight of γ-acryloyloxypropyldimethoxymethylsilane were mixed to obtain a liquid mixture. The liquid mixture was stirred with a homomixer at 10000 rpm for 5 minutes to prepare an emulsion. The obtained emulsion was introduced at a time into a five-neck glass vessel. The glass vessel used here had a thermometer, a stirrer, a reflux condenser, a nitrogen inlet, and an inlet for monomer and emulsifying agent. While the materials thus introduced were stirred, (i) 1 part by weight (solid content) of 10% aqueous dodecylbenzenesulfonic acid (DSA) solution was added to the glass vessel, (ii) the temperature inside the glass vessel was raised to 80° C. over about 40 minutes, and then (iii) the materials were allowed to react at 80° C. for 6 hours. Next, the temperature inside the glass vessel was lowered to 25° C., and the materials were allowed to stand for 20 hours from when the temperature inside the glass vessel reached 25° C. Then, the pH of the reaction solution was adjusted to 6.8 with use of sodium hydroxide, thereby finishing the polymerization. Through the above operations was obtained an aqueous latex (R-2) containing an elastic body containing a polyorganosiloxane rubber as a main component. 87% of the monomer component had been polymerized. The volume-average particle size of the elastic body containing a polyorganosiloxane rubber as a main component, contained in the aqueous latex, was 280 nm.

Into a glass reaction vessel were introduced 275.5 parts by weight of the aqueous latex (R-2) of polyorganosiloxane rubber (including 70 parts by weight of the elastic body containing polyorganosiloxane rubber as a main component) and 121 parts by weight of deionized water. The glass reaction vessel had a thermometer, a stirrer, a reflux condenser, a nitrogen inlet, and a monomer adding device. While gas in the glass reaction vessel was replaced with nitrogen, the materials thus introduced were stirred at 60° C. Next, 2.6 parts by weight of 1,3-butylene glycol dimethacrylate and 0.07 parts by weight of BHP were added to the glass reaction vessel, and the resultant mixture was stirred for 10 minutes. Next, 0.004 parts by weight of EDTA, 0.001 parts by weight of ferrous sulfate heptahydrate, and 0.13 parts by weight of SFS were added to the glass reaction vessel, and the resultant mixture in the glass reaction vessel was stirred for 30 minutes. Next, 0.013 parts by weight of BHP was added to the glass reaction vessel, and the resultant mixture was stirred for another 30 minutes. Next, a mixture of 28.5 parts by weight of MMA, 1.5 parts by weight of BA, and 0.085 parts by weight of BHP was continuously added to the glass reaction vessel over 120 minutes. Then, 0.013 parts by weight of BHP was added to the glass reaction vessel, and the resultant mixture in the glass reaction vessel was stirred for another hour so as to finish polymerization. Through the above operations was obtained an aqueous latex (L-3) containing the fine polymer particles (A'). 99% or more of the monomer component had been polymerized. The volume-average particle size of the fine polymer particles (A') contained in the obtained aqueous latex was 292 nm.

Production Example 1-4: Preparation of Aqueous Latex (L-4) Containing Fine Polymer Particles Into a pressure-resistant polymerization apparatus were introduced 168 parts by weight of deionized water and 0.04 parts by weight of sodium dodecylbenzenesulfonate (SDBS). Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 8.5 parts by weight of MMA, 0.425 parts by weight of allyl methacrylate, and 0.0028 parts by weight of BHP were introduced into the pressure-resistant polymerization apparatus, and the temperature inside the pressure-resistant polymerization apparatus was raised to 60° C. Thereafter, 0.004 parts by weight of EDTA, 0.001 parts by weight of ferrous sulfate heptahydrate, and 0.2 parts by weight of SFS were introduced into the pressure-resistant polymerization apparatus. Polymerization was then started. At the time 30 minutes had elapsed from the start of the polymerization, 0.15 parts by weight of SDBS was introduced into the pressure-resistant polymerization apparatus. After another 10 minutes (at the time 40 minutes had elapsed from the start of the polymerization), a mixture of 61.5 parts by weight of MMA, 3.075 parts by weight of allyl methacrylate, and 0.0203 parts by weight of BHP was continuously added to the pressure-resistant polymerization apparatus over 150 minutes. Next, the mixture in the pressure-resistant polymerization apparatus was stirred for another hour, and then a mixture of 28.5 parts by weight of MMA, 1.5 parts by weight of BA, and 0.085 parts by weight of BHP was continuously added to the pressure-resistant polymerization apparatus over 90 minutes. Next, 0.013 parts by weight of BHP was added to the pressure-resistant polymerization apparatus, and the mixture in the pressure-resistant polymerization apparatus was stirred for another hour, so as to end the polymerization. Through the above operations was obtained an aqueous latex (L-4) containing the fine polymer particles 99% or more of the monomer component had been polymerized. The volume-average particle size of the fine polymer particles contained in the obtained aqueous latex was 169 nm. Note that the fine polymer particles obtained in Production Example 1-4 are not the fine polymer particles (A') in accordance with one or more embodiments of the present invention.

<2. Preparation of Powdery and/or Granular Material>

Production Example 2-1: Preparation of Powdery and/or Granular Material (P-1)

600 parts by weight of ion exchanged water having 4 parts by weight of calcium acetate dissolved therein and having its temperature controlled to 70° C. was prepared. Next, 325 parts by weight of the aqueous latex (L-1) (equivalent to 100 parts by weight of the fine polymer particles (A')) was introduced into 600 parts by weight of the ion exchanged water, and a slurry containing a flocculate containing the fine polymer particles (A') was obtained. Next, the slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-1) containing the fine polymer particles (A') was obtained.

Production Example 2-2: Preparation of Powdery and/or Granular Material (P-2)

A homogenizer was used to mix (i) water, (ii) 67 parts by weight of epoxidized soybean oil (resin (D)) (ADK CIZER O-130P manufactured by ADEKA CORPORATION) and 33 parts by weight of triethylene glycol bis[3-(4-butyl-4-hydroxy-5-methylphenyl)propionate] (Irganox 245, manufactured by BASF JAPAN LTD.), and (iii) SDBS which is an emulsifying agent to obtain an aqueous emulsion (S-1) (the amount of resin (D) contained is 50%) in which the resin (D) had been emulsified. Furthermore, 600 parts by weight of ion exchanged water having 4 parts by weight of calcium acetate dissolved therein and having its temperature controlled to 70° C. was prepared. Next, 325 parts by weight of the aqueous latex (L-1) (equivalent to 100 parts by weight of the fine polymer particles (A')) and 22.2 parts by weight of the aqueous emulsion (S-1) (equivalent to 11.1 parts by weight of the resin (D)) were introduced into 600 parts by weight of the ion exchanged water, and a slurry containing a flocculate containing the fine polymer particles (A') and the resin (D) was obtained. Next, the slurry was subjected to centrifugal dehydration to obtain wet powder, which is the above-mentioned flocculate. Two cycles of the operation of introducing the obtained wet powder into 500 parts of ion exchanged water and the operation of subjecting the obtained mixture to centrifugal dehydration were carried out in total to obtain wet powder. Lastly, the wet powder was dried in a dryer at 50° C. for 48 hours. In this way, powdery and/or granular material (P-2) containing the fine polymer particles (A') and the resin (D) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

Production Example 2-3: Preparation of Powdery and/or Granular Material (P-3)

The same method as described in Production Example 2-2 was carried out, except that 270 parts by weight of the aqueous latex (L-2) (equivalent to 100 parts by weight of the fine polymer particles (A')) was used instead of 325 parts by weight of the aqueous latex (L-1), as the aqueous latex containing the fine polymer particles (A'). In this way, a powdery and/or granular material (P-3) containing the fine polymer particles (A') and the resin (D) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

Production Example 2-4: Preparation of Powdery and/or Granular Material (P-4)

The same method as described in Production Example 2-2 was carried out, except that 423 parts by weight of the aqueous latex (L-3) (equivalent to 100 parts by weight of the fine polymer particles (A')) was used instead of 325 parts by weight of the aqueous latex (L-1), as the aqueous latex containing the fine polymer particles (A'). In this way, a powdery and/or granular material (P-4) containing the fine polymer particles (A') and the resin (D) was obtained. The obtained powdery and/or granular material was evaluated for anti-blocking property, and evaluated as "acceptable". The obtained powdery and/or granular material was measured for the volume-average particle size, and the volume-average particle size was not more than 10 mm.

Production Example 2-5: Preparation of Powdery and/or Granular Material (P-5)

The same method as described in Production Example 2-2 was carried out, except that 265.5 parts by weight of the aqueous latex (L-4) containing fine polymer particles (equivalent to 100 parts by weight of the fine polymer particles) was used instead of 325 parts by weight of the aqueous latex (L-1) containing the fine polymer particles (A'). In this way, a powdery and/or granular material (P-5) containing the fine polymer particles outside the scope of the present invention and the resin (D) was obtained.

Production Example 2-6: Preparation of Powdery and/or Granular Material (P-6)

The same method as described in Production Example 2-1 was carried out, except that 270 parts by weight of the aqueous latex (L-2) containing fine polymer particles (equivalent to 100 parts by weight of the fine polymer particles) was used instead of 325 parts by weight of the aqueous latex (L-1) containing the fine polymer particles (A'). In this way, a powdery and/or granular material (P-6) containing the fine polymer particles (A') was obtained.

Production Example 2-7: Preparation of Powdery and/or Granular Material (P-7)

The same method as described in Production Example 2-1 was carried out, except that 423 parts by weight of the aqueous latex (L-3) containing fine polymer particles (equivalent to 100 parts by weight of the fine polymer particles) was used instead of 325 parts by weight of the aqueous latex (L-1) containing the fine polymer particles (A'). In this way, a powdery and/or granular material (P-7) containing the fine polymer particles (A') was obtained.

Production Example 2-8: Preparation of Powdery and/or Granular Material (P-8)

The same method as described in Production Example 2-1 was carried out, except that 265.5 parts by weight of the aqueous latex (L-4) containing fine polymer particles (equivalent to 100 parts by weight of the fine polymer particles) was used instead of 325 parts by weight of the aqueous latex (L-1) containing the fine polymer particles (A'). In this way, a powdery and/or granular material (P-8) containing fine polymer particles outside the scope of the present invention was obtained.

<4. Production of Antifouling Paint Composition for Underwater Structure>

Example 1B 25 parts by weight of the powdery and/or granular material (P-2) was mixed into 100 parts by weight of a solid content of a hydrolyzable antifouling paint (UNAGI TORYO ICHIBAN, manufactured by NIPPON PAINT MARINE COATINGS Co., Ltd.) with use of a disper mixer for 30 minutes. In this way, an antifouling paint composition for underwater structure was produced.

Example 2B 25 parts by weight of the powdery and/or granular material (P-3) was mixed into 100 parts by weight of a solid content of a hydrolyzable antifouling paint (UNAGI TORYO ICHIBAN, manufactured by NIPPON PAINT MARINE COATINGS Co., Ltd.) with use of a disper mixer for 30 minutes. In this way, an antifouling paint composition for underwater structure was produced.

Example 3B 25 parts by weight of the powdery and/or granular material (P-4) was mixed into 100 parts by weight of a solid content of a hydrolyzable antifouling paint (UNAGI TORYO ICHIBAN, manufactured by NIPPON PAINT MARINE COATINGS Co., Ltd.) with use of a disper mixer for 30 minutes. In this way, an antifouling paint composition for underwater structure was produced.

Comparative Example 1B

A hydrolyzable antifouling paint (UNAGI TORYO ICHIBAN manufactured by NIPPON PAINT MARINE COATINGS Co., Ltd.) was used as an antifouling paint composition for underwater structure.

Comparative Example 2B 25 parts by weight of the powdery and/or granular material (P-1) was mixed into 100 parts by weight of a solid content of a hydrolyzable antifouling paint (UNAGI TORYO ICHIBAN, manufactured by NIPPON PAINT MARINE COATINGS Co., Ltd.) with use of a disper mixer for 30 minutes. In this way, an antifouling paint composition for underwater structure was produced.

Comparative Example 3B 25 parts by weight of the powdery and/or granular material (P-5) was mixed into 100 parts by weight of a solid content of a hydrolyzable antifouling paint (UNAGI TORYO ICHIBAN, manufactured by NIPPON PAINT MARINE COATINGS Co., Ltd.) with use of a disper mixer for 30 minutes. In this way, an antifouling paint composition for underwater structure was produced.

TABLE 2

| Powdery and/or granular material | Glass transition temperature (° C.) | Strength at break (MPa) | Elongation (%) | Elastic modulus (MPa) | Contact angle (Degree) |
|---|---|---|---|---|---|
| P-1 | −48.8 | 15.1 | 180.1 | 0.27 | 61 |
| P-2 | −51.4 | 9.1 | 127.3 | 0.23 | 62 |
| P-3 | −76.1 | 5.0 | 122.9 | 0.24 | 72 |
| P-4 | −129 | 2.3 | 52.5 | 0.08 | 114 |
| P-5 | 87.2 | 28.3 | 1.3 | 2.26 | 71 |
| P-6 | −42.0 | 9.4 | 140.7 | 0.30 | 73 |
| P-7 | −121.8 | 2.1 | 8.5 | 0.10 | 114 |
| P-8 | 132.2 | 27.1 | 0.6 | 2.41 | 72 |

TABLE 3

| | | | Ex. 1B | Ex. 2B | Ex. 3B | Com. Ex. 1B | Com. Ex. 2B | Com. Ex. 3B |
|---|---|---|---|---|---|---|---|---|
| Formula | Powder | Type | P-2 | P-3 | P-4 | — | P-1 | P-5 |
| Physical properties | Strength | (MPa) | 4.72 | 7.20 | 3.88 | 2.07 | 3.18 | Unmeasurable |
| | Elongation | (%) | 2.9 | 5.8 | 2.2 | 0.8 | 1.9 | |
| | Elastic modulus | (GPa) | 1.60 | 1.20 | 1.72 | 2.60 | 1.65 | |
| | Contact angle | (Degree) | 101 | 104 | 114 | 99 | 103 | 102 |
| | Presence or absence of foreign matter | — | Absent | Absent | Absent | Absent | Present | Absent |

Note:
Ex. stands for Example, Com.Ex. stands for Comparative Example

As shown in Table 3, each antifouling paint composition for an underwater structure in accordance with one or more embodiments of the present invention can provide a coating film that has excellent strength and elongation, that is, a coating film that has excellent durability. The antifouling paint composition for an underwater structure in accordance with one or more embodiments of the present invention can further provide a coating film that has low elastic modulus and that has large contact angle. That is, it can be said that the antifouling paint composition for an underwater structure in accordance with one or more embodiments of the present invention can provide a coating film that has an excellent antifouling property.

INDUSTRIAL APPLICABILITY

Embodiment 1 of the present invention can be suitably used in applications such as an adhesive agent.

Embodiment 2 of the present invention can provide an antifouling paint composition for an underwater structure that can provide a coating film having excellent durability and a technique of using the antifouling paint composition. An antifouling paint composition for an underwater structure in accordance with one or more embodiments of the present invention and a coating film made of the composition can be suitably used for underwater structures such as: watercrafts; materials for aquaculture and fishing; oil fences; supply and drainage ports at thermal or nuclear power plants; pipes for cooling conduits and seawater utilization equipment etc.; undersea tunnels; submarine bases; very large floating structures; harbor facilities; ocean civil engineering works at canals and waterways etc.; industrial water-related facilities; bridges; and floats.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A powdery and/or granular material, comprising:

fine polymer particles (A), and a resin (D), wherein:

the fine polymer particles (A) contain a rubber-containing graft copolymer that includes an elastic body and a graft part grafted to the elastic body, and a free polymer (FP), wherein the proportion of the elastic body in the fine polymer particles (A) is from 70% by weight to 93% by weight;

the elastic body contains, as a structural unit, a structural unit derived from butadiene;

the graft part contains a polymer that contains, as one or more structural units, one or more structural units derived from at least one type of monomer selected from the group consisting of aromatic vinyl monomers, vinyl cyanide monomers, and (meth)acrylate monomers;

the resin (D) comprises an epoxy resin;

the powdery and/or granular material comprises the fine polymer particles (A) in an amount of 50% by weight to 99% by weight and the resin (D) in an amount of 1% by weight to 50% by weight, where 100% by weight represents a total amount of the fine polymer particles (A) and the resin (D);

the free polymer (FP) is composed of a polymer that contains one or more structural units derived from at least one type of monomer selected from the group consisting of aromatic vinyl monomers, vinyl cyanide monomers, and (meth)acrylate monomers; and the free polymer (FP) is contained in an amount of not more than 8% by weight.

2. The powdery and/or granular material as set forth in claim 1, wherein a graft rate of the graft part is not less than 80%.

3. The powdery and/or granular material as set forth in claim 1, wherein the graft part contains a polymer that contains a structural unit derived from the (meth)acrylate monomers.

4. The powdery and/or granular material as set forth in claim 1, wherein the free polymer (FP) includes a polymer that contains a structural unit derived from the (meth) acrylate monomers.

5. The powdery and/or granular material as set forth in claim 1, wherein a force required to break a block of the powdery and/or granular material is not more than 30000 Pa, wherein:

the block is a block obtained by applying a load of 6.3 kg to the powdery and/or granular material after allowed to stand at 60° C. for 2 hours by placing a 6.3 kg weight on 30 g of the powdery and/or granular material contained in a cylindrical container having a diameter of 50 mm; and the force is a value obtained by measurement using a rheometer.

6. The powdery and/or granular material as set forth in claim 1, wherein the powdery and/or granular material has a volume-average particle size (Mv) of 30 μm to 500 μm.

7. A resin composition comprising:

a powdery and/or granular material as set forth in claim 1.

8. The powdery and/or granular material as set forth in claim 1, wherein the polymer of the graft part has a weight-average molecular weight of not more than 164,987.

9. The powdery and/or granular material as set forth in claim 1, wherein the fine polymer particles (A) have a volume-average particle size of not less than 90 nm.

10. The powdery and/or granular material as set forth in claim 1, wherein the resin (D) comprises a liquid epoxy resin that is liquid at 25° C.

11. The powdery and/or granular material as set forth in claim 1, wherein the (meth)acrylate monomers comprise methyl methacrylate and butyl acrylate.

12. The powdery and/or granular material as set forth in claim 1, wherein the resin (D) comprises a bisphenol type epoxy resin.

* * * * *